US010354659B2

(12) United States Patent
Liu et al.

(10) Patent No.: US 10,354,659 B2
(45) Date of Patent: Jul. 16, 2019

(54) FRAME LOSS COMPENSATION PROCESSING METHOD AND APPARATUS

(71) Applicant: Huawei Technologies Co., Ltd., Shenzhen (CN)

(72) Inventors: Zexin Liu, Beijing (CN); Xingtao Zhang, Shenzhen (CN); Bin Wang, Beijing (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 15/472,730

(22) Filed: Mar. 29, 2017

(65) Prior Publication Data

US 2017/0287493 A1 Oct. 5, 2017

(30) Foreign Application Priority Data

Mar. 29, 2016 (CN) .......................... 2016 1 0188140

(51) Int. Cl.
*G10L 19/005* (2013.01)
*G10L 19/02* (2013.01)
(Continued)

(52) U.S. Cl.
CPC ........ *G10L 19/005* (2013.01); *G10L 19/0208* (2013.01); *G10L 19/06* (2013.01); *G10L 19/083* (2013.01); *G10L 19/087* (2013.01); *G10L 19/107* (2013.01); *G10L 25/06* (2013.01); *G10L 25/78* (2013.01); *H04L 43/08* (2013.01); *G10L 2019/0002* (2013.01);
(Continued)

(58) Field of Classification Search
CPC ...... G10L 19/005; G10L 19/208; G10L 19/06
USPC ........................................ 704/205, 207, 208
See application file for complete search history.

(56) References Cited

U.S. PATENT DOCUMENTS

2011/0191111 A1 8/2011 Chu et al.
2014/0119572 A1 5/2014 Gao
(Continued)

FOREIGN PATENT DOCUMENTS

CN 1441950 A 9/2003
CN 102158783 A 8/2011
(Continued)

OTHER PUBLICATIONS

Foreign Communication From a Counterpart Application, PCT Application No. PCT/CN2016/103481, International Search Report dated Feb. 7, 2017, 7 pages.

*Primary Examiner* — Jakieda R Jackson
(74) *Attorney, Agent, or Firm* — Conley Rose, P.C.

(57) ABSTRACT

A frame loss compensation processing method and apparatus is presented, where the method includes, when a $i^{th}$ frame is a lost frame, estimating a spectrum frequency parameter, a pitch period, and a gain of the $i^{th}$ frame according to at least one of an inter-frame relationship between first N frames of the $i^{th}$ frame or an intra-frame relationship between first N frames of the $i^{th}$ frame. A parameter of the $i^{th}$ frame is determined using the signal correlation between the first N frames, the signal energy stability between the first N frames, intra-frame signal correlation of each frame, and intra-frame signal energy stability of each frame.

25 Claims, 7 Drawing Sheets

(51) Int. Cl.

| | |
|---|---|
| ***G10L 19/06*** | (2013.01) |
| ***G10L 19/083*** | (2013.01) |
| ***G10L 19/087*** | (2013.01) |
| ***G10L 19/107*** | (2013.01) |
| ***G10L 25/06*** | (2013.01) |
| ***G10L 25/78*** | (2013.01) |
| ***H04L 12/26*** | (2006.01) |
| *G10L 19/00* | (2013.01) |

(52) U.S. Cl.
CPC ................. *G10L 2019/0008* (2013.01); *G10L 2019/0016* (2013.01); *G10L 2025/783* (2013.01)

(56) References Cited

U.S. PATENT DOCUMENTS

| | | | |
|---|---|---|---|
| 2015/0255074 | A1 | 9/2015 | Jeong et al. |
| 2016/0118055 | A1 | 4/2016 | Wang et al. |

FOREIGN PATENT DOCUMENTS

| | | | |
|---|---|---|---|
| CN | 104299614 | A | 1/2015 |
| CN | 104718570 | A | 6/2015 |
| WO | 2015063044 | A1 | 5/2015 |

FRAME LOSS COMPENSATION PROCESSING METHOD AND APPARATUS

CROSS-REFERENCE TO RELATED APPLICATION

This application claims priority to Chinese Patent Application No. 201610188140.5, filed on Mar. 29, 2016, which is hereby incorporated by reference in its entirety.

TECHNICAL FIELD

Embodiments of the present disclosure relate to communications technologies, and in particular, to a frame loss compensation processing method and apparatus.

BACKGROUND

In a voice service, problems such as a voice packet loss and a voice packet error frequently occur in a weak coverage scenario, an interference scenario, and a high-speed movement scenario. This inevitably causes poor user experience due to intermittence, noise, or the like.

An existing frame loss compensation method is as follows. Bitstream analysis is performed on a decoder to determine whether a current frame is a lost frame. If the current frame is a lost frame, a parameter of the current lost frame is estimated, a spectrum frequency parameter and an excitation signal that are of the lost frame are recovered according to the parameter of the current lost frame and a parameter of a history frame, and a signal of the lost frame is further obtained according to the spectrum frequency parameter and the excitation signal; or if the current frame is a normal frame, a parameter of the current frame is obtained by means of decoding, and if the current frame is a normal frame and a previous frame is a lost frame, the parameter of the current frame is corrected according to a parameter of the previous frame, a spectrum frequency parameter and an excitation signal that are of the current frame are obtained according to a corrected parameter, and a signal of the current frame is synthesized according to the spectrum frequency parameter and the excitation signal. The foregoing frame parameter includes at least one of parameters such as a signal type, signal energy, and a signal phase.

Because the parameter of the lost frame is not accurately estimated in the foregoing method, audio decoding quality cannot be ensured.

SUMMARY

Embodiments of the present disclosure provide a frame loss compensation processing method and apparatus, so as to improve parameter estimation accuracy of a lost frame, and improve signal decoding quality.

A first aspect of the present disclosure provides a frame loss compensation processing method. First, whether an $i^{th}$ frame is a lost frame is determined using a lost-frame flag bit. When the $i^{th}$ frame is a lost frame, a spectrum frequency parameter, a pitch period, and a gain of the $i^{th}$ frame are estimated according to at least one of an inter-frame relationship between first N frames of the $i^{th}$ frame or an intra-frame relationship between first N frames of the $i^{th}$ frame. An algebraic codebook of the $i^{th}$ frame is obtained. An excitation signal of the $i^{th}$ frame is generated according to the pitch period and the gain that are of the $i^{th}$ frame and that are obtained by means of estimation and the obtained algebraic codebook of the $i^{th}$ frame. A signal of the $i^{th}$ frame is further synthesized according to the spectrum frequency parameter that is of the $i^{th}$ frame and that is obtained by means of estimation and the generated excitation signal of the $i^{th}$ frame. The inter-frame relationship between the first N frames includes at least one of correlation between the first N frames or energy stability between the first N frames, and the intra-frame relationship between the first N frames includes at least one of inter-subframe correlation between the first N frames or inter-subframe energy stability between the first N frames. Correlation between signals and energy stability between the signals are considered, so as to obtain a more accurate parameter of the $i^{th}$ frame by means of estimation, and improve voice signal decoding quality.

In a possible implementation manner of the first aspect, the spectrum frequency parameter of the $i^{th}$ frame is obtained by means of estimation according to the inter-frame relationship between the first N frames of the $i^{th}$ frame, and may be obtained by means of estimation in the following manner: first, determining a weight of a spectrum frequency parameter of an $(i-1)^{th}$ frame and a weight of a preset spectrum frequency parameter of the $i^{th}$ frame according to the correlation between the first N frames of the $i^{th}$ frame; and then performing a weighting operation on the spectrum frequency parameter of the $(i-1)^{th}$ frame and the preset spectrum frequency parameter of the $i^{th}$ frame according to the weight of the spectrum frequency parameter of the $(i-1)^{th}$ frame and the weight of the preset spectrum frequency parameter of the $i^{th}$ frame, to obtain the spectrum frequency parameter of the $i^{th}$ frame.

When the correlation between the first N frames of the $i^{th}$ frame includes a value relationship between a second threshold and a spectrum tilt parameter of a signal of the $(i-1)^{th}$ frame, a value relationship between a first threshold and a normalized autocorrelation value of the signal of the $(i-1)^{th}$ frame, and a value relationship between a third threshold and a deviation of a pitch period of the signal of the $(i-1)^{th}$ frame, the determining a weight of a spectrum frequency parameter of an $(i-1)^{th}$ frame and a weight of a preset spectrum frequency parameter of the $i^{th}$ frame according to the correlation between the first N frames of the $i^{th}$ frame is, if the signal of the $(i-1)^{th}$ frame meets at least one of a first condition, a second condition, and a third condition, determining that the weight of the spectrum frequency parameter of the $(i-1)^{th}$ frame is a first weight, and the weight of the preset spectrum frequency parameter of the $i^{th}$ frame is a second weight, where the first weight is greater than the second weight, the first condition is the normalized autocorrelation value of the signal of the $(i-1)^{th}$ frame is greater than the first threshold, the second condition is the spectrum tilt parameter of the signal of the $(i-1)^{th}$ frame is greater than the second threshold, and the third condition is the deviation of the pitch period of the signal of the $(i-1)^{th}$ frame is less than the third threshold; or if the signal of the $(i-1)^{th}$ frame does not meet a first condition, a second condition, or a third condition, determining that the weight of the spectrum frequency parameter of the $(i-1)^{th}$ frame is a second weight, and the weight of the preset spectrum frequency parameter of the $i^{th}$ frame is a first weight.

In a possible implementation manner of the first aspect, the pitch period of the $i^{th}$ frame is obtained by means of estimation according to the correlation between the first N frames of the $i^{th}$ frame and the inter-subframe correlation between the first N frames of the $i^{th}$ frame. The correlation includes a value relationship between a fifth threshold and a normalized autocorrelation value of a signal of an $(i-2)^{th}$ frame, a value relationship between a fourth threshold and a deviation of a pitch period of the signal of the $(i-2)^{th}$ frame, and a value relationship between the fourth threshold and a deviation of a pitch period of a signal of an $(i-1)^{th}$ frame. Correspondingly, the pitch period of the $i^{th}$ frame is obtained by means of estimation in the following manner: if the deviation of the pitch period of the signal of the $(i-1)^{th}$ frame is less than the fourth threshold, determining a pitch period deviation value of the signal of the $(i-1)^{th}$ frame according to the pitch period of the signal of the $(i-1)^{th}$ frame, and determining a pitch period of the signal of the $i^{th}$ frame according to the pitch period deviation value of the signal of the $(i-1)^{th}$ frame and the pitch period of the signal of the $(i-1)^{th}$ frame, where the pitch period of the signal of the $i^{th}$ frame includes a pitch period of each subframe of the $i^{th}$ frame, and the pitch period deviation value of the signal of the $(i-1)^{th}$ frame is an average value of differences between pitch periods of all adjacent subframes of the $(i-1)^{th}$ frame; or if the deviation of the pitch period of the signal of the $(i-1)^{th}$ frame is greater than or equal to the fourth threshold, the normalized autocorrelation value of the signal of the $(i-2)^{th}$ frame is greater than the fifth threshold, and the deviation of the pitch period of the signal of the $(i-2)^{th}$ frame is less than the fourth threshold, determining a pitch period deviation value of the signal of the $(i-2)^{th}$ frame and the signal of the $(i-1)^{th}$ frame according to the pitch period of the signal of the $(i-2)^{th}$ frame and the pitch period of the signal of the $(i-1)^{th}$ frame, and determining a pitch period of the signal of the $i^{th}$ frame according to the pitch period of the signal of the $(i-1)^{th}$ frame and the pitch period deviation value of the signal of the $(i-2)^{th}$ frame and the signal of the $(i-1)^{th}$ frame.

In an implementation manner, the pitch period deviation value pv of the signal of the $(i-1)^{th}$ frame may be determined according to the following formula:

$$pv=(p^{(-1)}(3)-p^{(-1)}(2))+(p^{(-1)}(2)-p^{(-1)}(1))+(p^{(-1)}(1)-p^{(-1)}(0))/3,$$

where $p^{(-1)}(j)$ is a pitch period of a $j^{th}$ subframe of the $(i-1)^{th}$ frame, and j=0, 1, 2, 3.

Correspondingly, the pitch period of the signal of the $i^{th}$ frame is determined according to the following formula:

$$p_{cur}(j)=p^{(-1)}(3)+(j+1)*pv,j=0,1,2,3,$$

where $p^{(-1)}(3)$ is a pitch period of a third subframe of the $(i-1)^{th}$ frame, frame, pv is the pitch period deviation value of the signal of the $(i-1)^{th}$ frame, and $p_{cur}(j)$ is a pitch period of a $j^{th}$ subframe of the $i^{th}$ frame.

In another implementation manner, the pitch period deviation value pv of the signal of the $(i-2)^{th}$ frame and the signal of the $(i-1)^{th}$ frame may be determined according to the following formula:

$$pv=(p^{(-2)}(3)-p^{(-2)}(2))+(p^{(-1)}(0)-p^{(-2)}(3))+(p^{(-1)}(1)-p^{(-1)}(0))/3,$$

where $p^{(-2)}(m)$ is a pitch period of an $m^{th}$ subframe of the $(i-2)^{th}$ frame, $p^{(-1)}(n)$ is a pitch period of an $n^{th}$ subframe of the $(i-1)^{th}$ frame, m=2, 3, and n=0, 1.

Correspondingly, the pitch period of the signal of the $i^{th}$ frame is determined according to the following formula:

$$p_{cur}(x)=p^{(-1)}(3)+(x+1)*pv,x=0,1,2,3,$$

where $p^{(-1)}(3)$ is a pitch period of a third subframe of the $(i-1)^{th}$ frame, frame, pv is the pitch period deviation value of the signal of the $(i-2)^{th}$ frame and the signal of the $(i-1)^{th}$ frame, and $p_{cur}(x)$ is a pitch period of an $x^{th}$ subframe of the $i^{th}$ frame.

In a possible implementation manner of the first aspect, the gain of the $i^{th}$ frame is obtained by means of estimation according to the correlation between the first N frames of the $i^{th}$ frame and the energy stability between the first N frames of the $i^{th}$ frame, and the gain of the $i^{th}$ frame includes an adaptive codebook gain and an algebraic codebook gain. The gain of the $i^{th}$ frame is obtained by means of estimation in the following manner: first, determining the adaptive codebook gain of the $i^{th}$ frame according to an adaptive codebook gain of an $(i-1)^{th}$ frame or a preset fixed value, correlation of the $(i-1)^{th}$ frame, and a sequence number of the $i^{th}$ frame in multiple consecutive lost frames; then determining a weight of an algebraic codebook gain of the $(i-1)^{th}$ frame and a weight of a gain of a voice activity detection (VAD) frame according to energy stability of the $(i-1)^{th}$ frame; and finally, performing a weighting operation on the algebraic codebook gain of the $(i-1)^{th}$ frame and the gain of the VAD frame according to the weight of the algebraic codebook gain of the $(i-1)^{th}$ frame and the weight of the gain of the VAD frame, to obtain the algebraic codebook gain of the $i^{th}$ frame. Optionally, more stable energy of the $(i-1)^{th}$ frame indicates a larger weight of the algebraic codebook gain of the $(i-1)^{th}$ frame, or the weight of the gain of the VAD frame correspondingly increases as a quantity of consecutive lost frames increases.

Optionally, before the performing a weighting operation on the algebraic codebook gain of the $(i-1)^{th}$ frame and the gain of the VAD frame according to the weight of the algebraic codebook gain of the $(i-1)^{th}$ frame and the weight of the gain of the VAD frame, to obtain the algebraic codebook gain of the $i^{th}$ frame, a first correction factor may be further determined according to an encoding and decoding rate, and the algebraic codebook gain of the $(i-1)^{th}$ frame is corrected using the first correction factor.

In a possible implementation manner of the first aspect, the algebraic codebook of the $i^{th}$ frame may be obtained in the following manner: obtaining the algebraic codebook of the $i^{th}$ frame by means of estimation according to random noise; or determining the algebraic codebook of the $i^{th}$ frame according to algebraic codebooks of the first N frames of the $i^{th}$ frame.

In a possible implementation manner of the first aspect, before the generating an excitation signal of the $i^{th}$ frame according to the pitch period and the gain that are of the $i^{th}$ frame and that are obtained by means of estimation and the obtained algebraic codebook of the $i^{th}$ frame, a weight of an algebraic codebook contribution of the $i^{th}$ frame further needs to be determined according to any one of a deviation of a pitch period of an $(i-1)^{th}$ frame, correlation of a signal of the $(i-1)^{th}$ frame, a spectrum tilt rate value of the $(i-1)^{th}$ frame, or a zero-crossing rate of an $(i-1)^{th}$ frame, or a weight of an algebraic codebook contribution of the $i^{th}$ frame is determined by performing a weighting operation on any combination of a deviation of a pitch period of the $(i-1)^{th}$ frame, correlation of a signal of the $(i-1)^{th}$ frame, a spectrum tilt rate value of the $(i-1)^{th}$ frame, or a zero-crossing rate of the $(i-1)^{th}$ frame. When the excitation signal of the $i^{th}$ frame is generated, the algebraic codebook contribution of the $i^{th}$ frame is first determined according to a product obtained by multiplying the algebraic codebook of the $i^{th}$ frame by the algebraic codebook gain of the $i^{th}$ frame; an adaptive codebook contribution of the $i^{th}$ frame is determined according to a product obtained by multiplying the adaptive codebook of the $i^{th}$ frame by the adaptive codebook gain of the $i^{th}$ frame; and then a weighting operation is performed on the algebraic codebook contribution of the $i^{th}$ frame and the adaptive codebook contribution of the $i^{th}$ frame according to the weight of the algebraic codebook contribution of the $i^{th}$ frame and a weight of the adaptive codebook contribution of the $i^{th}$ frame, to determine the excitation signal of the $i^{th}$ frame, where a weight of the adaptive codebook is 1.

In a possible implementation manner of the first aspect, when the $i^{th}$ frame is a normal frame, the spectrum frequency parameter, the pitch period, the gain, and the algebraic codebook of the $i^{th}$ frame are obtained by means of decoding according to a received bitstream, and then the excitation signal of the $i^{th}$ frame and a status-updated excitation signal of the $i^{th}$ frame are generated according to the pitch period, the gain, and the algebraic codebook that are of the $i^{th}$ frame and that are obtained by means of decoding. If an $(i-1)^{th}$ frame or an $(i-2)^{th}$ frame is a lost frame, whether to correct at least one of the spectrum frequency parameter, the excitation signal, or the status-updated excitation signal of the $i^{th}$ frame further needs to be determined according to at least one of inter-frame relationships or intra-frame relationships between the $i^{th}$ frame and the first N frames of the $i^{th}$ frame. The inter-frame relationship includes at least one of correlation between the $i^{th}$ frame and the first N frames of the $i^{th}$ frame or energy stability between the $i^{th}$ frame and the first N frames of the $i^{th}$ frame, and the intra-frame relationship includes at least one of inter-subframe correlation between the $i^{th}$ frame and the first N frames of the $i^{th}$ frame or inter-subframe energy stability between the $i^{th}$ frame and the first N frames of the $i^{th}$ frame.

When it is determined to correct the at least one of the spectrum frequency parameter, the excitation signal, or the status-updated excitation signal of the $i^{th}$ frame, the at least one of the spectrum frequency parameter, the excitation signal, or the status-updated excitation signal of the $i^{th}$ frame is corrected according to the at least one of the inter-frame relationships or the intra-frame relationships between the $i^{th}$ frame and the first N frames of the $i^{th}$ frame; and the signal of the $i^{th}$ frame is synthesized according to a correction result of the at least one of the spectrum frequency parameter, the excitation signal, or the status-updated excitation signal of the $i^{th}$ frame. When it is determined not to correct the spectrum frequency parameter, the excitation signal, or the status-updated excitation signal of the $i^{th}$ frame, the signal of the $i^{th}$ frame is synthesized according to the spectrum frequency parameter, the excitation signal, and the status-updated excitation signal of the $i^{th}$ frame. The at least one of the spectrum frequency parameter, the excitation signal, or the status-updated excitation signal of the $i^{th}$ frame is corrected, so that smooth transition of both overall energy between adjacent frames and energy on a same frequency band can be implemented.

In a possible implementation manner of the first aspect, whether to correct the spectrum frequency parameter of the $i^{th}$ frame may be determined according to correlation of the $i^{th}$ frame. When it is determined to correct the spectrum frequency parameter of the $i^{th}$ frame, the spectrum frequency parameter of the $i^{th}$ frame is corrected according to the spectrum frequency parameter of the $i^{th}$ frame and a spectrum frequency parameter of the $(i-1)^{th}$ frame, or the spectrum frequency parameter of the $i^{th}$ frame is corrected according to the spectrum frequency parameter of the $i^{th}$ frame and a preset spectrum frequency parameter of the $i^{th}$ frame. The correlation of the $i^{th}$ frame includes a value relationship between a sixth threshold and one of two spectrum frequency parameters corresponding to an index of a minimum value of a difference between adjacent spectrum frequency parameters of the $i^{th}$ frame, a value relationship between a seventh threshold and the minimum value of the difference between the adjacent spectrum frequency parameters of the $i^{th}$ frame, and a value relationship between an eighth threshold and the index of the minimum value of the difference between the adjacent spectrum frequency parameters of the $i^{th}$ frame.

When whether to correct the spectrum frequency parameter of the $i^{th}$ frame is determined, the difference between the adjacent spectrum frequency parameters of the $i^{th}$ frame is first determined, where each difference is corresponding to one index, and the spectrum frequency parameter includes an immittance spectral frequency (ISF) or a line spectral frequency (LSF); then whether the difference between the adjacent spectrum frequency parameters of the $i^{th}$ frame meets at least one of a fourth condition or a fifth condition is determined. The fourth condition includes one of the two spectrum frequency parameters corresponding to the index of the minimum value of the difference between the adjacent spectrum frequency parameters of the $i^{th}$ frame is less than the sixth threshold. The fifth condition includes an index value of the minimum value of the difference between the adjacent spectrum frequency parameters of the $i^{th}$ frame is less than the eighth threshold, and the minimum difference is less than the seventh threshold. If the difference between the adjacent spectrum frequency parameters of the $i^{th}$ frame meets the at least one of the fourth condition or the fifth condition, it is determined to correct the spectrum frequency parameter of the $i^{th}$ frame, or if the difference between the adjacent spectrum frequency parameters of the $i^{th}$ frame does not meet the fourth condition or the fifth condition, it is determined not to correct the spectrum frequency parameter of the $i^{th}$ frame.

When correction is performed, a corrected spectrum frequency parameter of the $i^{th}$ frame is determined according to a weighting operation performed on the spectrum frequency parameter of the $(i-1)^{th}$ frame and the spectrum frequency parameter of the $i^{th}$ frame; or a corrected spectrum frequency parameter of the $i^{th}$ frame is determined according to a weighting operation performed on the spectrum frequency parameter of the $i^{th}$ frame and the preset spectrum frequency parameter of the $i^{th}$ frame.

In a possible implementation manner of the first aspect, whether to correct the spectrum frequency parameter of the $i^{th}$ frame may be determined according to correlation between the $i^{th}$ frame and the $(i-1)^{th}$ frame. When it is determined to correct the spectrum frequency parameter of the $i^{th}$ frame, the spectrum frequency parameter of the $i^{th}$ frame is corrected according to the spectrum frequency parameter of the $i^{th}$ frame and a spectrum frequency parameter of the $(i-1)^{th}$ frame, or the spectrum frequency parameter of the $i^{th}$ frame is corrected according to the spectrum frequency parameter of the $i^{th}$ frame and a preset spectrum frequency parameter of the $i^{th}$ frame. The correlation between the $i^{th}$ frame and the $(i-1)^{th}$ frame includes a value relationship between a ninth threshold and a sum of differences between spectrum frequency parameters corresponding to some or all same indexes of the $(i-1)^{th}$ frame and the $i^{th}$ frame.

When whether to correct the spectrum frequency parameter of the $i^{th}$ frame is determined, a difference between adjacent spectrum frequency parameters of the $i^{th}$ frame is first determined, where each difference is corresponding to one index, and the spectrum frequency parameter includes an ISF or a LSF; then whether the spectrum frequency parameter of the $i^{th}$ frame and the spectrum frequency parameter of the $(i-1)^{th}$ frame meet a sixth condition is determined, where the sixth condition includes the sum of the differences between the spectrum frequency parameters corresponding to some or all same indexes of the $(i-1)^{th}$ frame and the $i^{th}$ frame is greater than the ninth threshold;

and if the spectrum frequency parameter of the $i^{th}$ frame and the spectrum frequency parameter of the $(i-1)^{th}$ frame meet the sixth condition, it is determined to correct the spectrum frequency parameter of the $i^{th}$ frame, or if the spectrum frequency parameter of the $i^{th}$ frame and the spectrum frequency parameter of the $(i-1)^{th}$ frame do not meet the sixth condition, it is determined not to correct the spectrum frequency parameter of the $i^{th}$ frame.

When correction is performed, a corrected spectrum frequency parameter of the $i^{th}$ frame is determined according to a weighting operation performed on the spectrum frequency parameter of the $(i-1)^{th}$ frame and the spectrum frequency parameter of the $i^{th}$ frame; or a corrected spectrum frequency parameter of the $i^{th}$ frame is determined according to a weighting operation performed on the spectrum frequency parameter of the $i^{th}$ frame and the preset spectrum frequency parameter of the $i^{th}$ frame.

In a possible implementation manner of the first aspect, whether to correct the excitation signal of the $i^{th}$ frame may be determined according to correlation between the $i^{th}$ frame and the $(i-1)^{th}$ frame and energy stability between the $i^{th}$ frame and the $(i-1)^{th}$ frame. When it is determined to correct the excitation signal of the $i^{th}$ frame, the excitation signal of the $i^{th}$ frame is corrected according to the energy stability between the $i^{th}$ frame and the $(i-1)^{th}$ frame. A pre-synthesized signal of the $i^{th}$ frame is first determined according to the excitation signal of the $i^{th}$ frame and the spectrum frequency parameter of the $i^{th}$ frame.

Then whether an absolute value of a difference between energy of the pre-synthesized signal of the $i^{th}$ frame and energy of a synthesized signal of the $(i-1)^{th}$ frame is greater than a tenth threshold is determined. If the absolute value of the difference between the energy of the pre-synthesized signal of the $i^{th}$ frame and the energy of the synthesized signal of the $(i-1)^{th}$ frame is greater than the tenth threshold, it is determined to correct the excitation signal of the $i^{th}$ frame, or if the absolute value of the difference between the energy of the pre-synthesized signal of the $i^{th}$ frame and the energy of the synthesized signal of the $(i-1)^{th}$ frame is less than or equal to the tenth threshold, it is determined not to correct the excitation signal of the $i^{th}$ frame.

Alternatively, whether a ratio of energy of the pre-synthesized signal of the $i^{th}$ frame to energy of a synthesized signal of the $(i-1)^{th}$ frame is greater than an eleventh threshold is determined, where the eleventh threshold is greater than 1. If the ratio of the energy of the pre-synthesized signal of the $i^{th}$ frame to the energy of the synthesized signal of the $(i-1)^{th}$ frame is greater than the eleventh threshold, it is determined to correct the excitation signal of the $i^{th}$ frame, or if the ratio of the energy of the pre-synthesized signal of the $i^{th}$ frame to the energy of the synthesized signal of the $(i-1)^{th}$ frame is less than or equal to the eleventh threshold, it is determined not to correct the excitation signal of the $i^{th}$ frame.

Alternatively, whether a ratio of energy of a pre-synthesized signal of the $(i-1)^{th}$ frame to energy of a synthesized signal of the $i^{th}$ frame is less than a twelfth threshold is determined, where the twelfth threshold is less than 1. If the ratio of the energy of the pre-synthesized signal of the $(i-1)^{th}$ frame to the energy of the synthesized signal of the $i^{th}$ frame is less than the twelfth threshold, it is determined to correct the excitation signal of the $i^{th}$ frame, or if the ratio of the energy of the pre-synthesized signal of the $(i-1)^{th}$ frame to the energy of the synthesized signal of the $i^{th}$ frame is greater than or equal to the twelfth threshold, it is determined not to correct the excitation signal of the $i^{th}$ frame.

When correction is performed, a second correction factor is determined according to the energy stability between the $i^{th}$ frame and the $(i-1)^{th}$ frame, where the second correction factor is less than 1; and then the excitation signal of the $i^{th}$ frame is multiplied by the second correction factor to obtain a corrected excitation signal of the $i^{th}$ frame. Optionally, the second correction factor is a ratio of energy of the $(i-1)^{th}$ frame to energy of the $i^{th}$ frame, or the second correction factor is a ratio of energy of a same quantity of subframes of the $(i-1)^{th}$ frame and the $i^{th}$ frame.

In a possible implementation manner of the first aspect, whether to correct the excitation signal of the $i^{th}$ frame may be determined according to correlation of a signal of the $(i-1)^{th}$ frame. When it is determined to correct the excitation signal of the $i^{th}$ frame, the excitation signal of the $i^{th}$ frame is corrected according to energy stability between the $i^{th}$ frame and the $(i-1)^{th}$ frame. The correlation of the signal of the $(i-1)^{th}$ frame includes a value relationship between a thirteenth threshold and a correlation value of the signal of the $(i-1)^{th}$ frame, and a value relationship between a fourteenth threshold and a deviation of a pitch period of the signal of the $(i-1)^{th}$ frame.

When whether to correct the excitation signal of the $i^{th}$ frame is determined, whether the signal of the $(i-1)^{th}$ frame meets a seventh condition is determined. If the signal of the $(i-1)^{th}$ frame meets the seventh condition, it is determined to correct the excitation signal of the $i^{th}$ frame, or if the signal of the $(i-1)^{th}$ frame does not meet the seventh condition, it is determined not to correct the excitation signal of the $i^{th}$ frame. The seventh condition is the $(i-1)^{th}$ frame is a lost frame, the correlation value of the signal of the $(i-1)^{th}$ frame is greater than the thirteenth threshold, and the deviation of the pitch period of the signal of the $(i-1)^{th}$ frame is less than the fourteenth threshold.

When correction is performed, a third correction factor is first determined according to the energy stability between the $i^{th}$ frame and the $(i-1)^{th}$ frame, where the third correction factor is less than 1; and then the excitation signal of the $i^{th}$ frame is multiplied by the third correction factor to obtain a corrected excitation signal of the $i^{th}$ frame.

In a possible implementation manner of the first aspect, whether to correct the excitation signal of the $i^{th}$ frame may be determined according to correlation between the signal of the $i^{th}$ frame and a signal of the $(i-1)^{th}$ frame. When it is determined to correct the excitation signal of the $i^{th}$ frame, the excitation signal of the $i^{th}$ frame is corrected according to energy stability between the $i^{th}$ frame and the $(i-1)^{th}$ frame. The correlation between the signal of the $i^{th}$ frame and the signal of the $(i-1)^{th}$ frame includes a value relationship between a thirteenth threshold and a correlation value of the signal of the $(i-1)^{th}$ frame, and a value relationship between a fourteenth threshold and a deviation of a pitch period of the signal of the $i^{th}$ frame.

When whether to correct the excitation signal of the $i^{th}$ frame is determined, whether the signal of the $(i-1)^{th}$ frame and the signal of the $i^{th}$ frame meet an eighth condition is determined. If the signal of the $(i-1)^{th}$ frame and the signal of the $i^{th}$ frame meet the eighth condition, it is determined to correct the excitation signal of the $i^{th}$ frame, or if the signal of the $(i-1)^{th}$ frame and the signal of the $i^{th}$ frame do not meet the eighth condition, it is determined not to correct the excitation signal of the $i^{th}$ frame. The eighth condition includes the $(i-1)^{th}$ frame is a lost frame, the correlation value of the signal of the $(i-1)^{th}$ frame is greater than the preset thirteenth threshold, and the deviation of the pitch period of the signal of the $i^{th}$ frame is less than the preset fourteenth threshold.

When correction is performed, a third correction factor is first determined according to the energy stability between the $i^{th}$ frame and the $(i-1)^{th}$ frame, where the third correction factor is less than 1; and then the excitation signal of the $i^{th}$ frame is multiplied by the third correction factor to obtain a corrected excitation signal of the $i^{th}$ frame. Optionally, the third correction factor is a ratio of energy of the $(i-1)^{th}$ frame to energy of the $i^{th}$ frame, or the third correction factor is a ratio of energy of a same quantity of subframes of the $(i-1)^{th}$ frame and the $i^{th}$ frame.

In a possible implementation manner of the first aspect, whether to correct the excitation signal of the $i^{th}$ frame may be determined according to correlation between a signal of the $(i-1)^{th}$ frame and a signal of the $(i-2)^{th}$ frame. When it is determined to correct the excitation signal of the $i^{th}$ frame, the excitation signal of the $i^{th}$ frame is corrected according to energy stability between the $i^{th}$ frame and the $(i-1)^{th}$ frame. The correlation between the signal of the $(i-1)^{th}$ frame and the signal of the $(i-2)^{th}$ frame includes a value relationship between a thirteenth threshold and a correlation value of the signal of the $(i-2)^{th}$ frame, and whether an excitation signal of the $(i-1)^{th}$ frame is corrected.

When whether to correct the excitation signal of the $i^{th}$ frame is determined, whether the signal of the $(i-2)^{th}$ frame and the signal of the $(i-1)^{th}$ frame meet a ninth condition is determined. If the signal of the $(i-2)^{th}$ frame and the signal of the $(i-1)^{th}$ frame meet the ninth condition, it is determined to correct the excitation signal of the $i^{th}$ frame, or if the signal of the $(i-2)^{th}$ frame and the signal of the $(i-1)^{th}$ frame do not meet the ninth condition, it is determined not to correct the excitation signal of the $i^{th}$ frame. The ninth condition includes the $(i-2)^{th}$ frame is a lost frame, the correlation value of the signal of the $(i-2)^{th}$ frame is greater than the thirteenth threshold, and the excitation signal of the $(i-1)^{th}$ frame is corrected.

When correction is performed, a fourth correction factor is determined according to the energy stability between the $i^{th}$ frame and the $(i-1)^{th}$ frame, where the fourth correction factor is less than 1; and the excitation signal of the $i^{th}$ frame is multiplied by the fourth correction factor to obtain a corrected excitation signal of the $i^{th}$ frame.

In a possible implementation manner of the first aspect, whether to correct the excitation signal of the $i^{th}$ frame may be determined according to correlation between a signal of the $(i-1)^{th}$ frame and a signal of the $(i-2)^{th}$ frame. When it is determined to correct the excitation signal of the $i^{th}$ frame, the excitation signal of the $i^{th}$ frame is corrected according to energy stability between the $i^{th}$ frame and the $(i-1)^{th}$ frame. The correlation between the signal of the $(i-1)^{th}$ frame and the signal of the $(i-2)^{th}$ frame includes a value relationship between a thirteenth threshold and a correlation value of the signal of the $(i-2)^{th}$ frame, and a value relationship between a fifteenth threshold and an algebraic codebook contribution of an excitation signal of the $(i-1)^{th}$ frame.

When whether to correct the excitation signal of the $i^{th}$ frame is determined, whether the signal of the $(i-2)^{th}$ frame and the signal of the $(i-1)^{th}$ frame meet a tenth condition is determined. If the signal of the $(i-2)^{th}$ frame and the signal of the $(i-1)^{th}$ frame meet the tenth condition, it is determined to correct the excitation signal of the $i^{th}$ frame, or if the signal of the $(i-2)^{th}$ frame and the signal of the $(i-1)^{th}$ frame do not meet the tenth condition, it is determined not to correct the excitation signal of the $i^{th}$ frame. The tenth condition includes the $(i-2)^{th}$ frame is a lost frame, the correlation value of the signal of the $(i-2)^{th}$ frame is greater than the thirteenth threshold, and the algebraic codebook contribution of the excitation signal of the $(i-1)^{th}$ frame is less than the fifteenth threshold.

When correction is performed, a fourth correction factor is determined according to the energy stability between the $i^{th}$ frame and the $(i-1)^{th}$ frame, where the fourth correction factor is less than 1; and the excitation signal of the $i^{th}$ frame is multiplied by the fourth correction factor to obtain a corrected excitation signal of the $i^{th}$ frame.

In a possible implementation manner of the first aspect, whether to correct the status-updated excitation signal of the $i^{th}$ frame may be determined according to correlation between a signal of the $(i-1)^{th}$ frame and the signal of the $i^{th}$ frame. When it is determined to correct the status-updated excitation signal of the $i^{th}$ frame, the status-updated excitation signal of the $i^{th}$ frame is corrected according to energy stability between the $i^{th}$ frame and the $(i-1)^{th}$ frame. The correlation between the signal of the $(i-1)^{th}$ frame and the signal of the $i^{th}$ frame includes correlation between the $(i-1)^{th}$ frame and the $i^{th}$ frame, and whether an excitation signal of the $(i-1)^{th}$ frame is corrected.

When whether to correct the status-updated excitation signal of the $i^{th}$ frame is determined, whether the signal of the $i^{th}$ frame and the signal of the $(i-1)^{th}$ frame meet an eleventh condition is determined. If the signal of the $i^{th}$ frame and the signal of the $(i-1)^{th}$ frame meet the eleventh condition, it is determined to correct the status-updated excitation signal of the $i^{th}$ frame, or if the signal of the $i^{th}$ frame and the signal of the $(i-1)^{th}$ frame do not meet the eleventh condition, it is determined not to correct the status-updated excitation signal of the $i^{th}$ frame. The eleventh condition includes the $i^{th}$ frame or the $(i-1)^{th}$ frame is a highly-correlated frame, and the excitation signal of the $(i-1)^{th}$ frame is corrected.

When correction is performed, a fifth correction factor is determined according to the energy stability between the $i^{th}$ frame and the $(i-1)^{th}$ frame, where the fifth correction factor is less than 1; and the status-updated excitation signal of the $i^{th}$ frame is multiplied by the fifth correction factor to obtain a corrected status-updated excitation signal of the $i^{th}$ frame.

In a possible implementation manner of the first aspect, when the $i^{th}$ frame is a normal frame, the method further includes processing a decoded signal of an $i^{th}$ frame to obtain a correlation value of the decoded signal of the $i^{th}$ frame; determining correlation of a signal of the $i^{th}$ frame according to any one or any combination of the correlation value of the decoded signal of the $i^{th}$ frame, a value relationship between pitch periods of all subframes of the $i^{th}$ frame, a spectrum tilt value of the $i^{th}$ frame, or a zero-crossing rate of the $i^{th}$ frame; determining energy of the $i^{th}$ frame according to the decoded signal of the $i^{th}$ frame; determining energy stability between the energy of the $i^{th}$ frame and that of an $(i-1)^{th}$ frame according to the energy of the $i^{th}$ frame and energy of the $(i-1)^{th}$ frame; determining energy of each subframe of the $i^{th}$ frame according to the decoded signal of the $i^{th}$ frame; and determining energy stability between subframes of the $i^{th}$ frame according to the energy of each subframe of the $i^{th}$ frame. To estimate or correct a parameter of an $(i+1)^{th}$ frame, the correlation of the signal of the $i^{th}$ frame, energy stability between subframes of the $i^{th}$ frame, and the energy stability between the energy of the $i^{th}$ frame and that of the $(i-1)^{th}$ frame are determined.

A second aspect of the present disclosure provides a frame loss compensation processing apparatus. The apparatus includes a lost-frame determining module, an estimation module, an obtaining module, a generation module, and a signal synthesis module. The lost-frame determining module is configured to determine, using a lost-frame flag bit, whether an $i^{th}$ frame is a lost frame. The estimation module is configured to, when the $i^{th}$ frame is a lost frame, estimate a spectrum frequency parameter, a pitch period, and a gain of the $i^{th}$ frame according to at least one of an inter-frame relationship between first N frames of the $i^{th}$ frame or an intra-frame relationship between first N frames of the $i^{th}$ frame. The obtaining module is configured to obtain an algebraic codebook of the $i^{th}$ frame. The generation module is configured to generate an excitation signal of the $i^{th}$ frame according to the pitch period and the gain that are of the $i^{th}$ frame and that are obtained by the estimation module by means of estimation and the algebraic codebook that is of the $i^{th}$ frame and that is obtained by the obtaining module. The signal synthesis module is configured to synthesize a signal of the $i^{th}$ frame according to the spectrum frequency parameter that is of the $i^{th}$ frame and that is obtained by the estimation module by means of estimation and the excitation signal that is of the $i^{th}$ frame and that is generated by the generation module. The inter-frame relationship between the first N frames includes at least one of correlation between the first N frames or energy stability between the first N frames, and the intra-frame relationship between the first N frames includes at least one of inter-subframe correlation between the first N frames or inter-subframe energy stability between the first N frames, so as to obtain a more accurate parameter of the $i^{th}$ frame by means of estimation, and improve voice signal decoding quality.

In a possible implementation manner of the second aspect, the spectrum frequency parameter of the $i^{th}$ frame is obtained by the estimation module by means of estimation according to the inter-frame relationship between the first N frames of the $i^{th}$ frame. The estimation module is configured to determine a weight of a spectrum frequency parameter of an $(i-1)^{th}$ frame and a weight of a preset spectrum frequency parameter of the $i^{th}$ frame according to the correlation between the first N frames of the $i^{th}$ frame; and perform a weighting operation on the spectrum frequency parameter of the $(i-1)^{th}$ frame and the preset spectrum frequency parameter of the $i^{th}$ frame according to the weight of the spectrum frequency parameter of the $(i-1)^{th}$ frame and the weight of the preset spectrum frequency parameter of the $i^{th}$ frame, to obtain the spectrum frequency parameter of the $i^{th}$ frame.

In a possible implementation manner of the second aspect, the correlation between the first N frames of the $i^{th}$ frame includes a value relationship between a second threshold and a spectrum tilt parameter of a signal of the $(i-1)^{th}$ frame, a value relationship between a first threshold and a normalized autocorrelation value of the signal of the $(i-1)^{th}$ frame, and a value relationship between a third threshold and a deviation of a pitch period of the signal of the $(i-1)^{th}$frame. Correspondingly, the estimation module is configured to, if the signal of the $(i-1)^{th}$ frame meets at least one of a first condition, a second condition, and a third condition, determine that the weight of the spectrum frequency parameter of the $(i-1)^{th}$ frame is a first weight, and that the weight of the preset spectrum frequency parameter of the $i^{th}$ frame is a second weight; or if the signal of the $(i-1)^{th}$ frame does not meet a first condition, a second condition, or a third condition, determine that the weight of the spectrum frequency parameter of the $(i-1)^{th}$ frame is a second weight, and that the weight of the preset spectrum frequency parameter of the $i^{th}$ frame is a first weight. The first weight is greater than the second weight. The first condition is the normalized autocorrelation value of the signal of the $(i-1)^{th}$ frame is greater than the first threshold, the second condition is the spectrum tilt parameter of the signal of the $(i-1)^{th}$ frame is greater than the second threshold, and the third condition is the deviation of the pitch period of the signal of the $(i-1)^{th}$ frame is less than the third threshold.

In a possible implementation manner of the second aspect, the pitch period of the $i^{th}$ frame is obtained by the estimation module by means of estimation according to the correlation between the first N frames of the $i^{th}$ frame and the inter-subframe correlation between the first N frames of the $i^{th}$ frame. The correlation includes a value relationship between a fifth threshold and a normalized autocorrelation value of a signal of an $(i-2)^{th}$ frame, a value relationship between a fourth threshold and a deviation of a pitch period of the signal of the $(i-2)^{th}$ frame, and a value relationship between the fourth threshold and a deviation of a pitch period of a signal of an $(i-1)^{th}$ frame.

Correspondingly, the estimation module is configured to, if the deviation of the pitch period of the signal of the $(i-1)^{th}$ frame is less than the fourth threshold, determine a pitch period deviation value of the signal of the $(i-1)^{th}$ frame according to the pitch period of the signal of the $(i-1)^{th}$ frame, and determine a pitch period of the signal of the $i^{th}$ frame according to the pitch period deviation value of the signal of the $(i-1)^{th}$ frame and the pitch period of the signal of the $(i-1)^{th}$ frame, where the pitch period of the signal of the $i^{th}$ frame includes a pitch period of each subframe of the $i^{th}$ frame, and the pitch period deviation value of the signal of the $(i-1)^{th}$ frame is an average value of differences between pitch periods of all adjacent subframes of the $(i-1)^{th}$ frame; or if the deviation of the pitch period of the signal of the $(i-1)^{th}$ frame is greater than or equal to the fourth threshold, the normalized autocorrelation value of the signal of the $(i-2)^{th}$ frame is greater than the fifth threshold, and the deviation of the pitch period of the signal of the $(i-2)^{th}$ frame is less than the fourth threshold, determine a pitch period deviation value of the signal of the $(i-2)^{th}$ frame and the signal of the $(i-1)^{th}$ frame according to the pitch period of the signal of the $(i-2)^{th}$ frame and the pitch period of the signal of the $(i-1)^{th}$ frame, and determine a pitch period of the signal of the $i^{th}$ frame according to the pitch period of the signal of the $(i-1)^{th}$ frame and the pitch period deviation value of the signal of the $(i-2)^{th}$ frame and the signal of the $(i-1)^{th}$ frame.

In an implementation manner, the estimation module determines the pitch period deviation value pv of the signal of the $(i-1)^{th}$ frame according to the following formula:

$$pv=(p^{(-1)}(3)-p^{(-1)}(2))+(p^{(-1)}(2)-p^{(-1)}(1))+(p^{(-1)}(1)-p^{(-1)}(0))/3,$$

where $p^{(-1)}(j)$ is a pitch period of a $j^{th}$ subframe of the $(i-1)^{th}$ frame, and j=0, 1, 2, 3.

The estimation module determines the pitch period of the signal of the $i^{th}$ frame according to the following formula:

$$p_{cur}(j)=p^{(-1)}(3)+(j+1)*pv,j=0,1,2,3,$$

where $p^{(-1)}(3)$ is a pitch period of a third subframe of the $(i-1)^{th}$ frame, frame, pv is the pitch period deviation value of the signal of the $(i-1)^{th}$ frame, and $p_{cur}(j)$ is a pitch period of a $j^{th}$ subframe of the $i^{th}$ frame.

In another implementation manner, the estimation module determines the pitch period deviation value pv of the signal of the $(i-2)^{th}$ frame and the signal of the $(i-1)^{th}$ frame according to the following formula:

$$pv=(p^{(-2)}(3)-p^{(-2)}(2))+(p^{(-1)}(0)-p^{(-2)}(3))+(p^{(-1)}(1)-p^{(-1)}(0))/3,$$

where $p^{(-1)}(m)$ is a pitch period of an $m^{th}$ subframe of the $(i-2)^{th}$ frame, $p^{(-1)}(n)$ is a pitch period of an $n^{th}$ subframe of the $(i-1)^{th}$ frame, m=2, 3, and n=0, 1.

The estimation module determines the pitch period of the signal of the $i^{th}$ frame according to the following formula:

$$p_{cur}(x)=p^{(-1)}(3)+(x+1)*pv, x=0,1,2,3,$$

where $p^{(-1)}(3)$ is a pitch period of a third subframe of the $(i-1)^{th}$ frame, frame, pv is the pitch period deviation value of the signal of the $(i-2)^{th}$ frame and the signal of the $(i-1)^{th}$ frame, and $p_{cur}(x)$ is a pitch period of an $x^{th}$ subframe of the $i^{th}$ frame.

In a possible implementation manner of the second aspect, the gain of the $i^{th}$ frame is obtained by the estimation module by means of estimation according to the correlation between the first N frames of the $i^{th}$ frame and the energy stability between the first N frames of the $i^{th}$ frame, and the gain of the $i^{th}$ frame includes an adaptive codebook gain and an algebraic codebook gain. The estimation module is configured to first determine the adaptive codebook gain of the $i^{th}$ frame according to an adaptive codebook gain of an $(i-1)^{th}$ frame or a preset fixed value, correlation of the $(i-1)^{th}$ frame, and a sequence number of the $i^{th}$ frame in multiple consecutive lost frames; then determine a weight of an algebraic codebook gain of the $(i-1)^{th}$ frame and a weight of a gain of a VAD frame according to energy stability of the $(i-1)^{th}$ frame; and finally perform a weighting operation on the algebraic codebook gain of the $(i-1)^{th}$ frame and the gain of the VAD frame according to the weight of the algebraic codebook gain of the $(i-1)^{th}$ frame and the weight of the gain of the VAD frame, to obtain the algebraic codebook gain of the $i^{th}$ frame. Optionally, more stable energy of the $(i-1)^{th}$ frame indicates a larger weight of the algebraic codebook gain of the $(i-1)^{th}$ frame, or the weight of the gain of the VAD frame correspondingly increases as a quantity of consecutive lost frames increases.

Optionally, before the performing a weighting operation on the algebraic codebook gain of the $(i-1)^{th}$ frame and the gain of the VAD frame according to the weight of the algebraic codebook gain of the $(i-1)^{th}$ frame and the weight of the gain of the VAD frame, to obtain the algebraic codebook gain of the $i^{th}$ frame, the estimation module is further configured to determine a first correction factor according to an encoding and decoding rate; and correct the algebraic codebook gain of the $(i-1)^{th}$ frame using the first correction factor.

In a possible implementation manner of the second aspect, the obtaining module may obtain the algebraic codebook in the following manner: obtaining the algebraic codebook of the $i^{th}$ frame by means of estimation according to random noise; or determining the algebraic codebook of the $i^{th}$ frame according to algebraic codebooks of the first N frames of the $i^{th}$ frame.

In a possible implementation manner of the second aspect, the obtaining module is further configured to determine a weight of an algebraic codebook contribution of the $i^{th}$ frame according to any one of a deviation of a pitch period of an $(i-1)^{th}$ frame, correlation of a signal of the $(i-1)^{th}$ frame, a spectrum tilt rate value of the $(i-1)^{th}$ frame, or a zero-crossing rate of the $(i-1)^{th}$ frame, or determine a weight of an algebraic codebook contribution of the $i^{th}$ frame by performing a weighting operation on any combination of a deviation of a pitch period of an $(i-1)^{th}$ frame, correlation of a signal of the $(i-1)^{th}$ frame, a spectrum tilt rate value of the $(i-1)^{th}$ frame, or a zero-crossing rate of the $(i-1)^{th}$ frame; and perform an interpolation operation on a status-updated excitation signal of the $(i-1)^{th}$ frame to determine an adaptive codebook of the $i^{th}$ frame. The generation module is configured to determine the algebraic codebook contribution of the $i^{th}$ frame according to a product obtained by multiplying the algebraic codebook of the $i^{th}$ frame by the algebraic codebook gain of the $i^{th}$ frame; determine an adaptive codebook contribution of the $i^{th}$ frame according to a product obtained by multiplying the adaptive codebook of the $i^{th}$ frame by the adaptive codebook gain of the $i^{th}$ frame; and perform a weighting operation on the algebraic codebook contribution of the $i^{th}$ frame and the adaptive codebook contribution of the $i^{th}$ frame according to the weight of the algebraic codebook contribution of the $i^{th}$ frame and a weight of the adaptive codebook contribution of the $i^{th}$ frame, to determine the excitation signal of the $i^{th}$ frame, where a weight of the adaptive codebook is 1.

In a possible implementation manner of the second aspect, if the $i^{th}$ frame is a normal frame, the apparatus further includes a decoding module, a judging module, and a correction module. The decoding module is configured to obtain the spectrum frequency parameter, the pitch period, the gain, and the algebraic codebook of the $i^{th}$ frame by means of decoding according to a received bitstream. The generation module is further configured to generate the excitation signal of the $i^{th}$ frame and a status-updated excitation signal of the $i^{th}$ frame according to the pitch period, the gain, and the algebraic codebook that are of the $i^{th}$ frame and that are obtained by the decoding module by means of decoding. The judging module is configured to, when an $(i-1)^{th}$ frame or an $(i-2)^{th}$ frame is a lost frame, determine, according to at least one of inter-frame relationships or intra-frame relationships between the $i^{th}$ frame and the first N frames of the $i^{th}$ frame, whether to correct at least one of the spectrum frequency parameter, the excitation signal, or the status-updated excitation signal of the $i^{th}$ frame. The correction module is configured to, when the judging module determines to correct the at least one of the spectrum frequency parameter, the excitation signal, or the status-updated excitation signal of the $i^{th}$ frame, correct the at least one of the spectrum frequency parameter, the excitation signal, or the status-updated excitation signal of the $i^{th}$ frame according to the at least one of the inter-frame relationships or the intra-frame relationships between the $i^{th}$ frame and the first N frames of the $i^{th}$ frame.

The signal synthesis module is further configured to synthesize the signal of the $i^{th}$ frame according to a result of the correction performed by the correction module on the at least one of the spectrum frequency parameter, the excitation signal, or the status-updated excitation signal of the $i^{th}$ frame; or when the judging module determines not to correct the spectrum frequency parameter, the excitation signal, or the status-updated excitation signal of the $i^{th}$ frame, synthesize the signal of the $i^{th}$ frame according to the spectrum frequency parameter, the excitation signal, and the status-updated excitation signal of the $i^{th}$ frame. The inter-frame relationship includes at least one of correlation between the $i^{th}$ frame and the first N frames of the $i^{th}$ frame or energy stability between the $i^{th}$ frame and the first N frames of the $i^{th}$ frame, and the intra-frame relationship includes at least one of inter-subframe correlation between the $i^{th}$ frame and the first N frames of the $i^{th}$ frame or inter-subframe energy stability between the $i^{th}$ frame and the first N frames of the $i^{th}$ frame. The at least one of the spectrum frequency parameter, the excitation signal, or the status-updated excitation signal of the $i^{th}$ frame is corrected, so that smooth transition of both overall energy between adjacent frames and energy on a same frequency band can be implemented.

In a possible implementation manner of the second aspect, the judging module is configured to determine, according to correlation of the $i^{th}$ frame, whether to correct the spectrum frequency parameter of the $i^{th}$ frame. When the judging module determines to correct the spectrum frequency parameter of the $i^{th}$ frame, the correction module is configured to correct the spectrum frequency parameter of the $i^{th}$ frame according to the spectrum frequency parameter of the $i^{th}$ frame and a spectrum frequency parameter of the $(i-1)^{th}$ frame, or correct the spectrum frequency parameter of the $i^{th}$ frame according to the spectrum frequency parameter of the $i^{th}$ frame and a preset spectrum frequency parameter of the $i^{th}$ frame. The correlation of the $i^{th}$ frame includes a value relationship between a sixth threshold and one of two spectrum frequency parameters corresponding to an index of a minimum value of a difference between adjacent spectrum frequency parameters of the $i^{th}$ frame, a value relationship between a seventh threshold and the minimum value of the difference between the adjacent spectrum frequency parameters of the $i^{th}$ frame, and a value relationship between an eighth threshold and the index of the minimum value of the difference between the adjacent spectrum frequency parameters of the $i^{th}$ frame.

Correspondingly, the judging module is configured to first determine the difference between the adjacent spectrum frequency parameters of the $i^{th}$ frame, where each difference is corresponding to one index, and the spectrum frequency parameter includes an ISF or a LSF; then determine whether the difference between the adjacent spectrum frequency parameters of the $i^{th}$ frame meets at least one of a fourth condition or a fifth condition; and if the difference between the adjacent spectrum frequency parameters of the $i^{th}$ frame meets the at least one of the fourth condition or the fifth condition, determine to correct the spectrum frequency parameter of the $i^{th}$ frame, or if the difference between the adjacent spectrum frequency parameters of the $i^{th}$ frame does not meet the fourth condition or the fifth condition, determine not to correct the spectrum frequency parameter of the $i^{th}$ frame. The fourth condition includes one of the two spectrum frequency parameters corresponding to the index of the minimum value of the difference between the adjacent spectrum frequency parameters of the $i^{th}$ frame is less than the sixth threshold, and the fifth condition includes an index value of the minimum value of the difference between the adjacent spectrum frequency parameters of the $i^{th}$ frame is less than the eighth threshold, and the minimum difference is less than the seventh threshold.

The correction module is configured to determine a corrected spectrum frequency parameter of the $i^{th}$ frame according to a weighting operation performed on the spectrum frequency parameter of the $(i-1)^{th}$ frame and the spectrum frequency parameter of the $i^{th}$ frame; or determine a corrected spectrum frequency parameter of the $i^{th}$ frame according to a weighting operation performed on the spectrum frequency parameter of the $i^{th}$ frame and the preset spectrum frequency parameter of the $i^{th}$ frame.

In a possible implementation manner of the second aspect, the judging module is configured to determine, according to correlation between the $i^{th}$ frame and the $(i-1)^{th}$ frame, whether to correct the spectrum frequency parameter of the $i^{th}$ frame. When the judging module determines to correct the spectrum frequency parameter of the $i^{th}$ frame, the correction module is configured to correct the spectrum frequency parameter of the $i^{th}$ frame according to the spectrum frequency parameter of the $i^{th}$ frame and a spectrum frequency parameter of the $(i-1)^{th}$ frame, or correct the spectrum frequency parameter of the $i^{th}$ frame according to the spectrum frequency parameter of the $i^{th}$ frame and a preset spectrum frequency parameter of the $i^{th}$ frame. The correlation between the $i^{th}$ frame and the $(i-1)^{th}$ frame includes a value relationship between a ninth threshold and a sum of differences between spectrum frequency parameters corresponding to some or all same indexes of the $(i-1)^{th}$ frame and the $i^{th}$ frame.

Correspondingly, the judging module is configured to first determine a difference between adjacent spectrum frequency parameters of the $i^{th}$ frame, where each difference is corresponding to one index, and the spectrum frequency parameter includes an ISF or a LSF; then determine whether the spectrum frequency parameter of the $i^{th}$ frame and the spectrum frequency parameter of the $(i-1)^{th}$ frame meet a sixth condition; and if the spectrum frequency parameter of the $i^{th}$ frame and the spectrum frequency parameter of the $(i-1)^{th}$ frame meet the sixth condition, determine to correct the spectrum frequency parameter of the $i^{th}$ frame, or if the spectrum frequency parameter of the $i^{th}$ frame and the spectrum frequency parameter of the $(i-1)^{th}$ frame do not meet the sixth condition, determine not to correct the spectrum frequency parameter of the $i^{th}$ frame. The sixth condition includes the sum of the differences between the spectrum frequency parameters corresponding to some or all same indexes of the $(i-1)^{th}$ frame and the $i^{th}$ frame is greater than the ninth threshold.

The correction module is configured to determine a corrected spectrum frequency parameter of the $i^{th}$ frame according to a weighting operation performed on the spectrum frequency parameter of the $(i-1)^{th}$ frame and the spectrum frequency parameter of the $i^{th}$ frame; or determine a corrected spectrum frequency parameter of the $i^{th}$ frame according to a weighting operation performed on the spectrum frequency parameter of the $i^{th}$ frame and the preset spectrum frequency parameter of the $i^{th}$ frame.

In a possible implementation manner of the second aspect, the judging module is configured to determine, according to correlation between the $i^{th}$ frame and the $(i-1)^{th}$ frame and energy stability between the $i^{th}$ frame and the $(i-1)^{th}$ frame, whether to correct the excitation signal of the $i^{th}$ frame. When the judging module determines to correct the excitation signal of the $i^{th}$ frame, the correction module is configured to correct the excitation signal of the $i^{th}$ frame according to the energy stability between the $i^{th}$ frame and the $(i-1)^{th}$ frame.

The judging module is configured to first determine a pre-synthesized signal of the $i^{th}$ frame according to the excitation signal of the $i^{th}$ frame and the spectrum frequency parameter of the $i^{th}$ frame; and then determine whether an absolute value of a difference between energy of the pre-synthesized signal of the $i^{th}$ frame and energy of a synthesized signal of the $(i-1)^{th}$ frame is greater than a tenth threshold, and if the absolute value of the difference between the energy of the pre-synthesized signal of the $i^{th}$ frame and the energy of the synthesized signal of the $(i-1)^{th}$ frame is greater than the tenth threshold, determine to correct the excitation signal of the $i^{th}$ frame, or if the absolute value of the difference between the energy of the pre-synthesized signal of the $i^{th}$ frame and the energy of the synthesized signal of the $(i-1)^{th}$ frame is less than or equal to the tenth threshold, determine not to correct the excitation signal of the $i^{th}$ frame; or determine whether a ratio of energy of the pre-synthesized signal of the $i^{th}$ frame to energy of a synthesized signal of the $(i-1)^{th}$ frame is greater than an eleventh threshold, where the eleventh threshold is greater than 1, and if the ratio of the energy of the pre-synthesized signal of the $i^{th}$ frame to the energy of the synthesized signal of the $(i-1)^{th}$ frame is greater than the eleventh threshold, determine to correct the excitation signal of the $i^{th}$ frame, or if the ratio of the energy of the pre-synthesized signal of the $i^{th}$ frame to the energy of the synthesized signal of the $(i-1)^{th}$ frame is less than or equal to the eleventh threshold, determine not to correct the excitation signal of the $i^{th}$ frame; or determine whether a ratio of energy of a pre-synthesized signal of the $(i-1)^{th}$ frame to energy of a synthesized signal of the $i^{th}$ frame is less than a twelfth threshold, where the twelfth threshold is less than 1, and if the ratio of the energy of the pre-synthesized signal of the $(i-1)^{th}$ frame to the energy of the synthesized signal of the $i^{th}$ frame is less than the twelfth threshold, determine to correct the excitation signal of the $i^{th}$ frame, or if the ratio of the energy of the pre-synthesized signal of the $(i-1)^{th}$ frame to the energy of the synthesized signal of the $i^{th}$ frame is greater than or equal to the twelfth threshold, determine not to correct the excitation signal of the $i^{th}$ frame.

The correction module is configured to determine a second correction factor according to the energy stability between the $i^{th}$ frame and the $(i-1)^{th}$ frame, where the second correction factor is less than 1; and multiply the excitation signal of the $i^{th}$ frame by the second correction factor to obtain a corrected excitation signal of the $i^{th}$ frame. Optionally, the second correction factor is a ratio of energy of the $(i-1)^{th}$ frame to energy of the $i^{th}$ frame, or the second correction factor is a ratio of energy of a same quantity of subframes of the $(i-1)^{th}$ frame and the $i^{th}$ frame.

In a possible implementation manner of the second aspect, the judging module is configured to determine, according to correlation of a signal of the $(i-1)^{th}$ frame, whether to correct the excitation signal of the $i^{th}$ frame. When the judging module determines to correct the excitation signal of the $i^{th}$ frame, the correction module is configured to correct the excitation signal of the $i^{th}$ frame according to energy stability between the $i^{th}$ frame and the $(i-1)^{th}$ frame. The correlation of the signal of the $(i-1)^{th}$ frame includes a value relationship between a thirteenth threshold and a correlation value of the signal of the $(i-1)^{th}$ frame, and a value relationship between a fourteenth threshold and a deviation of a pitch period of the signal of the $(i-1)^{th}$ frame.

Correspondingly, the judging module is configured to determine whether the signal of the $(i-1)^{th}$ frame meets a seventh condition; and if the signal of the $(i-1)^{th}$ frame meets the seventh condition, determine to correct the excitation signal of the $i^{th}$ frame, or if the signal of the $(i-1)^{th}$ frame does not meet the seventh condition, determine not to correct the excitation signal of the $i^{th}$ frame. The seventh condition is the $(i-1)^{th}$ frame is a lost frame, the correlation value of the signal of the $(i-1)^{th}$ frame is greater than the thirteenth threshold, and the deviation of the pitch period of the signal of the $(i-1)^{th}$ frame is less than the fourteenth threshold.

The correction module is configured to determine a third correction factor according to the energy stability between the $i^{th}$ frame and the $(i-1)^{th}$ frame, where the third correction factor is less than 1; and multiply the excitation signal of the $i^{th}$ frame by the third correction factor to obtain a corrected excitation signal of the $i^{th}$ frame.

In a possible implementation manner of the second aspect, the judging module is configured to determine, according to correlation between the signal of the $i^{th}$ frame and a signal of the $(i-1)^{th}$ frame, whether to correct the excitation signal of the $i^{th}$ frame. When the judging module determines to correct the excitation signal of the $i^{th}$ frame, the correction module is configured to correct the excitation signal of the $i^{th}$ frame according to energy stability between the $i^{th}$ frame and the $(i-1)^{th}$ frame. The correlation between the signal of the $i^{th}$ frame and the signal of the $(i-1)^{th}$ frame includes a value relationship between a thirteenth threshold and a correlation value of the signal of the $(i-1)^{th}$ frame, and a value relationship between a fourteenth threshold and a deviation of a pitch period of the signal of the $i^{th}$ frame.

Correspondingly, the judging module is configured to determine whether the signal of the $(i-1)^{th}$ frame and the signal of the $i^{th}$ frame meet an eighth condition; and if the signal of the $(i-1)^{th}$ frame and the signal of the $i^{th}$ frame meet the eighth condition, determine to correct the excitation signal of the $i^{th}$ frame, or if the signal of the $(i-1)^{th}$ frame and the signal of the $i^{th}$ frame do not meet the eighth condition, determine not to correct the excitation signal of the $i^{th}$ frame. The eighth condition includes the $(i-1)^{th}$ frame is a lost frame, the correlation value of the signal of the $(i-1)^{th}$ frame is greater than the preset thirteenth threshold, and the deviation of the pitch period of the signal of the $i^{th}$ frame is less than the preset fourteenth threshold.

The correction module is configured to determine a third correction factor according to the energy stability between the $i^{th}$ frame and the $(i-1)^{th}$ frame, where the third correction factor is less than 1; and multiply the excitation signal of the $i^{th}$ frame by the third correction factor to obtain a corrected excitation signal of the $i^{th}$ frame.

In a possible implementation manner of the second aspect, the judging module is configured to determine, according to correlation between a signal of the $(i-1)^{th}$ frame and a signal of the $(i-2)^{th}$ frame, whether to correct the excitation signal of the $i^{th}$ frame. When the judging module determines to correct the excitation signal of the $i^{th}$ frame, the correction module is configured to correct the excitation signal of the $i^{th}$ frame according to energy stability between the $i^{th}$ frame and the $(i-1)^{th}$ frame. The correlation between the signal of the $(i-1)^{th}$ frame and the signal of the $(i-2)^{th}$ frame includes a value relationship between a thirteenth threshold and a correlation value of the signal of the $(i-2)^{th}$ frame, and whether an excitation signal of the $(i-1)^{th}$ frame is corrected.

Correspondingly, the judging module is configured to determine whether the signal of the $(i-2)^{th}$ frame and the signal of the $(i-1)^{th}$ frame meet a ninth condition; and if the signal of the $(i-2)^{th}$ frame and the signal of the $(i-1)^{th}$ frame meet the ninth condition, determine to correct the excitation signal of the $i^{th}$ frame, or if the signal of the $(i-2)^{th}$ frame and the signal of the $(i-1)^{th}$ frame do not meet the ninth condition, determine not to correct the excitation signal of the $i^{th}$ frame. The ninth condition includes the $(i-2)^{th}$ frame is a lost frame, the correlation value of the signal of the $(i-2)^{th}$ frame is greater than the thirteenth threshold, and the excitation signal of the $(i-1)^{th}$ frame is corrected.

The correction module is configured to determine a fourth correction factor according to the energy stability between the $i^{th}$ frame and the $(i-1)^{th}$ frame, where the fourth correction factor is less than 1; and multiply the excitation signal of the $i^{th}$ frame by the fourth correction factor to obtain the corrected excitation signal of the $i^{th}$ frame.

In a possible implementation manner of the second aspect, the judging module is configured to determine, according to correlation between a signal of the $(i-1)^{th}$ frame and a signal of the $(i-2)^{th}$ frame, whether to correct the excitation signal of the $i^{th}$ frame. When the judging module determines to correct the excitation signal of the $i^{th}$ frame, the correction module is configured to correct the excitation signal of the $i^{th}$ frame according to energy stability between the $i^{th}$ frame and the $(i-1)^{th}$ frame. The correlation between the signal of the $(i-1)^{th}$ frame and the signal of the $(i-2)^{th}$ frame includes a value relationship between a thirteenth threshold and a correlation value of the signal of the $(i-2)^{th}$ frame, and a value relationship between a fifteenth threshold and an algebraic codebook contribution of an excitation signal of the $(i-1)^{th}$ frame.

Correspondingly, the judging module is configured to determine whether the signal of the $(i-2)^{th}$ frame and the signal of the $(i-1)^{th}$ frame meet a tenth condition; and if the signal of the $(i-2)^{th}$ frame and the signal of the $(i-1)^{th}$ frame meet the tenth condition, determine to correct the excitation signal of the $i^{th}$ frame, or if the signal of the $(i-2)^{th}$ frame and the signal of the $(i-1)^{th}$ frame do not meet the tenth condition, determine not to correct the excitation signal of the $i^{th}$ frame. The tenth condition includes the $(i-2)^{th}$ frame is a lost frame, the correlation value of the signal of the $(i-2)^{th}$ frame is greater than the thirteenth threshold, and the algebraic codebook contribution of the excitation signal of the $(i-1)^{th}$ frame is less than the fifteenth threshold.

The correction module is configured to determine a fourth correction factor according to the energy stability between the $i^{th}$ frame and the $(i-1)^{th}$ frame, where the fourth correction factor is less than 1; and multiply the excitation signal of the $i^{th}$ frame by the fourth correction factor to obtain a corrected excitation signal of the $i^{th}$ frame.

In a possible implementation manner of the second aspect, the judging module is configured to determine, according to correlation between a signal of the $(i-1)^{th}$ frame and the signal of the $i^{th}$ frame, whether to correct the status-updated excitation signal of the $i^{th}$ frame. When the judging module determines to correct the status-updated excitation signal of the $i^{th}$ frame, the correction module is configured to correct the status-updated excitation signal of the $i^{th}$ frame according to energy stability between the $i^{th}$ frame and the $(i-1)^{th}$ frame. The correlation between the signal of the $(i-1)^{th}$ frame and the signal of the $i^{th}$ frame includes correlation between the $(i-1)^{th}$ frame and the $i^{th}$ frame, and whether an excitation signal of the $(i-1)^{th}$ frame is corrected.

Correspondingly, the judging module is configured to determine whether the signal of the $i^{th}$ frame and the signal of the $(i-1)^{th}$ frame meet an eleventh condition; and if the signal of the $i^{th}$ frame and the signal of the $(i-1)^{th}$ frame meet the eleventh condition, determine to correct the status-updated excitation signal of the $i^{th}$ frame, or if the signal of the $i^{th}$ frame and the signal of the $(i-1)^{th}$ frame do not meet the eleventh condition, determine not to correct the status-updated excitation signal of the $i^{th}$ frame. The eleventh condition includes the $i^{th}$ frame or the $(i-1)^{th}$ frame is a highly-correlated frame, and the excitation signal of the $(i-1)^{th}$ frame is corrected.

The correction module is configured to determine a fifth correction factor according to the energy stability between the $i^{th}$ frame and the $(i-1)^{th}$ frame, where the fifth correction factor is less than 1; and multiply the status-updated excitation signal of the $i^{th}$ frame by the fifth correction factor to obtain a corrected status-updated excitation signal of the $i^{th}$ frame.

According to the frame loss compensation processing method and apparatus provided in the embodiments of the present disclosure, whether an $i^{th}$ frame is a lost frame is determined using a lost-frame flag bit. When the $i^{th}$ frame is a lost frame, a spectrum frequency parameter, a pitch period, and a gain of the $i^{th}$ frame are estimated according to at least one of an inter-frame relationship between first N frames of the $i^{th}$ frame or an intra-frame relationship between first N frames of the $i^{th}$ frame. The inter-frame relationship between the first N frames includes at least one of correlation between the first N frames or energy stability between the first N frames, and the intra-frame relationship between the first N frames includes at least one of inter-subframe correlation between the first N frames or inter-subframe energy stability between the first N frames. A parameter of the $i^{th}$ frame is determined using correlation between signals of the first N frames, energy stability between signals of the first N frames, intra-frame signal correlation of each frame, and intra-frame signal energy stability of each frame. A relationship between signals is considered, so as to obtain a more accurate parameter of the $i^{th}$ frame by means of estimation, and improve voice signal decoding quality.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
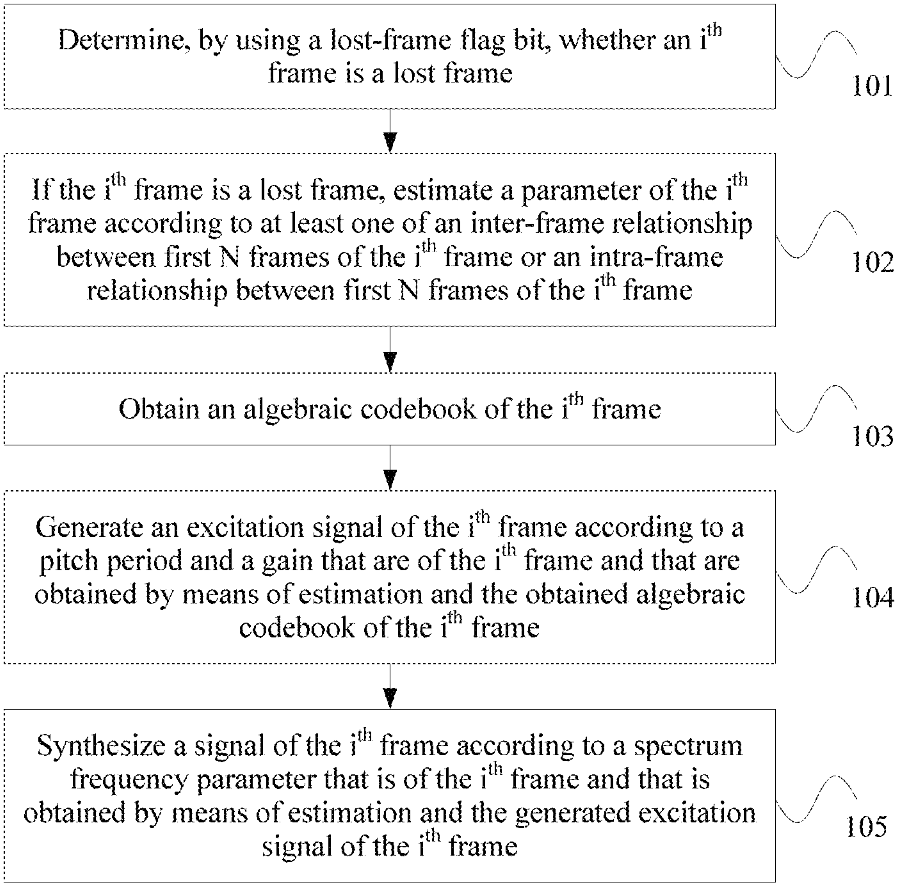
FIG. 1 is a flowchart of a frame loss compensation processing method according to Embodiment 1 of the present disclosure.

FIG. 1 is a flowchart of a frame loss compensation processing method according to Embodiment 1 of the present disclosure. As shown in FIG. 1, the method in this embodiment may include the following steps.

Step 101: Determine, using a lost-frame flag bit, whether an $i^{th}$ frame is a lost frame.

A frame sent by an encoder may be lost in a transmission process. A network side correspondingly records whether a current frame is a lost frame. A decoder determines, according to a lost-frame flag bit in a received data packet, whether the $i^{th}$ frame is a lost frame. The $i^{th}$ frame herein is a current frame that is being processed. By analogy, an $(i-1)^{th}$ frame is a previous frame of the current frame, and an $(i+1)^{th}$ frame is a next frame of the current frame. The previous frame of the current frame refers to a frame that is adjacent to the current frame and that precedes the current frame in a time domain, and the next frame of the current frame refers to a frame that is adjacent to the current frame and that follows the current frame in a time domain.

Step 102: If the $i^{th}$ frame is a lost frame, estimate a parameter of the $i^{th}$ frame according to at least one of an inter-frame relationship between first N frames of the $i^{th}$ frame or an intra-frame relationship between first N frames of the $i^{th}$ frame.

The inter-frame relationship between the first N frames includes at least one of correlation between the first N frames or energy stability between the first N frames, and the intra-frame relationship between the first N frames includes at least one of inter-subframe correlation between the first N frames or inter-subframe energy stability between the first N frames. Correlation includes a value relationship between spectrum frequency parameters of signals, a value relationship between correlation values of signals, a value relationship between spectrum tilt parameters of signals, a value relationship between pitch periods of signals, a relationship between excitation signals, and the like. The parameter of the $i^{th}$ frame includes a spectrum frequency parameter, a pitch period, a gain, and an algebraic codebook, and N is a positive integer greater than or equal to 1. The spectrum frequency parameter, the pitch period, and the gain may be obtained by means of estimation using the at least one of the inter-frame relationship between the first N frames of the $i^{th}$ frame or the intra-frame relationship between the first N frames of the $i^{th}$ frame.

Correlation of a signal may be represented using a normalized autocorrelation value of the signal, and the normalized autocorrelation value of the signal is obtained by performing normalized autocorrelation processing on the signal. Alternatively, correlation of a signal may be represented using an autocorrelation value, and the autocorrelation value may be obtained by means of autocorrelation processing, and is determined without normalized processing. The normalized autocorrelation value and the autocorrelation value may be mutually converted, and same correlation of the signal is finally obtained. Specifically, the correlation of the signal may be obtained by performing autocorrelation processing or normalized autocorrelation processing on any one or any combination of a correlation value of a decoded signal of each frame, a value relationship between pitch periods, a spectrum tilt value of each frame, or a zero-crossing rate of each frame.

The correlation of the signal may include the following several cases: low correlation, a low-correlation rising edge, a low-correlation falling edge, moderate correlation, high correlation, a high-correlation rising edge, and a high-correlation falling edge. When the correlation of the signal is being determined, a correlation value of the signal is compared with a correlation threshold, and the correlation threshold may be some critical values selected from the foregoing cases. For example, if the correlation threshold is the low-correlation falling edge, the correlation value of the signal is greater than the low-correlation falling edge, that is, the correlation is a value in the moderate correlation, the high correlation, the high-correlation rising edge, and the high-correlation falling edge.

In this embodiment, inter-frame energy stability of the first N frames refers to an energy relationship between adjacent frames of the first N frames, and the adjacent frames refer to two frames that are consecutive in a time domain during transmission. The energy stability may be represented using a ratio of energy of one frame to energy of another frame. Energy of each frame may be obtained by determining a root mean square of average energy of a signal, or may be obtained by determining average amplitude of a signal. Specifically, average energy E and average amplitude M of each frame may be determined using the following two formulas:

$$E = \sqrt{\sum_{i=0}^{N} s^2[j]/N}$$

$$M = \sum_{i=0}^{N} s[j]/N$$

where N is a frame length or a subframe length, s[j] represents amplitude of a $j^{th}$ frame, and a value of j is 1, 2, . . . , or N.

The spectrum frequency parameter includes an ISF, a LSF, and the like. The gain includes an adaptive codebook gain and an algebraic codebook gain. The pitch period is a periodicity feature caused due to vibration of vocal cords when a person utters a voiced sound, that is, a vibration period of vocal cords when a person makes a sound. The pitch period is in a reciprocal relationship with vibration frequency of vocal cords.

In this embodiment, when the parameter of the $i^{th}$ frame is being estimated, the parameter of the $i^{th}$ frame is determined according to correlation between history frames (that is, the first N frames), energy stability between the history frames, correlation of each frame, and energy stability of each frame. A relationship between signals is considered, so as to obtain a more accurate parameter of the $i^{th}$ frame by means of estimation.

Step 103: Obtain an algebraic codebook of the $i^{th}$ frame.

Optionally, the algebraic codebook of the $i^{th}$ frame may be obtained by means of estimation according to random noise, or the algebraic codebook of the $i^{th}$ frame may be obtained by weighting algebraic codebooks of the first N frames of the $i^{th}$ frame, or the algebraic codebook of the $i^{th}$ frame may be estimated using an existing method.

Step 104: Generate an excitation signal of the $i^{th}$ frame according to a pitch period and a gain that are of the $i^{th}$ frame and that are obtained by means of estimation and the obtained algebraic codebook of the $i^{th}$ frame.

Before this step is performed, a weight of an algebraic codebook contribution of the $i^{th}$ frame and an adaptive codebook of the $i^{th}$ frame further need to be estimated. The adaptive codebook may be obtained by means of interpolation according to a status-updated excitation signal of the $(i-1)^{th}$ frame. The weight of the algebraic codebook contribution may be obtained by performing a weighting operation according to any one or any combination of a deviation of a pitch period of the $(i-1)^{th}$ frame, correlation of a signal of the $(i-1)^{th}$ frame, a spectrum tilt rate of the $(i-1)^{th}$ frame, or a zero-crossing rate of the $(i-1)^{th}$ frame.

In this embodiment, the gain of the $i^{th}$ frame includes an adaptive codebook gain and an algebraic codebook gain. When the excitation signal of the $i^{th}$ frame is being synthesized, first, the algebraic codebook contribution of the $i^{th}$ frame is obtained by multiplying the algebraic codebook of the $i^{th}$ frame by the algebraic codebook gain of the $i^{th}$ frame, and an adaptive codebook contribution of the $i^{th}$ frame is obtained by multiplying the adaptive codebook of the $i^{th}$ frame by the adaptive codebook gain of the $i^{th}$ frame. Then, a weighting operation is performed on the algebraic codebook contribution of the $i^{th}$ frame and the adaptive codebook contribution of the $i^{th}$ frame according to the weight of the algebraic codebook contribution of the $i^{th}$ frame and a weight of the adaptive codebook contribution of the $i^{th}$ frame, to obtain the excitation signal of the $i^{th}$ frame, and a fixed value of a weight of the adaptive codebook is 1.

Step 105: Synthesize a signal of the $i^{th}$ frame according to a spectrum frequency parameter that is of the $i^{th}$ frame and that is obtained by means of estimation and the generated excitation signal of the $i^{th}$ frame.

A specific implementation manner of step 105 may be an existing method or a simple transformation of an existing method, and details are not described herein.

In this embodiment, when an $i^{th}$ frame is a lost frame, a parameter of the $i^{th}$ frame is estimated according to at least one of an inter-frame relationship between first N frames of the $i^{th}$ frame or an intra-frame relationship between first N frames of the $i^{th}$ frame. The inter-frame relationship between the first N frames includes at least one of correlation between the first N frames or energy stability between the first N frames, and the intra-frame relationship between the first N frames includes at least one of inter-subframe correlation between the first N frames or inter-subframe energy stability between the first N frames. The parameter of the $i^{th}$ frame is determined using signal correlation between the first N frames, signal energy stability between the first N frames, intra-frame signal correlation of each frame, and intra-frame signal energy stability of each frame. A relationship between signals is considered, so as to obtain a more accurate parameter of the $i^{th}$ frame by means of estimation, and improve voice signal decoding quality.

Figure 2:
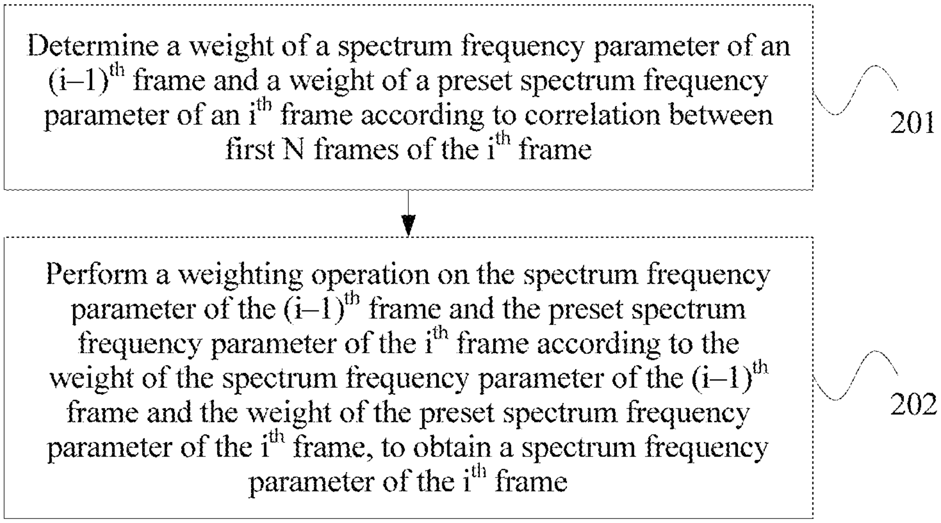
FIG. 2 is a flowchart of a spectrum frequency parameter estimation method according to Embodiment 2 of the present disclosure.

Based on Embodiment 1, Embodiment 2 of the present disclosure provides a spectrum frequency parameter estimation method. In this embodiment, a spectrum frequency parameter of an $i^{th}$ frame is obtained by means of estimation according to an inter-frame relationship between first N frames of the $i^{th}$ frame. FIG. 2 is a flowchart of a spectrum frequency parameter estimation method according to Embodiment 2 of the present disclosure. As shown in FIG. 2, the method provided in this embodiment may include the following steps.

Step 201: Determine a weight of a spectrum frequency parameter of an $(i-1)^{th}$ frame and a weight of a preset spectrum frequency parameter of an $i^{th}$ frame according to correlation between first N frames of the $i^{th}$ frame.

In this embodiment, the correlation between the first N frames of the $i^{th}$ frame includes a value relationship between a second threshold and a spectrum tilt parameter of a signal of the $(i-1)^{th}$ frame, a value relationship between a first threshold and a normalized autocorrelation value of the signal of the $(i-1)^{th}$ frame, and a value relationship between a third threshold and a deviation of a pitch period of the signal of the $(i-1)^{th}$ frame. The first threshold, the second threshold, and the third threshold all are preset. In an implementation manner of the present disclosure, the first threshold may be selected from a numerical interval [0.3, 0.8]. For example, the first threshold may be specifically 0.3, 0.5, 0.6, or 0.8. In an implementation manner of the present disclosure, the second threshold may be selected from a numerical interval [−0.5, 0.5]. For example, the second threshold may be specifically 0.5, 0.1, 0, 0.1, or 0.5. In an implementation manner of the present disclosure, the third threshold may be selected from a numerical interval [0.5, 5]. For example, the third threshold may be specifically 0.5, 1, or 5. For a signal of each frame, a spectrum tilt parameter, a normalized autocorrelation value, and a pitch period that are of the signal are determined and stored, so that a decoder decodes a signal of a current frame according to the correlation between the first N frames of the $i^{th}$ frame. For example, a spectrum frequency parameter of the $i^{th}$ frame may be determined according to signal correlation and a spectrum frequency parameter that are of a previous frame of the $i^{th}$ frame (that is, the $(i-1)^{th}$ frame). Generally, when the signal correlation and spectrum frequency parameter correlation that are of the $(i-1)^{th}$ frame are high, and when the spectrum frequency parameter of the $i^{th}$ frame is determined, the weight of the spectrum frequency parameter of the $(i-1)^{th}$ frame is large, and the weight of the preset spectrum frequency parameter of the $i^{th}$ frame is small. When the signal correlation and spectrum frequency parameter correlation that are of the $(i-1)^{th}$ frame are low, the weight of the spectrum frequency parameter of the $(i-1)^{th}$ frame is small, and the weight of the preset spectrum frequency parameter of the $i^{th}$ frame is large.

In an implementation manner, if the signal of the $(i-1)^{th}$ frame meets at least one of a first condition, a second condition, or a third condition, the weight of the spectrum frequency parameter of the $(i-1)^{th}$ frame is determined as a first weight, and the weight of the preset spectrum frequency parameter of the $i^{th}$ frame is determined as a second weight. The first weight is greater than the second weight. The first condition is the normalized autocorrelation value of the signal of the $(i-1)^{th}$ frame is greater than the first threshold. The second condition is the spectrum tilt parameter of the signal of the $(i-1)^{th}$ frame is greater than the second threshold. The third condition is the deviation of the pitch period of the signal of the $(i-1)^{th}$ frame is less than the third threshold.

Alternatively, if the signal of the $(i-1)^{th}$ frame does not meet a first condition, a second condition, or a third condition, the weight of the spectrum frequency parameter of the $(i-1)^{th}$ frame is determined as a second weight, and the weight of the preset spectrum frequency parameter of the $i^{th}$ frame is determined as a first weight. In this embodiment, the first weight and the second weight may be preset, or may be determined according to inter-frame correlation between spectrum frequency parameters of the first N frames of the $i^{th}$ frame. Correspondingly, before step 201, the first weight and the second weight further need to be determined according to the inter-frame correlation between the spectrum frequency parameters of the first N frames of the $i^{th}$ frame.

The normalized autocorrelation value of the signal of the $(i-1)^{th}$ frame may be determined by performing normalized autocorrelation processing on a decoded signal of the $(i-1)^{th}$ frame. The deviation of the pitch period of the signal of the $(i-1)^{th}$ frame is a sum of deviations of pitch periods of all subframes of the $(i-1)^{th}$ frame relative to an average value of the pitch periods of all the subframes. When the deviation of the pitch period of the signal of the $(i-1)^{th}$ frame is being determined, the average value of the pitch periods of all the subframes is first obtained by averaging a sum of the pitch periods of all the subframes of the $(i-1)^{th}$ frame; then a deviation of a pitch period of each subframe relative to the average value of the pitch periods is determined; finally, the deviation of the pitch period of the signal of the $(i-1)^{th}$ frame is obtained by calculating a sum of absolute values of the deviations of the pitch periods of all the subframes. Alternatively, the deviation of the pitch period of the signal of the $(i-1)^{th}$ frame is obtained by determining a sum of absolute values of differences between pitch periods of adjacent subframes.

For example, the first weight is 0.8, the second weight is 0.2, the first threshold is 0.8, the second threshold is 0.6, and the third threshold is 0.2. In this case, when the normalized autocorrelation value of the signal of the $(i-1)^{th}$ frame is greater than 0.8, the spectrum tilt parameter of the signal of the $(i-1)^{th}$ frame is greater than 0.6, and the deviation of the pitch period of the signal of the $(i-1)^{th}$ frame is less than 0.2, the weight of the spectrum frequency parameter of the $(i-1)^{th}$ frame is 0.8, and the weight of the preset spectrum frequency parameter of the $i^{th}$ frame is 0.2; otherwise, the weight of the spectrum frequency parameter of the $(i-1)^{th}$ frame is 0.2, and the weight of the preset spectrum frequency parameter of the $i^{th}$ frame is 0.8.

Step 202: Perform a weighting operation on the spectrum frequency parameter of the $(i-1)^{th}$ frame and the preset spectrum frequency parameter of the $i^{th}$ frame according to the weight of the spectrum frequency parameter of the $(i-1)^{th}$ frame and the weight of the preset spectrum frequency parameter of the $i^{th}$ frame, to obtain a spectrum frequency parameter of the $i^{th}$ frame.

In this embodiment, a decoder presets a spectrum frequency parameter for a lost frame, that is, a preset spectrum frequency parameter. When an $i^{th}$ frame is a lost frame, a weighting operation is performed according to a spectrum frequency parameter of an $(i-1)^{th}$ frame and a preset spectrum frequency parameter of the $i^{th}$ frame, to obtain a spectrum frequency parameter of the $i^{th}$ frame. When correlation of the $(i-1)^{th}$ frame is high, it is very likely that correlation between adjacent frames is high. Therefore, when a weight of the spectrum frequency parameter of the $(i-1)^{th}$ frame is large, a weight of the preset spectrum frequency parameter of the $i^{th}$ frame is correspondingly small. In this way, the spectrum frequency parameter of the $i^{th}$ frame is determined mainly according to the preset spectrum frequency parameter of the $i^{th}$ frame, and is more accurate.

Based on Embodiment 1, Embodiment 3 of the present disclosure provides a pitch period estimation method. In this embodiment, a pitch period of an $i^{th}$ frame is obtained by means of estimation according to correlation between first N frames of the $i^{th}$ frame and inter-subframe correlation between the first N frames of the $i^{th}$ frame. The correlation includes a value relationship between a fifth threshold and a normalized autocorrelation value of a signal of an $(i-2)^{th}$ frame, a value relationship between a fourth threshold and a deviation of a pitch period of the signal of the $(i-2)^{th}$ frame, and a value relationship between the fourth threshold and a deviation of a pitch period of a signal of an $(i-1)^{th}$ frame. In an implementation manner of the present disclosure, the fourth threshold may be selected from a numerical interval [2, 50]. For example, the fourth threshold may be specifically 2, 5, 10, or 50. In an implementation manner of the present disclosure, the fifth threshold may be selected from an interval of a low-correlation rising edge to a high-correlation rising edge. For example, the fifth threshold may be the low-correlation rising edge, a low-correlation falling edge, or the high-correlation rising edge. The low-correlation rising edge and the high-correlation rising edge are classification of preset correlation values. For example, correlation values may be sequentially classified into low correlation, a low-correlation rising edge, a low-correlation falling edge, a high-correlation rising edge, high correlation, moderate correlation, a high-correlation falling edge, and the like according to magnitudes of the correlation values.

Figure 3:
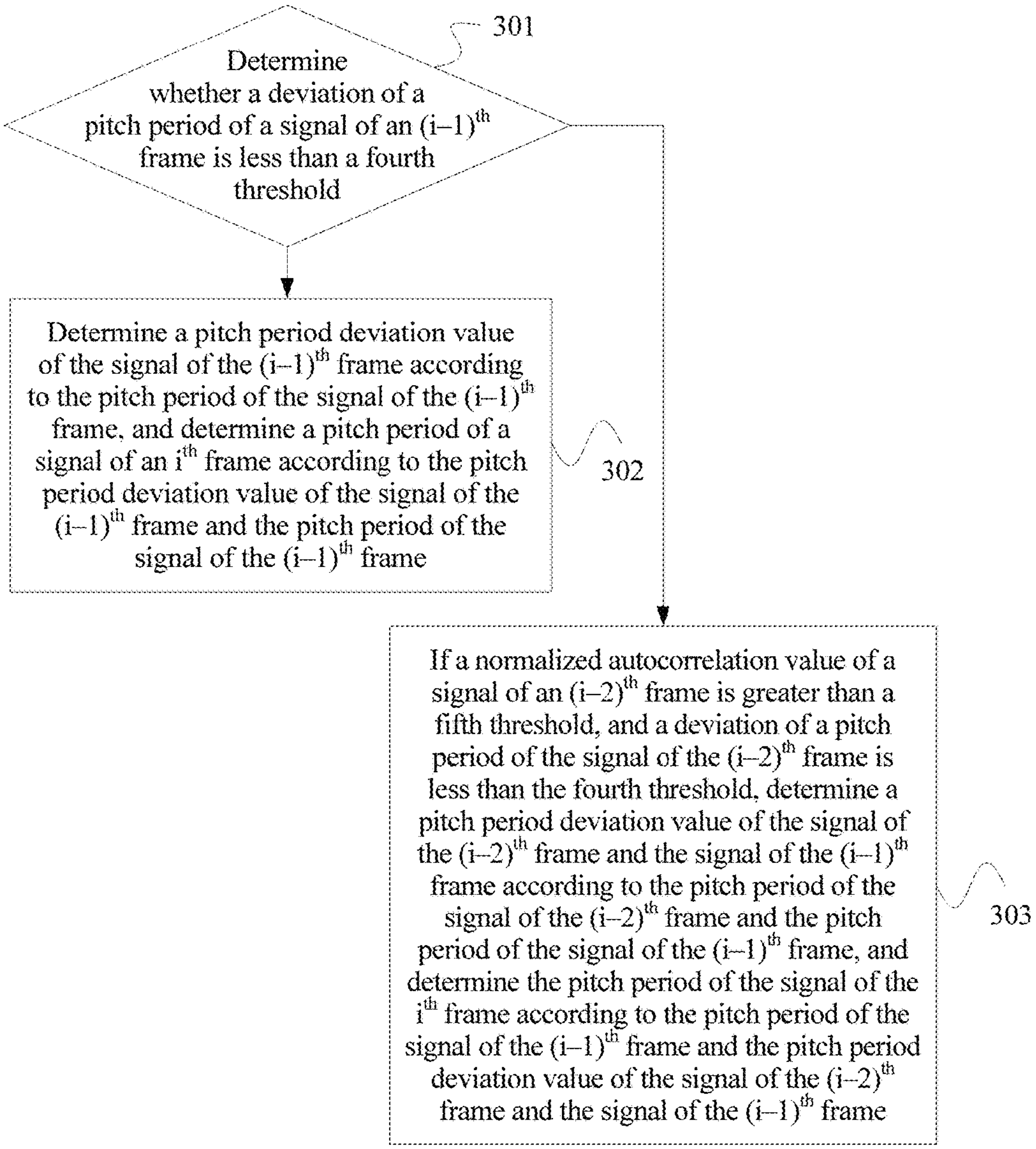
FIG. 3 is a flowchart of a pitch period estimation method according to Embodiment 3 of the present disclosure.

FIG. 3 is a flowchart of a pitch period estimation method according to Embodiment 3 of the present disclosure. As shown in FIG. 3, the method provided in this embodiment may include the following steps.

Step 301: Determine whether a deviation of a pitch period of a signal of an $(i-1)^{th}$ frame is less than a fourth threshold.

If the deviation of the pitch period of the signal of the $(i-1)^{th}$ frame is less than the fourth threshold, step 302 is performed, or if the deviation of the pitch period of the signal of the $(i-1)^{th}$ frame is greater than or equal to the fourth threshold, step 303 is performed.

Each subframe includes multiple subframes, and the deviation of the pitch period of the signal of the $(i-1)^{th}$ frame is a sum of deviations of pitch periods of all subframes of the $(i-1)^{th}$ frame relative to an average value of the pitch periods of all the subframes. For the deviation of the pitch period of the signal of the $(i-1)^{th}$ frame, refer to the determining method in Embodiment 2.

Step 302: Determine a pitch period deviation value of the signal of the $(i-1)^{th}$ frame according to the pitch period of the signal of the $(i-1)^{th}$ frame, and determine a pitch period of a signal of an $i^{th}$ frame according to the pitch period deviation value of the signal of the $(i-1)^{th}$ frame and the pitch period of the signal of the $(i-1)^{th}$ frame.

In this embodiment, the pitch period deviation value of the signal of the $(i-1)^{th}$ frame is an average value of differences between pitch periods of all adjacent subframes of the $i^{th}$ frame. Assuming that each frame includes four subframes, the pitch period deviation value pv of the signal of the $(i-1)^{th}$ frame may be determined according to the following formula:

$$pv=(p^{(-1)}(3)-p^{(-1)}(2))+(p^{(-1)}(2)-p^{(-1)}(1))+(p^{(-1)}(1)-p^{(-1)}(0))/3,$$

where $p^{(-1)}(j)$ is a pitch period of a $j^{th}$ subframe of the $(i-1)^{th}$ frame, and j=0, 1, 2, 3.

The pitch period of the signal of the $i^{th}$ frame may be determined according to the following formula:

$$p_{cur}(j)=p^{(-1)}(3)+(j+1)*pv, j=0,1,2,3,$$

where $p^{(-1)(}3)$ is a pitch period of a third subframe (the last subframe of the $(i-1)^{th}$ frame) frame) of the $(i-1)^{th}$ frame, pv is the pitch period deviation value of the signal of the $(i-1)^{th}$ frame, and $p_{cur}(j)$ a pitch period of a $j^{th}$ subframe of the $i^{th}$ frame.

Step 303: If a normalized autocorrelation value of a signal of an $(i-2)^{th}$ frame is greater than a fifth threshold, and a deviation of a pitch period of the signal of the $(i-2)^{th}$ frame is less than the fourth threshold, determine a pitch period deviation value of the signal of the $(i-2)^{th}$ frame and the signal of the $(i-1)^{th}$ frame according to the pitch period of the signal of the $(i-2)^{th}$ frame and the pitch period of the signal of the $(i-1)^{th}$ frame, and determine the pitch period of the signal of the $i^{th}$ frame according to the pitch period of the signal of the $(i-1)^{th}$ frame and the pitch period deviation value of the signal of the $(i-2)^{th}$ frame and the signal of the $(i-1)^{th}$ frame.

The $(i-2)^{th}$ frame is a previous frame of the $(i-1)^{th}$ frame. The pitch period deviation value pv of the signal of the $(i-2)^{th}$ frame and the signal of the $(i-1)^{th}$ frame may be determined according to the following formula:

$$pv=(p^{(-2)}(3)-p^{(-2)}(2))+(p^{(-1)}(0)-p^{(-2)}(3))+(p^{(-1)}(1)-p^{(-1)}(0))/3,$$

where $p^{(-1)}(m)$ is a pitch period of an $m^{th}$ subframe of the $(i-2)^{th}$ frame, $p^{(-1)}(n)$ is a pitch period of an $n^{th}$ subframe of the $(i-1)^{th}$ frame, m=2, 3, and n=0, 1.

Then, the pitch period of the signal of the $i^{th}$ frame is determined according to the pitch period deviation value pv of the signal of the $(i-2)^{th}$ frame and the signal of the $(i-1)^{th}$ frame using the following formula:

$$p_{cur}(x)=p^{(-1)}(3)+(x+1)*pv,x=0,1,2,3,$$

where $p^{(-1)}(3)$ is a pitch period of the third subframe of the $(i-1)^{th}$ frame, frame, pv is the pitch period deviation value of the signal of the $(i-2)^{th}$ frame and the signal of the $(i-1)^{th}$ frame, and $p_{cur}(x)$ is a pitch period of an $x^{th}$ subframe of the $i^{th}$ frame.

In the foregoing formula, $p^{(-2)}(3)$ and $p^{(-2)}(2)$ are last two subframes of the $(i-2)^{th}$ frame, and $p^{(-1)}(1)$ and $p^{(-1)}(0)$ are first two subframes of the $(i-1)^{th}$ frame. It can be learned that, in the foregoing formula, the pitch period deviation value of the signal of the $(i-2)^{th}$ frame and the signal of the $(i-1)^{th}$ frame is determined by selecting four consecutive subframes including the last two subframes of the $(i-2)^{th}$ frame and the first two subframes of the $(i-1)^{th}$frame. It may be understood that, the pitch period deviation value of the signal of the $(i-2)^{th}$ frame and the signal of the $(i-1)^{th}$ frame may be determined by selecting six consecutive subframes including last three subframes of the $(i-2)^{th}$ frame and first three subframes of the $(i-1)^{th}$ frame, or the pitch period deviation value of the signal of the $(i-2)^{th}$ frame and the signal of the $(i-1)^{th}$ frame may be determined by selecting all subframes of the $(i-2)^{th}$ frame and all subframes of the $(i-1)^{th}$ frame, or the pitch period deviation value of the signal of the $(i-2)^{th}$ frame and the signal of the $(i-1)^{th}$ frame may be determined by selecting two consecutive subframes including the last subframe of the $(i-2)^{th}$ frame and the first subframe of the $(i-1)^{th}$ frame.

Figure 4:
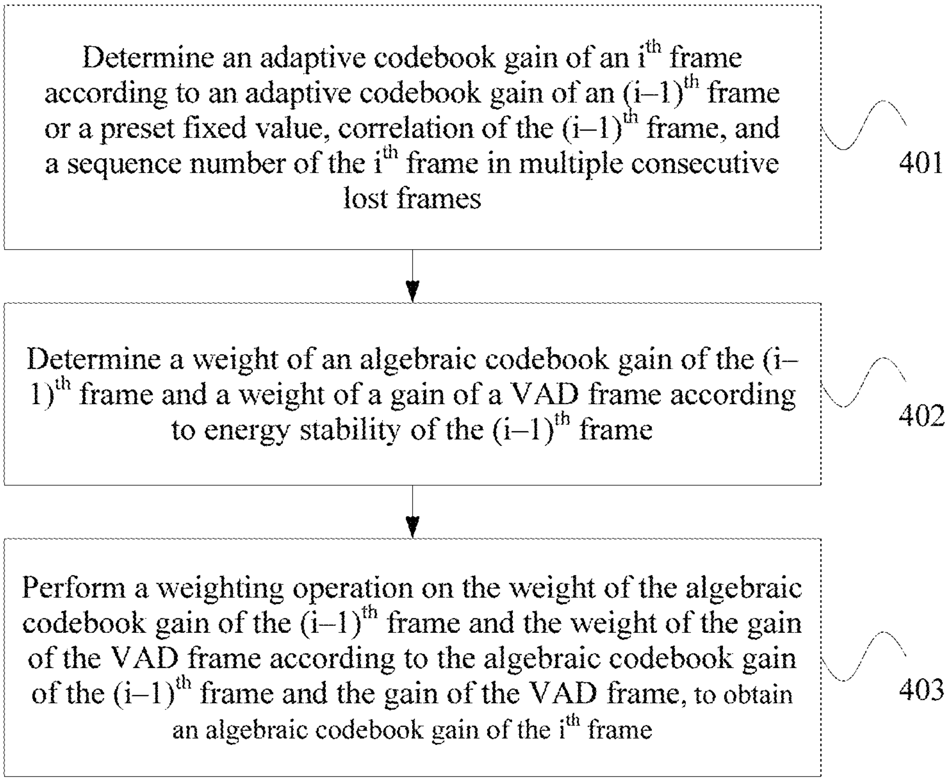
FIG. 4 is a flowchart of a gain estimation method according to Embodiment 4 of the present disclosure.

Based on Embodiment 1, Embodiment 4 of the present disclosure provides a gain estimation method. FIG. 4 is a flowchart of a gain estimation method according to Embodiment 4 of the present disclosure. A gain of an $i^{th}$ frame includes an adaptive codebook gain and an algebraic codebook gain. In this embodiment, the gain of the $i^{th}$ frame is obtained by means of estimation according to correlation between first N frames of the $i^{th}$ frame and energy stability between first N frames of the $i^{th}$ frame. As shown in FIG. 4, the method provided in this embodiment may include the following steps.

Step 401: Determine an adaptive codebook gain of an $i^{th}$ frame according to an adaptive codebook gain of an $(i-1)^{th}$ frame or a preset fixed value, correlation of the $(i-1)^{th}$ frame, and a sequence number of the $i^{th}$ frame in multiple consecutive lost frames.

First, whether the $i^{th}$ frame is the first lost frame in the multiple consecutive lost frames is determined. If first m frames of the $i^{th}$ frame all are lost frames, the $i^{th}$ frame is a non-first lost frame in the multiple consecutive lost frames, and m is a positive integer greater than or equal to 1. If the $i^{th}$ frame is a non-first lost frame in the multiple consecutive lost frames, the adaptive codebook gain of the $i^{th}$ frame is determined according to an adaptive codebook gain corresponding to the first lost frame in the multiple consecutive lost frames, an attenuation factor, and the sequence number of the $i^{th}$ frame in the multiple consecutive lost frames.

If the first m frames of the $i^{th}$ frame are all lost frames, there are m+1 lost frames in total including the $i^{th}$ frame. When the first lost frame in the m+1 lost frames is lost, a decoder sets an adaptive codebook gain for the first lost frame, and an adaptive codebook gain gradually attenuates as a quantity of consecutive lost frames increases. In an implementation manner, when consecutive frames are lost, each time a frame is lost, an adaptive codebook gain of a previous frame is multiplied by an attenuation factor. Assuming that the adaptive codebook gain corresponding to the first lost frame of the consecutive lost frames is 1, and the attenuation factor is 0.8, an adaptive codebook gain of the second lost frame of the consecutive lost frames is 1*0.8, an adaptive codebook gain of the third lost frame of the consecutive lost frames is $1*(0.8)^2$, and by analogy, an adaptive codebook gain of the $(m+1)^{th}$ lost frame of the consecutive lost frames is $1*(0.8)^m$. Certainly, an attenuation factor may be subtracted from an adaptive codebook gain. For example, if the adaptive codebook gain corresponding to the first lost frame of the consecutive lost frames is 1, and the attenuation factor is 0.1, an adaptive codebook gain of the second lost frame of the consecutive lost frames is 1−0.1, an adaptive codebook gain of the third lost frame of the consecutive lost frames is 1−2*0.1, and by analogy, an adaptive codebook gain of the $(m+1)^{th}$ lost frame of the consecutive lost frames is 1−m*0−1. In this embodiment, the attenuation factor may be a fixed value, or may vary with energy stability between frames. For example, the attenuation factor is smaller on an energy falling edge.

If the $i^{th}$ frame is the first lost frame following a normal frame, that is, the $(i-1)^{th}$ frame is a normal frame, and the $i^{th}$ frame is a lost frame, it is determined that the adaptive codebook gain of the $i^{th}$ frame is a fixed value. That is, when the first frame following a normal frame is lost, an adaptive codebook gain is set for the first lost frame, and if there are no consecutive lost frames following the first lost frame, adaptive codebook gains of these non-consecutive lost frames are all the same as the adaptive codebook gain of the first lost frame.

Step 402: Determine a weight of an algebraic codebook gain of the $(i-1)^{th}$ frame and a weight of a gain of a VAD frame according to energy stability of the $(i-1)^{th}$ frame.

It should be noted that, step 402 may be performed before step 401, that is, there is no sequence of determining an algebraic codebook gain and determining an adaptive codebook gain. The gain of the voice activity detection VAD frame may be obtained by means of determining using a root mean square of energy, average amplitude, and the like.

A sum of the weight of the algebraic codebook gain of the $(i-1)^{th}$ frame and the weight of the gain of the VAD frame is a fixed value. More stable energy of the $(i-1)^{th}$ frame is corresponding to a larger weight of the algebraic codebook gain of the $(i-1)^{th}$ frame and a smaller weight of the gain of the VAD frame. Alternatively, as a quantity of consecutive lost frames increases, the weight of the gain of the VAD frame increases correspondingly, and the weight of the algebraic codebook gain decreases correspondingly. If the energy of the $(i-1)^{th}$ frame is more stable, and the quantity of consecutive lost frames increases, in consideration of energy stability and the quantity of consecutive lost frames, the weight of the algebraic codebook gain of the $(i-1)^{th}$ frame does not increase or an increment decreases. In a voice frame, the decoder periodically performs VAD detection to obtain energy of the VAD frame.

Step 403: Perform a weighting operation on the weight of the algebraic codebook gain of the $(i-1)^{th}$ frame and the weight of the gain of the VAD frame according to the algebraic codebook gain of the $(i-1)^{th}$ frame and the gain of the VAD frame, to obtain an algebraic codebook gain of the $i^{th}$ frame.

Assuming that the weight of the algebraic codebook gain of the $(i-1)^{th}$ frame is α, and the weight of the gain of the VAD frame is β, the algebraic codebook gain of the $i^{th}$ frame is $g_c=\alpha\cdot g_c^{(-1)}+\beta\cdot g_{cg}$, where $g_c^{(-1)}$ represents the algebraic codebook gain of the $(i-1)^{th}$ frame, and $g_{cg}$ is the gain of the VAD frame. When the algebraic codebook gain is less than the gain of the VAD frame, as a quantity of frames increases, the weight of the algebraic codebook gain keeps unchanged or gradually increases on a basis of a previous frame.

Optionally, before step 403 is performed, the method further includes determining a first correction factor according to an encoding and decoding rate, and correcting the algebraic codebook gain of the $(i-1)^{th}$ frame using the first correction factor. For example, the algebraic codebook gain of the $(i-1)^{th}$ frame is corrected by multiplying the algebraic codebook gain of the $(i-1)^{th}$ frame by the first correction factor.

Figure 5:
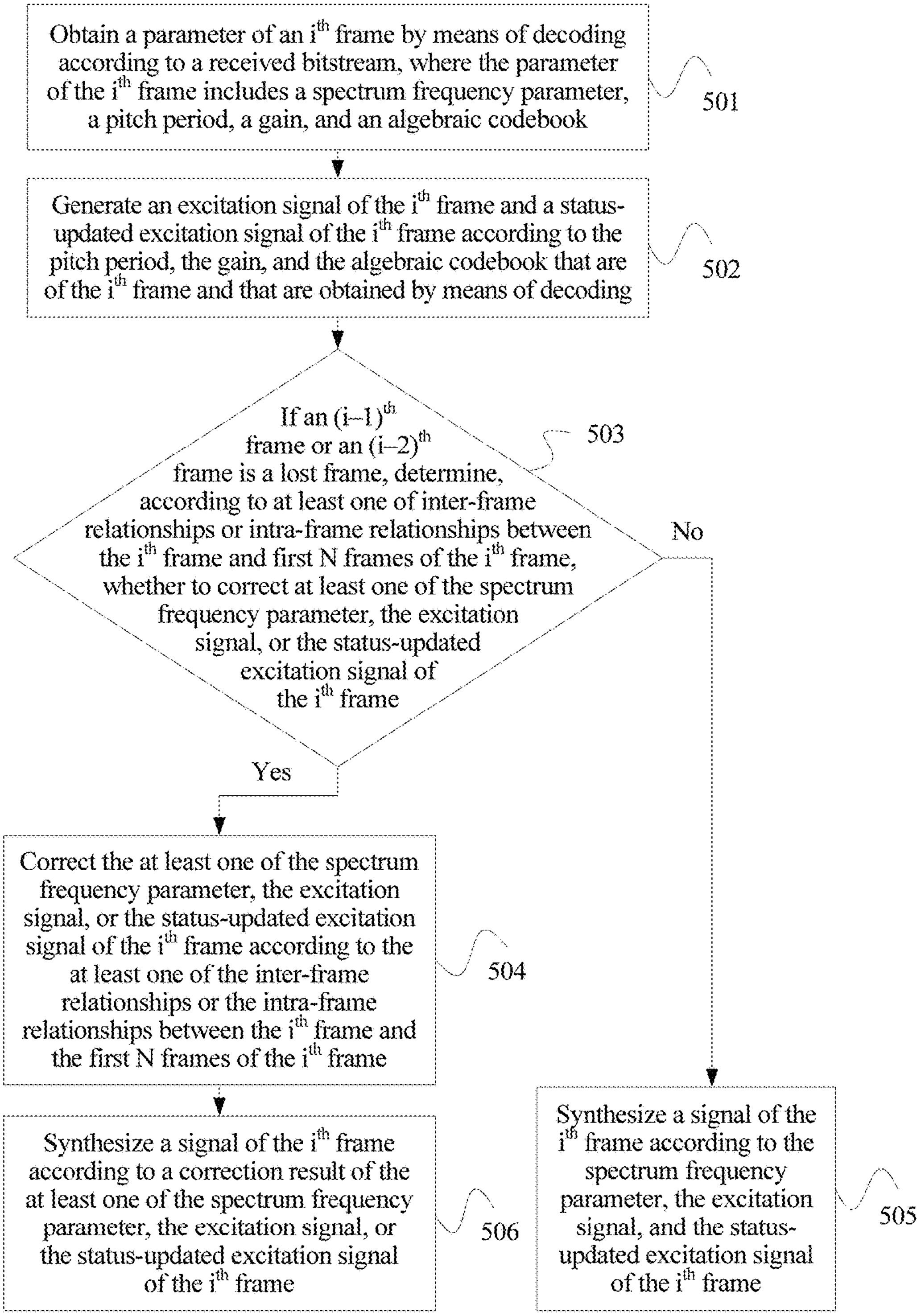
FIG. 5 is a flowchart of a frame loss compensation processing method according to Embodiment 5 of the present disclosure.

Embodiment 1 to Embodiment 4 describe how to determine a parameter of an $i^{th}$ frame according to at least one of an inter-frame relationship between first N frames of the $i^{th}$ frame or an intra-frame relationship between first N frames of the $i^{th}$ frame when the $i^{th}$ frame is a lost frame. Embodiment 5 of the present disclosure describes how to correct the parameter of the $i^{th}$ frame when the $i^{th}$ frame is a normal frame. FIG. 5 is a flowchart of a frame loss compensation processing method according to Embodiment 5 of the present disclosure. As shown in FIG. 5, the method provided in this embodiment may include the following steps.

Step 501: Obtain a parameter of an $i^{th}$ frame by means of decoding according to a received bitstream, where the parameter of the $i^{th}$ frame includes a spectrum frequency parameter, a pitch period, a gain, and an algebraic codebook.

Step 502: Generate an excitation signal of the $i^{th}$ frame and a status-updated excitation signal of the $i^{th}$ frame according to the pitch period, the gain, and the algebraic codebook that are of the $i^{th}$ frame and that are obtained by means of decoding.

The excitation signal includes an adaptive codebook contribution and an algebraic codebook contribution. The adaptive codebook contribution is obtained by multiplying an adaptive codebook by an adaptive codebook gain. The algebraic codebook contribution is obtained by multiplying an algebraic codebook by an algebraic codebook gain. The adaptive codebook is obtained by means of interpolation according to a pitch period and a status-updated excitation signal that are of a current frame. The algebraic codebook may be obtained by means of estimation using an existing method. The excitation signal is used for signal synthesis of the $i^{th}$ frame, and the status-updated excitation signal is used to generate an adaptive codebook of a next frame.

Step 503: If an $(i-1)^{th}$ frame or an $(i-2)^{th}$ frame is a lost frame, determine, according to at least one of inter-frame relationships or intra-frame relationships between the $i^{th}$ frame and first N frames of the $i^{th}$ frame, whether to correct at least one of the spectrum frequency parameter, the excitation signal, or the status-updated excitation signal of the $i^{th}$ frame.

The inter-frame relationship includes at least one of correlation between the $i^{th}$ frame and the first N frames of the $i^{th}$ frame or energy stability between the $i^{th}$ frame and the first N frames of the $i^{th}$ frame, and the intra-frame relationship includes at least one of inter-subframe correlation between the $i^{th}$ frame and the first N frames of the $i^{th}$ frame or inter-subframe energy stability between the $i^{th}$ frame and the first N frames of the $i^{th}$ frame. When it is determined to correct the at least one of the spectrum frequency parameter, the excitation signal, or the status-updated excitation signal of the $i^{th}$ frame, step 504 and step 506 are performed. When it is determined not to correct the spectrum frequency parameter, the excitation signal, or the status-updated excitation signal of the $i^{th}$ frame, step 505 is performed.

Step 504: Correct the at least one of the spectrum frequency parameter, the excitation signal, or the status-updated excitation signal of the $i^{th}$ frame according to the at least one of the inter-frame relationships or the intra-frame relationships between the $i^{th}$ frame and the first N frames of the $i^{th}$ frame. Step 506 is performed after step 504.

Step 505: Synthesize a signal of the $i^{th}$ frame according to the spectrum frequency parameter, the excitation signal, and the status-updated excitation signal of the $i^{th}$ frame.

Step 506: Synthesize a signal of the $i^{th}$ frame according to a correction result of the at least one of the spectrum frequency parameter, the excitation signal, or the status-updated excitation signal of the $i^{th}$ frame.

If only the spectrum frequency parameter of the $i^{th}$ frame is corrected, the signal of the $i^{th}$ frame is synthesized according to a corrected spectrum frequency parameter of the $i^{th}$ frame, the excitation signal that is of the $i^{th}$ frame and that is obtained by means of decoding, and the status-updated excitation signal that is of the $i^{th}$ frame and that is obtained by means of decoding. If only the excitation signal of the $i^{th}$ frame is corrected, the signal of the $i^{th}$ frame is synthesized according to a corrected excitation signal of the $i^{th}$ frame, the spectrum frequency parameter that is of the $i^{th}$ frame and that is obtained by means of decoding, and the status-updated excitation signal that is of the $i^{th}$ frame and that is obtained by means of decoding. If only the status-updated excitation signal of the $i^{th}$ frame is corrected, the signal of the $i^{th}$ frame is synthesized according to the corrected status-updated excitation signal of the $i^{th}$ frame, the spectrum frequency parameter that is of the $i^{th}$ frame and that is obtained by means of decoding, and the excitation signal that is of the $i^{th}$ frame and that is obtained by means of decoding. If the spectrum frequency parameter and the excitation signal of the $i^{th}$ frame are corrected, the signal of the $i^{th}$ frame is synthesized according to the corrected spectrum frequency parameter of the $i^{th}$ frame, the corrected excitation signal of the $i^{th}$ frame, and the status-updated excitation signal that is of the $i^{th}$ frame and that is obtained by means of decoding. If the spectrum frequency parameter and the status-updated excitation signal of the $i^{th}$ frame are corrected, the signal of the $i^{th}$ frame is synthesized according to a corrected spectrum frequency parameter of the $i^{th}$ frame, a corrected status-updated excitation signal of the $i^{th}$ frame, and the excitation signal that is of the $i^{th}$ frame and that is obtained by means of decoding. If the excitation signal and the status-updated excitation signal of the $i^{th}$ frame are corrected, the signal of the $i^{th}$ frame is synthesized according to a corrected excitation signal of the $i^{th}$ frame, a corrected status-updated excitation signal of the $i^{th}$ frame, and the spectrum frequency parameter that is of the $i^{th}$ frame and that is obtained by means of decoding. If the spectrum frequency parameter, the excitation signal, and the status-updated excitation signal of the $i^{th}$ frame are corrected, the signal of the $i^{th}$ frame is synthesized according to a corrected spectrum frequency parameter of the $i^{th}$ frame, a corrected excitation signal of the $i^{th}$ frame, and a corrected status-updated excitation signal of the $i^{th}$ frame.

It should be noted that, if both the $(i-1)^{th}$ frame and the $(i-2)^{th}$ frame are normal frames, the signal of the $i^{th}$ frame may be directly synthesized according to the parameter that is of the $i^{th}$ frame and that is obtained by means of decoding, with no need to correct the parameter of the $i^{th}$ frame. If the $(i-1)^{th}$ frame or the $(i-2)^{th}$ frame is a lost frame, there may be a particular deviation in a parameter that is of the $(i-1)^{th}$ frame or the $(i-2)^{th}$ frame and that is obtained by means of estimation, a relatively large change of inter-frame energy is subsequently caused, and a decoded voice signal is not stable from an overall perspective. Therefore, in this embodiment, a decoder corrects the at least one of the spectrum frequency parameter, the excitation signal, or the status-updated excitation signal of the $i^{th}$ frame according to the correlation between the $i^{th}$ frame and the first N frames of the $i^{th}$ frame and the energy stability between the $i^{th}$ frame and the first N frames of the $i^{th}$ frame, so that smooth transition of both overall energy between adjacent frames and energy on a same frequency band can be implemented.

(1) Correction of the Spectrum Frequency Parameter

The spectrum frequency parameter includes an ISF or an LSF. An ISF parameter is used in an example. The ISF parameter is obtained by weighting and converting an internet service provider (ISP) parameter of the $i^{th}$ frame and an ISP parameter of the $(i-1)^{th}$ frame. When the $(i-1)^{th}$ frame or the $(i-2)^{th}$ frame is a lost frame, there may be a particular deviation between a determined ISF parameter of the $i^{th}$ frame and a normal ISF parameter (an ISF parameter obtained when the $i^{th}$ frame is not lost) of the $i^{th}$ frame. Therefore, determined energy at a low-frequency formant location is much greater than actual energy.

In an implementation manner, whether to correct the spectrum frequency parameter of the $i^{th}$ frame may be determined according to correlation of the $i^{th}$ frame. When it is determined to correct the spectrum frequency parameter of the $i^{th}$ frame, the spectrum frequency parameter of the $i^{th}$ frame is corrected according to the spectrum frequency parameter of the $i^{th}$ frame and a spectrum frequency parameter of the $(i-1)^{th}$ frame, or the spectrum frequency parameter of the $i^{th}$ frame is corrected according to the spectrum frequency parameter of the $i^{th}$ frame and a preset spectrum frequency parameter of the $i^{th}$ frame. The correlation of the $i^{th}$ frame includes a value relationship between a sixth threshold and one of two spectrum frequency parameters corresponding to an index of a minimum value of a difference between adjacent spectrum frequency parameters of the $i^{th}$ frame, a value relationship between a seventh threshold and the minimum value of the difference between the adjacent spectrum frequency parameters of the $i^{th}$frame, and a value relationship between an eighth threshold and the index of the minimum value of the difference between the adjacent spectrum frequency parameters of the $i^{th}$ frame. In an implementation manner of the present disclosure, the sixth threshold may be selected from a numerical interval [500, 2000]. For example, the sixth threshold may be 500, 1000, or 2000. In an implementation manner of the present disclosure, the seventh threshold may be selected from a numerical interval [100, 1000]. For example, the seventh threshold may be 100, 200, 300, or 1000. In an implementation manner of the present disclosure, the eighth threshold may be selected from a numerical interval [1, 5]. For example, the eighth threshold may be 1, 2, or 5.

Correspondingly, the determining, according to correlation of the $i^{th}$ frame, whether to correct the spectrum frequency parameter of the $i^{th}$ frame is first, determining the difference between the adjacent spectrum frequency parameters of the $i^{th}$ frame, where each difference is corresponding to one index, spectrum frequency parameters are arranged in ascending order, and index values are also arranged in ascending order; then determining whether the difference between the adjacent spectrum frequency parameters of the $i^{th}$ frame meets at least one of a fourth condition or a fifth condition, where the fourth condition includes one of the two spectrum frequency parameters corresponding to the index of the minimum value of the difference between the adjacent spectrum frequency parameters of the $i^{th}$ frame is less than the sixth threshold, and the fifth condition includes an index value of the minimum value of the difference between the adjacent spectrum frequency parameters of the $i^{th}$ frame is less than the preset eighth threshold, and the minimum difference is less than the preset seventh threshold; and if the difference between the adjacent spectrum frequency parameters of the $i^{th}$ frame meets the at least one of the fourth condition or the fifth condition, determining to correct the spectrum frequency parameter of the $i^{th}$ frame, or if the difference between the adjacent spectrum frequency parameters of the $i^{th}$ frame does not meet the fourth condition or the fifth condition, determining not to correct the spectrum frequency parameter of the $i^{th}$ frame.

In another implementation manner, whether to correct the spectrum frequency parameter of the $i^{th}$ frame is determined according to correlation between the $i^{th}$ frame and the $(i-1)^{th}$ frame. When it is determined to correct the spectrum frequency parameter of the $i^{th}$ frame, the spectrum frequency parameter of the $i^{th}$ frame is corrected according to the spectrum frequency parameter of the $i^{th}$ frame and a spectrum frequency parameter of the $(i-1)^{th}$ frame, or the spectrum frequency parameter of the $i^{th}$ frame is corrected according to the spectrum frequency parameter of the $i^{th}$ frame and a preset spectrum frequency parameter of the $i^{th}$ frame. The correlation between the $i^{th}$ frame and the $(i-1)^{th}$ frame includes a value relationship between a ninth threshold and a sum of differences between spectrum frequency parameters corresponding to some or all same indexes of the $(i-1)^{th}$ frame and the $i^{th}$ frame. In an implementation manner of the present disclosure, the ninth threshold may be selected from a numerical interval [100, 2000]. For example, the ninth threshold may be 100, 200, 300, or 2000.

Correspondingly, the determining, according to correlation between the $i^{th}$ frame and the $(i-1)^{th}$ frame, whether to correct the spectrum frequency parameter of the $i^{th}$ frame is first, determining a difference between adjacent spectrum frequency parameters of the $i^{th}$ frame, where each difference is corresponding to one index; then determining whether the spectrum frequency parameter of the $i^{th}$ frame and the spectrum frequency parameter of the $(i-1)^{th}$ frame meet a sixth condition, where the sixth condition includes the sum of the differences between the spectrum frequency parameters corresponding to some or all same indexes of the $(i-1)^{th}$ frame and the $i^{th}$ frame is greater than the ninth threshold; and if the spectrum frequency parameter of the $i^{th}$ frame and the spectrum frequency parameter of the $(i-1)^{th}$ frame meet the sixth condition, determining to correct the spectrum frequency parameter of the $i^{th}$ frame, or if the spectrum frequency parameter of the $i^{th}$ frame and the spectrum frequency parameter of the $(i-1)^{th}$ frame do not meet the sixth condition, determining not to correct the spectrum frequency parameter of the $i^{th}$ frame.

In the foregoing two implementation manners, the correcting the spectrum frequency parameter of the $i^{th}$ frame according to the spectrum frequency parameter of the $i^{th}$ frame and a spectrum frequency parameter of the $(i-1)^{th}$ frame is determining a corrected spectrum frequency parameter of the $i^{th}$ frame according to a weighting operation performed on the spectrum frequency parameter of the $(i-1)^{th}$ frame and the spectrum frequency parameter of the $i^{th}$ frame. The correcting the spectrum frequency parameter of the $i^{th}$ frame according to the spectrum frequency parameter of the $i^{th}$ frame and a preset spectrum frequency parameter of the $i^{th}$ frame is determining a corrected spectrum frequency parameter of the $i^{th}$ frame according to a weighting operation performed on the spectrum frequency parameter of the $i^{th}$ frame and the preset spectrum frequency parameter of the $i^{th}$ frame.

An ISF parameter is used in an example. A difference between intra-frame adjacent ISF parameters of the $i^{th}$ frame may be represented as ISF_DIFF(i), and ISF_DIFF(i)=ISF(i+1)−ISF(i), i=0, 1, . . . , N−2, where N is an order of the ISF parameter. If an ISF parameter corresponding to an index of a minimum value of ISF_DIFF(i) of the $i^{th}$ frame is less than the sixth threshold (for example, 800), and the minimum value of ISF_DIFF (i) is less than the seventh threshold (for example, 200), or the sum of the differences between the spectrum frequency parameters corresponding to some or all same indexes of the $(i-1)^{th}$ frame and the $i^{th}$ frame is greater than the ninth threshold, an ISF parameter of the $i^{th}$ frame and an ISF parameter of the $(i-1)^{th}$ frame are weighted to determine and obtain the corrected ISF parameter of the $i^{th}$ frame; or an ISF parameter of the $i^{th}$ frame and a preset ISF parameter of the $i^{th}$ frame are weighted to obtain the corrected ISF parameter of the $i^{th}$ frame. That the sum of the differences between the spectrum frequency parameters corresponding to some or all same indexes of the $(i-1)^{th}$ frame and the $i^{th}$ frame is greater than the ninth threshold means that ISF parameter correlation between adjacent frames is low.

Figure 6A:
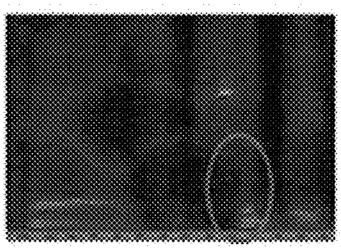
FIG. 6A, FIG. 6B and FIG. 6C are a before-correction and after-correction comparison diagram of a spectrogram of an ith frame.
Figure 6B:
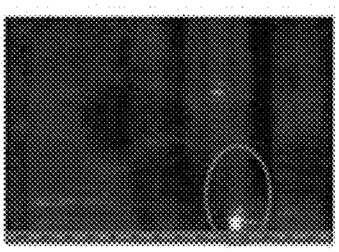
Figure 6C:
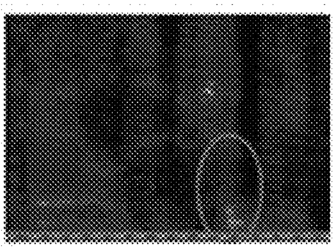

FIG. 6A, FIG. 6B and FIG. 6C are a before-correction and after-correction comparison diagram of a spectrogram of an $i^{th}$ frame. As shown in FIG. 6A, FIG. 6B and FIG. 6C, FIG. 6A is a spectrogram of an original signal, and the original signal is a signal sent by an encoder. FIG. 6B is a spectrogram of a synthesized signal in the prior art. FIG. 6C is a spectrogram of a synthesized signal according to the present disclosure. It can be learned by comparing FIG. 6A with FIG. 6B that a part in an ellipse in FIG. 6B is much brighter than a part in an ellipse of the original signal in FIG. 6A. That is, recovered energy of a low-frequency formant of the $i^{th}$ frame is much more than energy obtained by correct recovery. Apparently, an ISF parameter of the $i^{th}$ frame needs to be correspondingly corrected, so that energy at a formant location of the $i^{th}$ frame is closer to actual energy, to achieve an effect shown in FIG. 6C.

(2) Correction of the Excitation Signal

There is a particular deviation between an estimated pitch period of a lost frame and an actual pitch period of the lost frame. Therefore, when an adaptive codebook of the $i^{th}$ frame is obtained by means of interpolation using an excitation signal of the $(i-1)^{th}$ frame, the adaptive codebook of the $i^{th}$ frame has excessively strong periodicity, and when de-emphasis processing is performed on the excitation signal of the $i^{th}$ frame using a linear predictive coding (LPC) synthesis filter and a synthesized signal of the $i^{th}$ frame, obtained energy is much more than actual energy of a synthesized signal. Apparently, this may affect a normal frame following a lost frame (sometimes one or two frames following the lost frame are affected, and sometimes more frames may be affected if periodicity of an excitation signal is excessively strong). In this case, an excitation signal and/or a status-updated excitation signal need/needs to be corrected to some extent, so that energy of a synthesized signal is close to actual energy.

In a first implementation manner, whether to correct the excitation signal of the $i^{th}$ frame is determined according to correlation between the $i^{th}$ frame and the $(i-1)^{th}$ frame and energy stability between the $i^{th}$ frame and the $(i-1)^{th}$ frame. When it is determined to correct the excitation signal of the $i^{th}$ frame, the excitation signal of the $i^{th}$ frame is corrected according to the energy stability between the $i^{th}$ frame and the $(i-1)^{th}$ frame.

A pre-synthesized signal of the $i^{th}$ frame is first determined according to the excitation signal of the $i^{th}$ frame and the spectrum frequency parameter of the $i^{th}$ frame. Then whether an absolute value of a difference between energy of the pre-synthesized signal of the $i^{th}$ frame and energy of a synthesized signal of the $(i-1)^{th}$ frame is greater than a tenth threshold is determined. If the absolute value of the difference between the energy of the pre-synthesized signal of the $i^{th}$ frame and the energy of the synthesized signal of the $(i-1)^{th}$ frame is greater than the tenth threshold, it is determined to correct the excitation signal of the $i^{th}$ frame, or if the absolute value of the difference between the energy of the pre-synthesized signal of the $i^{th}$ frame and the energy of the synthesized signal of the $(i-1)^{th}$ frame is less than or equal to the tenth threshold, it is determined not to correct the excitation signal of the $i^{th}$ frame. Specifically, in an implementation manner of the present disclosure, the tenth threshold may be 0.2 to 1 times a smaller value in the energy of the pre-synthesized signal of the $i^{th}$ frame and the energy of the synthesized signal of the $(i-1)^{th}$ frame. For example, the tenth threshold may be 0.2, 0.5, or 1 times the smaller value.

Alternatively, whether a ratio of energy of the pre-synthesized signal of the $i^{th}$ frame to energy of a synthesized signal of the $(i-1)^{th}$ frame is greater than an eleventh threshold is determined, where the eleventh threshold is greater than 1. If the ratio of the energy of the pre-synthesized signal of the $i^{th}$ frame to the energy of the synthesized signal of the $(i-1)^{th}$ frame is greater than the eleventh threshold, it is determined to correct the excitation signal of the $i^{th}$ frame, or if the ratio of the energy of the pre-synthesized signal of the $i^{th}$ frame to the energy of the synthesized signal of the $(i-1)^{th}$ frame is less than or equal to the eleventh threshold, it is determined not to correct the excitation signal of the $i^{th}$ frame. In an implementation manner of the present disclosure, the eleventh threshold may be selected from a numerical interval [1.1, 5]. For example, the eleventh threshold may be specifically 1.1, 1.25, 2, 2.5, or 5.

Alternatively, whether a ratio of energy of a pre-synthesized signal of the $(i-1)^{th}$ frame to energy of a synthesized signal of the $i^{th}$ frame is less than a twelfth threshold, where the twelfth threshold is less than 1. If the ratio of the energy of the pre-synthesized signal of the $(i-1)^{th}$ frame to the energy of the synthesized signal of the $i^{th}$ frame is less than the twelfth threshold, it is determined to correct the excitation signal of the $i^{th}$ frame, or if the ratio of the energy of the pre-synthesized signal of the $(i-1)^{th}$ frame to the energy of the synthesized signal of the $i^{th}$ frame is greater than or equal to the twelfth threshold, it is determined not to correct the excitation signal of the $i^{th}$ frame. In an implementation manner of the present disclosure, the twelfth threshold may be selected from a numerical interval [0.1, 0.8]. For example, the twelfth threshold may be specifically 0.1, 0.3, 0.4, or 0.8.

Correspondingly, the correcting the excitation signal of the $i^{th}$ frame according to the energy stability between the $i^{th}$ frame and the $(i-1)^{th}$ frame is first, determining a second correction factor according to the energy stability between the $i^{th}$ frame and the $(i-1)^{th}$ frame, where the second correction factor is less than 1; and then multiplying the excitation signal of the $i^{th}$ frame by the second correction factor to obtain a corrected excitation signal of the $i^{th}$ frame.

The determining a second correction factor according to the energy stability between the $i^{th}$ frame and the $(i-1)^{th}$ frame is determining that a ratio of energy of the $(i-1)^{th}$ frame to energy of the $i^{th}$ frame is the second correction factor; or determining that a ratio of energy of a same quantity of subframes of the $(i-1)^{th}$ frame and the $i^{th}$ frame is the second correction factor. Preferably, the same quantity of subframes of the $(i-1)^{th}$ frame and the $i^{th}$ frame are consecutive. For example, last two subframes of the $(i-1)^{th}$ frame and first two subframes of the $i^{th}$ frame are selected to determine an energy ratio. Certainly, selected subframes may be non-consecutive.

In a second implementation manner, whether to correct the excitation signal of the $i^{th}$ frame is determined according to correlation of a signal of the $(i-1)^{th}$ frame. When it is determined to correct the excitation signal of the $i^{th}$ frame, the excitation signal of the $i^{th}$ frame is corrected according to energy stability between the $i^{th}$ frame and the $(i-1)^{th}$ frame. The correlation of the signal of the $(i-1)^{th}$ frame includes a value relationship between a thirteenth threshold and a correlation value of the signal of the $(i-1)^{th}$ frame, and a value relationship between a fourteenth threshold and a deviation of a pitch period of the signal of the $(i-1)^{th}$ frame.

Correspondingly, the determining, according to correlation of a signal of the $(i-1)^{th}$ frame, whether to correct the excitation signal of the $i^{th}$ frame is determining whether the signal of the $(i-1)^{th}$ frame meets a seventh condition, where the seventh condition is the $(i-1)^{th}$ frame is a lost frame, the correlation value of the signal of the $(i-1)^{th}$ frame is greater than the thirteenth threshold, and the deviation of the pitch period of the signal of the $(i-1)^{th}$ frame is less than the fourteenth threshold; and if the signal of the $(i-1)^{th}$ frame meets the seventh condition, determining to correct the excitation signal of the $i^{th}$ frame, or if the signal of the $(i-1)^{th}$ frame does not meet the seventh condition, determining not to correct the excitation signal of the $i^{th}$ frame. The correcting the excitation signal of the $i^{th}$ frame according to energy stability between the $i^{th}$ frame and the $(i-1)^{th}$ frame is determining a third correction factor according to the energy stability between the $i^{th}$ frame and the $(i-1)^{th}$ frame, where the third correction factor is less than 1; and multiplying the excitation signal of the $i^{th}$ frame by the third correction factor to obtain a corrected excitation signal of the $i^{th}$ frame. In an implementation manner of the present disclosure, the thirteenth threshold may be selected from a low-correlation falling edge to a high-correlation rising edge. For example, the thirteenth threshold may be the low-correlation falling edge or the high-correlation rising edge. In an implementation manner of the present disclosure, the fourteenth threshold may be selected from a numerical interval [0.5, 20]. For example, the fourteenth threshold may be specifically 0.5, 2, 5, 10, or 20.

In a third implementation manner, whether to correct the excitation signal of the $i^{th}$ frame is determined according to correlation between the signal of the $i^{th}$ frame and a signal of the $(i-1)^{th}$ frame. When it is determined to correct the excitation signal of the $i^{th}$ frame, the excitation signal of the $i^{th}$ frame is corrected according to energy stability between the $i^{th}$ frame and the $(i-1)^{th}$ frame. The correlation between the signal of the $i^{th}$ frame and the signal of the $(i-1)^{th}$ frame includes a value relationship between a thirteenth threshold and a correlation value of the signal of the $(i-1)^{th}$ frame, and a value relationship between a fourteenth threshold and a deviation of a pitch period of the signal of the $i^{th}$ frame.

Correspondingly, the determining, according to correlation between the signal of the $i^{th}$ frame and a signal of the $(i-1)^{th}$ frame, whether to correct the excitation signal of the $i^{th}$ frame is determining whether the signal of the $(i-1)^{th}$ frame and the signal of the $i^{th}$ frame meet an eighth condition, where the eighth condition includes the $(i-1)^{th}$ frame is a lost frame, the correlation value of the signal of the $(i-1)^{th}$ frame is greater than the thirteenth threshold, and the deviation of the pitch period of the signal of the $i^{th}$ frame is less than the fourteenth threshold; and if the signal of the $(i-1)^{th}$ frame and the signal of the $i^{th}$ frame meet the eighth condition, determining to correct the excitation signal of the $i^{th}$ frame, or if the signal of the $(i-1)^{th}$ frame and the signal of the $(i)^{th}$ frame do not meet the eighth condition, determining not to correct the excitation signal of the $i^{th}$ frame. The correcting the excitation signal of the $i^{th}$ frame according to energy stability between the $i^{th}$ frame and the $(i-1)^{th}$ frame is determining a third correction factor according to the energy stability between the $i^{th}$ frame and the $(i-1)^{th}$ frame, where the third correction factor is less than 1; and then multiplying the excitation signal of the $i^{th}$ frame by the third correction factor to obtain a corrected excitation signal of the $i^{th}$ frame.

The determining a third correction factor according to the energy stability between the $i^{th}$ frame and the $(i-1)^{th}$ frame may be determining that a ratio of energy of the $(i-1)^{th}$ frame to energy of the $i^{th}$ frame is a third correction factor; or determining that a ratio of energy of a same quantity of subframes of the $(i-1)^{th}$ frame and the $i^{th}$ frame is the third correction factor.

In a fourth implementation manner, whether to correct the excitation signal of the $i^{th}$ frame is determined according to correlation between a signal of the $(i-1)^{th}$ frame and a signal of the $(i-2)^{th}$ frame. When it is determined to correct the excitation signal of the $i^{th}$ frame, the excitation signal of the $i^{th}$ frame is corrected according to energy stability between the $i^{th}$ frame and the $(i-1)^{th}$ frame. The correlation between the signal of the $(i-1)^{th}$ frame and the signal of the $(i-2)^{th}$ frame includes a value relationship between a thirteenth threshold and a correlation value of the signal of the $(i-2)^{th}$ frame, and whether an excitation signal of the $(i-1)^{th}$ frame is corrected.

Correspondingly, the determining, according to correlation between a signal of the $(i-1)^{th}$ frame and a signal of the $(i-2)^{th}$ frame, whether to correct the excitation signal of the $i^{th}$ frame is determining whether the signal of the $(i-2)^{th}$ frame and the signal of the $(i-1)^{th}$ frame meet a ninth condition, where the ninth condition includes the $(i-2)^{th}$ frame is a lost frame, the correlation value of the signal of the $(i-2)^{th}$ frame is greater than the preset thirteenth threshold, and the excitation signal of the $(i-1)^{th}$ frame is corrected; and if the signal of the $(i-2)^{th}$ frame and the signal of the $(i-1)^{th}$ frame meet the ninth condition, determining to correct the excitation signal of the $i^{th}$ frame, or if the signal of the $(i-2)^{th}$ frame and the signal of the $(i-1)^{th}$ frame do not meet the ninth condition, determining not to correct the excitation signal of the $i^{th}$ frame. The correcting the excitation signal of the $i^{th}$ frame according to energy stability between the $i^{th}$ frame and the $(i-1)^{th}$ frame is determining a fourth correction factor according to the energy stability between the $i^{th}$ frame and the $(i-1)^{th}$ frame, where the fourth correction factor is less than 1; and then multiplying the excitation signal of the $i^{th}$ frame by the fourth correction factor to obtain a corrected excitation signal of the $i^{th}$ frame.

In a fifth implementation manner, whether to correct the excitation signal of the $i^{th}$ frame is determined according to correlation between a signal of the $(i-1)^{th}$ frame and a signal of the $(i-2)^{th}$ frame. When it is determined to correct the excitation signal of the $i^{th}$ frame, the excitation signal of the $i^{th}$ frame is corrected according to energy stability between the $i^{th}$ frame and the $(i-1)^{th}$ frame. The correlation between the signal of the $(i-1)^{th}$ frame and the signal of the $(i-2)^{th}$ frame includes a value relationship between a thirteenth threshold and a correlation value of the signal of the $(i-2)^{th}$ frame, and a value relationship between a fifteenth threshold and an algebraic codebook contribution of an excitation signal of the $(i-1)^{th}$ frame. In an implementation manner of the present disclosure, the fifteenth threshold may be selected from 0.1 to 0.5 times the excitation signal of the $(i-1)^{th}$ frame. For example, the fifteenth threshold may be specifically 0.1, 0.2, or 0.5 times the excitation signal of the $(i-1)^{th}$ frame.

Correspondingly, the determining, according to correlation between a signal of the $(i-1)^{th}$ frame and a signal of the $(i-2)^{th}$ frame, whether to correct the excitation signal of the $i^{th}$ frame is determining whether the signal of the $(i-2)^{th}$ frame and the signal of the $(i-1)^{th}$ frame meet a tenth condition, where the tenth condition includes the $(i-2)^{th}$ frame is a lost frame, the correlation value of the signal of the $(i-2)^{th}$ frame is greater than the thirteenth threshold, and the algebraic codebook contribution of the excitation signal of the $(i-1)^{th}$ frame is less than the fifteenth threshold; and if the signal of the $(i-2)^{th}$ frame and the signal of the $(i-1)^{th}$ frame meet the tenth condition, determining to correct the excitation signal of the $i^{th}$ frame, or if the signal of the $(i-2)^{th}$ frame and the signal of the $(i-1)^{th}$ frame do not meet the tenth condition, determining not to correct the excitation signal of the $i^{th}$ frame. The correcting the excitation signal of the $i^{th}$ frame according to energy stability between the $i^{th}$ frame and the $(i-1)^{th}$ frame is determining a fourth correction factor according to the energy stability between the $i^{th}$ frame and the $(i-1)^{th}$ frame, where the fourth correction factor is less than 1; and then multiplying the excitation signal of the $i^{th}$ frame by the fourth correction factor to obtain a corrected excitation signal of the $i^{th}$ frame.

Figure 7A:
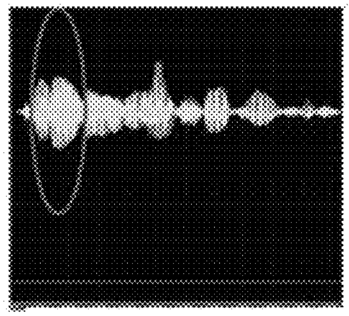
FIG. 7A, FIG. 7B and FIG. 7C are a before-correction and after-correction comparison diagram of a time-domain signal of an ith frame.
Figure 7B:
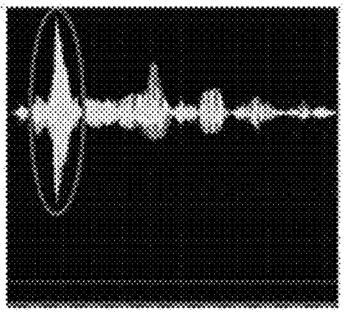
Figure 7C:
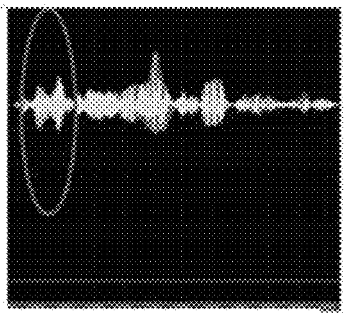

FIG. 7A, FIG. 7B and FIG. 7C are a before-correction and after-correction comparison diagram of a time-domain signal of an $i^{th}$ frame. As shown in FIG. 7A, FIG. 7B and FIG. 7C, FIG. 7A shows an original time-domain signal, and the original time-domain signal is a time-domain signal sent by an encoder. FIG. 7B is a synthesized time-domain signal in the prior art. FIG. 7C is a synthesized time-domain signal according to the present disclosure. It can be learned by comparing FIG. 7A with FIG. 7B that energy in a part of an ellipse in FIG. 7B is much more than that in a part of an ellipse of the original signal in FIG. 7A. Apparently, an excitation signal or a status-updated excitation signal of the $i^{th}$ frame needs to be corrected, so that energy of a recovered signal of the $i^{th}$ frame is closer to energy of the original signal, to achieve an effect shown in FIG. 7C.

(3) Correction of the Status-Updated Excitation Signal

In this embodiment, whether to correct the status-updated excitation signal of the $i^{th}$ frame may be determined according to correlation between a signal of the $(i-1)^{th}$ frame and the signal of the $i^{th}$ frame. When it is determined to correct the status-updated excitation signal of the $i^{th}$ frame, the status-updated excitation signal of the $i^{th}$ frame is corrected according to energy stability between the $i^{th}$ frame and the $(i-1)^{th}$ frame. The correlation between the signal of the $(i-1)^{th}$ frame and the signal of the $i^{th}$ frame includes correlation between the $(i-1)^{th}$ frame and the $i^{th}$ frame, and whether an excitation signal of the $(i-1)^{th}$ frame is corrected.

Correspondingly, the determining, according to correlation between a signal of the $(i-1)^{th}$ frame and the signal of the $i^{th}$ frame, whether to correct the status-updated excitation signal of the $i^{th}$ frame is determining whether the signal of the $i^{th}$ frame and the signal of the $(i-1)^{th}$ frame meet an eleventh condition, where the eleventh condition includes the $i^{th}$ frame or the $(i-1)^{th}$ frame is a highly-correlated frame, and the excitation signal of the $(i-1)^{th}$ frame is corrected; and if the signal of the $i^{th}$ frame and the signal of the $(i-1)^{th}$ frame meet the eleventh condition, determining to correct the status-updated excitation signal of the $i^{th}$ frame, or if the signal of the $i^{th}$ frame and the signal of the $(i-1)^{th}$ frame do not meet the eleventh condition, determining not to correct the status-updated excitation signal of the $i^{th}$ frame. The correcting the status-updated excitation signal of the $i^{th}$ frame according to energy stability between the $i^{th}$ frame and the $(i-1)^{th}$ frame is determining a fifth correction factor according to the energy stability between the $i^{th}$ frame and the $(i-1)^{th}$ frame, where the fifth correction factor is less than 1; and multiplying the status-updated excitation signal of the $i^{th}$ frame by the fifth correction factor to obtain a corrected status-updated excitation signal of the $i^{th}$ frame.

In this embodiment, if an $i^{th}$ frame is a normal frame, a parameter of the $i^{th}$ frame is obtained by means of decoding according to a received bitstream, and an excitation signal and a status-updated excitation signal of the $i^{th}$ frame are generated according to a pitch period, a gain, and an algebraic codebook that are of the $i^{th}$ frame and that are obtained by means of decoding. If an $(i-1)^{th}$ frame or an $(i-2)^{th}$ frame is a lost frame, at least one of a spectrum frequency parameter, the excitation signal, or the status-updated excitation signal of the $i^{th}$ frame is further corrected according to inter-frame relationships and intra-frame relationships between the $i^{th}$ frame and first N frames of the $i^{th}$ frame, and a signal of the $i^{th}$ frame is synthesized according to a corrected parameter. According to the method in this embodiment, the at least one of the spectrum frequency parameter, the excitation signal, or the status-updated excitation signal of the $i^{th}$ frame is corrected, so that smooth transition of overall energy between adjacent frames can be implemented, and voice signal decoding quality can be improved.

Figure 8:
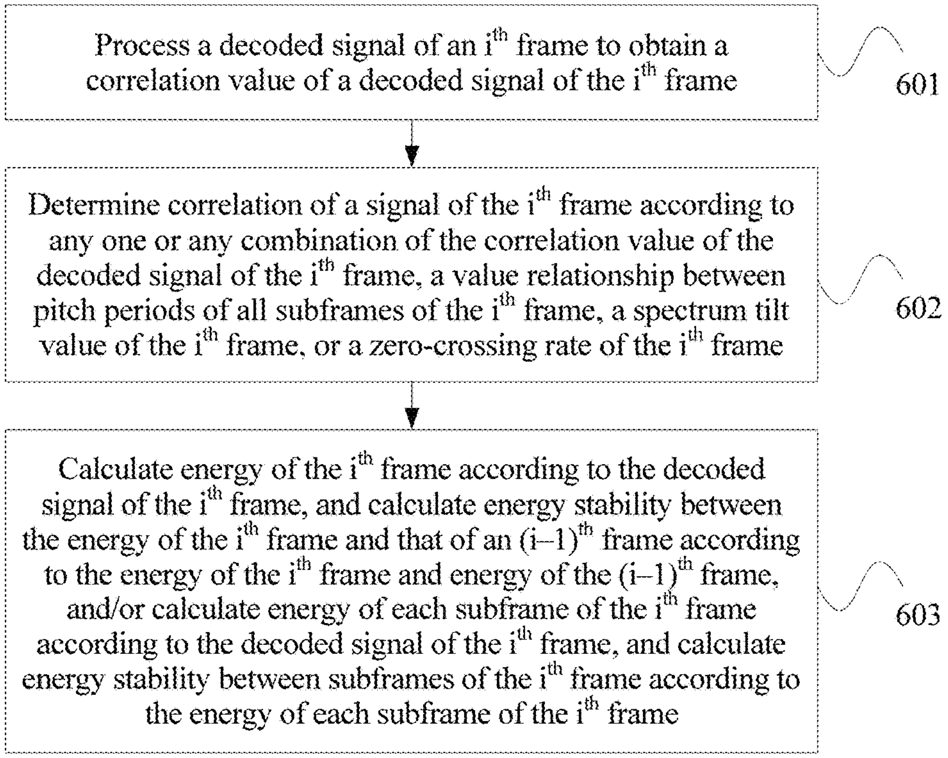
FIG. 8 is a flowchart of a frame loss compensation processing method according to Embodiment 6 of the present disclosure.

FIG. 8 is a flowchart of a frame loss compensation processing method according to Embodiment 6 of the present disclosure. As shown in FIG. 8, based on Embodiment 5, the method in this embodiment may further include the following steps.

Step 601: Process a decoded signal of an $i^{th}$ frame to obtain a correlation value of the decoded signal of the $i^{th}$ frame.

In an implementation manner, normalized autocorrelation processing may be performed on the decoded signal of the $i^{th}$ frame. The decoded signal of the $i^{th}$ frame is normalized to a particular range by means of normalized autocorrelation processing, and may be processed using an existing normalized autocorrelation function. In another implementation manner, autocorrelation processing rather than normalized processing is directly performed on the decoded signal of the $i^{th}$ frame. For example, 100 points are sampled from the decoded signal of the $i^{th}$ frame, and then autocorrelation processing is performed on points 0 to 98 and points 1 to 99 to obtain the correlation value of the decoded signal of the $i^{th}$ frame. Certainly, 50 points may be selected from each of a signal of an $(i-1)^{th}$ frame and a signal of the $i^{th}$ frame, and there are 100 points in total. Then, autocorrelation processing is performed in the foregoing manner to obtain the correlation value of the decoded signal of the $i^{th}$ frame.

Step 602: Determine correlation of a signal of the $i^{th}$ frame according to any one or any combination of the correlation value of the decoded signal of the $i^{th}$ frame, a value relationship between pitch periods of all subframes of the $i^{th}$ frame, a spectrum tilt value of the $i^{th}$ frame, or a zero-crossing rate of the $i^{th}$ frame.

For example, when the correlation of the signal of the $i^{th}$ frame is determined according to the correlation value of the decoded signal of the $i^{th}$ frame, a threshold is usually set. If a correlation value of the decoded signal of the $i^{th}$ frame is greater than the threshold, it is determined that the correlation of the signal of the $i^{th}$ frame is high, or if a correlation value of the decoded signal of the $i^{th}$ frame is less than the threshold, it is determined that the correlation of the signal of the $i^{th}$ frame is low.

Step 603: Determine energy of the $i^{th}$ frame according to the decoded signal of the $i^{th}$ frame, and determine energy stability between the energy of the $i^{th}$ frame and that of an $(i-1)^{th}$ frame according to the energy of the $i^{th}$ frame and energy of the $(i-1)^{th}$ frame, and/or determine energy of each subframe of the $i^{th}$ frame according to the decoded signal of the $i^{th}$ frame, and determine energy stability between subframes of the $i^{th}$ frame according to the energy of each subframe of the $i^{th}$ frame.

In this embodiment, to estimate a signal of an (i+1) frame, signal correlation and energy stability between an $i^{th}$ frame and an $(i-1)^{th}$ frame and/or intra-frame energy stability of the $i^{th}$ frame are determined. In this embodiment, when a parameter of each frame is estimated, correlation and energy stability that are of a previous frame are used.

Figure 9:
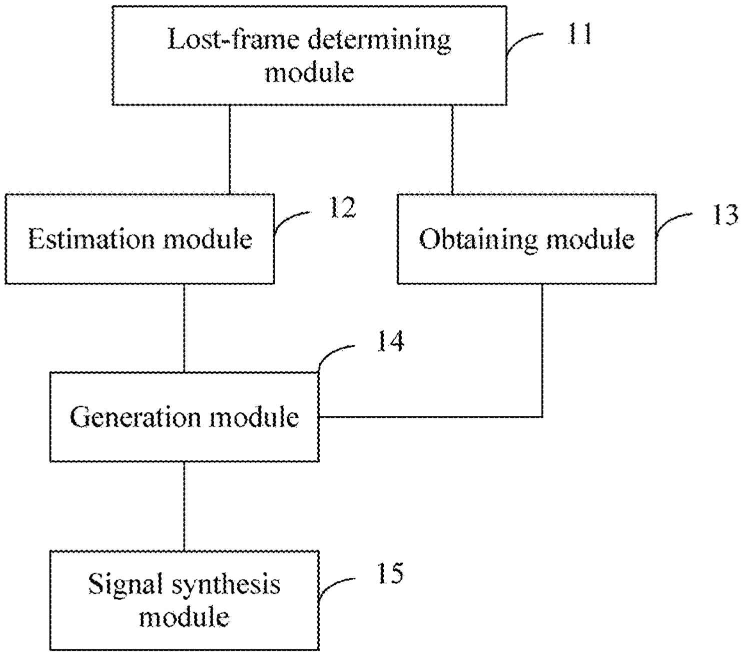
FIG. 9 is a schematic structural diagram of a frame loss compensation processing apparatus according to Embodiment 7 of the present disclosure.

FIG. 9 is a schematic structural diagram of a frame loss compensation processing apparatus according to Embodiment 7 of the present disclosure. As shown in FIG. 9, the frame loss compensation processing apparatus provided in this embodiment includes a lost-frame determining module 11, an estimation module 12, an obtaining module 13, a generation module 14, and a signal synthesis module 15.

The lost-frame determining module 11 is configured to determine, using a lost-frame flag bit, whether an $i^{th}$ frame is a lost frame.

The estimation module 12 is configured to, when the $i^{th}$ frame is a lost frame, estimate a parameter of the $i^{th}$ frame according to at least one of an inter-frame relationship between first N frames of the $i^{th}$ frame or an intra-frame relationship between first N frames of the $i^{th}$ frame. The inter-frame relationship between the first N frames includes at least one of correlation between the first N frames or energy stability between the first N frames. The intra-frame relationship between the first N frames includes at least one of inter-subframe correlation between the first N frames or inter-subframe energy stability between the first N frames. The parameter of the $i^{th}$ frame includes a spectrum frequency parameter, a pitch period, and a gain, and N is an integer greater than or equal to 1.

The obtaining module 13 is configured to obtain an algebraic codebook of the $i^{th}$ frame.

The generation module 14 is configured to generate an excitation signal of the $i^{th}$ frame according to the pitch period and the gain that are of the $i^{th}$ frame and that are obtained by the estimation module by means of estimation and the algebraic codebook that is of the $i^{th}$ frame and that is obtained by the obtaining module.

The signal synthesis module 15 is configured to synthesize a signal of the $i^{th}$ frame according to the spectrum frequency parameter that is of the $i^{th}$ frame and that is obtained by the estimation module by means of estimation and the excitation signal that is of the $i^{th}$ frame and that is generated by the generation module.

(1) Estimation of the Spectrum Frequency Parameter of the $i^{th}$ Frame

The spectrum frequency parameter of the $i^{th}$ frame is obtained by the estimation module 12 by means of estimation according to the inter-frame relationship between the first N frames of the $i^{th}$ frame. The estimation module is configured to determine a weight of a spectrum frequency parameter of an $(i-1)^{th}$ frame and a weight of a preset spectrum frequency parameter of the $i^{th}$ frame according to the correlation between the first N frames of the $i^{th}$ frame; and perform a weighting operation on the spectrum frequency parameter of the $(i-1)^{th}$ frame and the preset spectrum frequency parameter of the $i^{th}$ frame according to the weight of the spectrum frequency parameter of the $(i-1)^{th}$ frame and the weight of the preset spectrum frequency parameter of the $i^{th}$ frame, to obtain the spectrum frequency parameter of the $i^{th}$ frame.

Optionally, the correlation includes a value relationship between a second threshold and a spectrum tilt parameter of a signal of the $(i-1)^{th}$ frame, a value relationship between a first threshold and a normalized autocorrelation value of the signal of the $(i-1)^{th}$ frame, and a value relationship between a third threshold and a deviation of a pitch period of the signal of the $(i-1)^{th}$ frame.

Correspondingly, the estimation module 12 is configured to, if the signal of the $(i-1)^{th}$ frame meets at least one of a first condition, a second condition, and a third condition, determine that the weight of the spectrum frequency parameter of the $(i-1)^{th}$ frame is a first weight, and the weight of the preset spectrum frequency parameter of the $i^{th}$ frame is a second weight, where the first weight is greater than the second weight, the first condition is the normalized autocorrelation value of the signal of the $(i-1)^{th}$ frame is greater than the first threshold, the second condition is the spectrum tilt parameter of the signal of the $(i-1)^{th}$ frame is greater than the second threshold, and the third condition is the deviation of the pitch period of the signal of the $(i-1)^{th}$ frame is less than the third threshold; or if the signal of the $(i-1)^{th}$ frame does not meet a first condition, a second condition, or a third condition, determine that the weight of the spectrum frequency parameter of the $(i-1)^{th}$ frame is a second weight, and the weight of the preset spectrum frequency parameter of the $i^{th}$ frame is a first weight, wherein the first weight is greater than the second weight.

(2) Estimation of the Pitch Period of the $i^{th}$ Frame

The pitch period of the $i^{th}$ frame is obtained by the estimation module 12 by means of estimation according to the correlation between the first N frames of the $i^{th}$ frame and the inter-subframe correlation between the first N frames of the $i^{th}$ frame. The correlation includes a value relationship between a fifth threshold and a normalized autocorrelation value of a signal of an $(i-2)^{th}$ frame, a value relationship between a fourth threshold and a deviation of a pitch period of the signal of the $(i-2)^{th}$ frame, and a value relationship between the fourth threshold and a deviation of a pitch period of a signal of an $(i-1)^{th}$ frame.

Correspondingly, the estimation module 12 is configured to, if the deviation of the pitch period of the signal of the $(i-1)^{th}$ frame is less than the fourth threshold, determine a pitch period deviation value of the signal of the $(i-1)^{th}$ frame according to the pitch period of the signal of the $(i-1)^{th}$ frame, and determine a pitch period of the signal of the $i^{th}$ frame according to the pitch period deviation value of the signal of the $(i-1)^{th}$ frame and the pitch period of the signal of the $(i-1)^{th}$ frame, where the pitch period of the signal of the $i^{th}$ frame includes a pitch period of each subframe of the $i^{th}$ frame, and the pitch period deviation value of the signal of the $(i-1)^{th}$ frame is an average value of differences between pitch periods of all adjacent subframes of the $(i-1)^{th}$ frame; or if the deviation of the pitch period of the signal of the (i−1)$^{th}$ frame is greater than or equal to the fourth threshold, the normalized autocorrelation value of the signal of the (i−2)$^{th}$ frame is greater than the fifth threshold, and the deviation of the pitch period of the signal of the (i−2)$^{th}$ frame is less than the fourth threshold, determine a pitch period deviation value of the signal of the (i−2)$^{th}$ frame and the signal of the (i−1)$^{th}$ frame according to the pitch period of the signal of the (i−2)$^{th}$ frame and the pitch period of the signal of the (i−1)$^{th}$ frame, and determine a pitch period of the signal of the i$^{th}$ frame according to the pitch period of the signal of the (i−1)$^{th}$ frame and the pitch period deviation value of the signal of the (i−2)$^{th}$ frame and the signal of the (i−1)$^{th}$ frame.

Optionally, the estimation module 12 determines the pitch period deviation value pv of the signal of the (i−1)$^{th}$ frame according to the following formula:

$$pv=(p^{(-1)}(3)-p^{(-1)}(2))+(p^{(-1)}(2)-p^{(-1)}(1))+(p^{(-1)}(1)-p^{(-1)}(0))/3,$$

where $p^{(-1)}(j)$ is a pitch period of a j$^{th}$ subframe of the (i−1)$^{th}$ frame, and j=0, 1, 2, 3.

Correspondingly, the estimation module 12 determines the pitch period of the signal of the i$^{th}$ frame according to the following formula:

$$p_{cur}(j)=p^{(-1)}(3)+(j+1)*pv,j=0,1,2,3,$$

where $p^{(-1)}(3)$ is a pitch period of a third subframe of the (i−1)$^{th}$ frame, frame, pv is the pitch period deviation value of the signal of the (i−1)$^{th}$ frame, and $p_{cur}(j)$ is a pitch period of a j$^{th}$ subframe of the i$^{th}$ frame.

Optionally, the estimation module 12 determines the pitch period deviation value pv of the signal of the (i−2)$^{th}$ frame and the signal of the (i−1)$^{th}$ frame according to the following formula:

$$pv=(p^{(-2)}(3)-p^{(-2)}(2))+(p^{(-1)}(0)-p^{(-2)}(3))+(p^{(-1)}(1)-p^{(-1)}(1))/3,$$

where $p^{(-2)}(m)$ is a pitch period of an m$^{th}$ subframe of the (i−2)$^{th}$ frame, $p^{(-1)}(n)$ is a pitch period of an n$^{th}$ subframe of the (i−1)$^{th}$ frame, m=2, 3, and n=0, 1.

Correspondingly, the estimation module 12 determines the pitch period of the signal of the i$^{th}$ frame according to the following formula:

$$p_{cur}(x)=p^{(-1)}(3)+(x+1)*pv,x=0,1,2,3,$$

where $p^{(-1)}(3)$ is a pitch period of a third subframe of the (i−1)$^{th}$ frame, frame, pv is the pitch period deviation value of the signal of the (i−2)$^{th}$ frame and the signal of the (i−1)$^{th}$ frame, and $p_{cur}(x)$ is a pitch period of an x$^{th}$ subframe of the i$^{th}$ frame.

(3) Estimation of the Gain of the i$^{th}$ Frame

The gain of the i$^{th}$ frame includes an adaptive codebook gain and an algebraic codebook gain, and the gain of the i$^{th}$ frame is obtained by the estimation module 12 by means of estimation according to the correlation between the first N frames of the i$^{th}$ frame and the energy stability between the first N frames of the i$^{th}$ frame.

The estimation module 12 is configured to determine the adaptive codebook gain of the i$^{th}$ frame according to an adaptive codebook gain of an (i−1)$^{th}$ frame or a preset fixed value, correlation of the (i−1)$^{th}$ frame, and a sequence number of the i$^{th}$ frame in multiple consecutive lost frames; determine a weight of an algebraic codebook gain of the (i−1)$^{th}$ frame and a weight of a gain of a voice activity detection VAD frame according to energy stability of the (i−1)$^{th}$ frame; and perform a weighting operation on the algebraic codebook gain of the (i−1)$^{th}$ frame and the gain of the VAD frame according to the weight of the algebraic codebook gain of the (i−1)$^{th}$ frame and the weight of the gain of the VAD frame, to obtain the algebraic codebook gain of the i$^{th}$ frame.

More stable energy of the (i−1)$^{th}$ frame indicates a larger weight of the algebraic codebook gain of the (i−1)$^{th}$ frame, or the weight of the gain of the VAD frame correspondingly increases as a quantity of consecutive lost frames increases.

Optionally, before the performing a weighting operation on the algebraic codebook gain of the (i−1)$^{th}$ frame and the gain of the VAD frame according to the weight of the algebraic codebook gain of the (i−1)$^{th}$ frame and the weight of the gain of the VAD frame, to obtain the algebraic codebook gain of the i$^{th}$ frame, the estimation module 12 is further configured to determine a first correction factor according to an encoding and decoding rate; and correct the algebraic codebook gain of the (i−1)$^{th}$ frame using the first correction factor.

(4) Obtaining of the Algebraic Codebook of the i$^{th}$ Frame

The obtaining module 12 is configured to obtain the algebraic codebook of the i$^{th}$ frame by means of estimation according to random noise; or determine the algebraic codebook of the i$^{th}$ frame according to algebraic codebooks of the first N frames of the i$^{th}$ frame.

The obtaining module 12 is further configured to determine a weight of an algebraic codebook contribution of the i$^{th}$ frame according to any one of a deviation of a pitch period of an (i−1)$^{th}$ frame, correlation of a signal of the (i−1)$^{th}$ frame, a spectrum tilt rate value of the (i−1)$^{th}$ frame, or a zero-crossing rate of an (i−1)$^{th}$ frame, or determine a weight of an algebraic codebook contribution of the i$^{th}$ frame by performing a weighting operation on any combination of a deviation of a pitch period of the (i−1)$^{th}$ frame, correlation of a signal of the (i−1)$^{th}$ frame, a spectrum tilt rate value of the (i−1)$^{th}$ frame, or a zero-crossing rate of the (i−1)$^{th}$ frame; and perform an interpolation operation on a status-updated excitation signal of the (i−1)$^{th}$ frame to determine an adaptive codebook of the i$^{th}$ frame.

The generation module 14 is configured to determine the algebraic codebook contribution of the i$^{th}$ frame according to a product obtained by multiplying the algebraic codebook of the i$^{th}$ frame by the algebraic codebook gain of the i$^{th}$ frame; determine an adaptive codebook contribution of the i$^{th}$ frame according to a product obtained by multiplying the adaptive codebook of the i$^{th}$ frame by the adaptive codebook gain of the i$^{th}$ frame; and perform a weighting operation on the algebraic codebook contribution of the i$^{th}$ frame and the adaptive codebook contribution of the i$^{th}$ frame according to the weight of the algebraic codebook contribution of the i$^{th}$ frame and a weight of the adaptive codebook contribution of the i$^{th}$ frame, to determine the excitation signal of the i$^{th}$ frame, where a weight of the adaptive codebook is 1.

The apparatus in this embodiment may be configured to execute the methods in Embodiment 1 to Embodiment 4. Thus, specific implementation manners and technical effects in this embodiment are similar to those in Embodiment 1 to Embodiment 4, and details are not repeatedly described herein.

Figure 10:
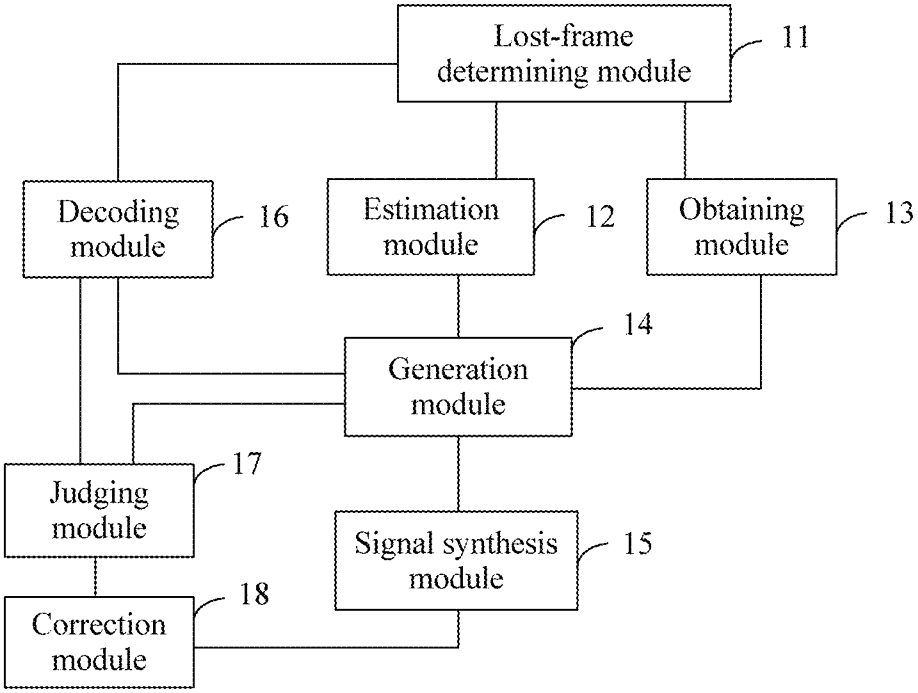
FIG. 10 is a schematic structural diagram of a frame loss compensation processing apparatus according to Embodiment 8 of the present disclosure.

FIG. 10 is a schematic structural diagram of a frame loss compensation processing apparatus according to Embodiment 8 of the present disclosure. As shown in FIG. 10, based on the apparatus shown in FIG. 9, the apparatus in this embodiment further includes a decoding module 16, a judging module 17, and a correction module 18.

The i$^{th}$ frame is a normal frame in this embodiment. The decoding module 16 is configured to obtain the parameter of the i$^{th}$ frame by means of decoding according to a received bitstream. The parameter of the $i^{th}$ frame includes the spectrum frequency parameter, the pitch period, the gain, and the algebraic codebook.

The generation module 14 is further configured to generate the excitation signal of the $i^{th}$ frame and a status-updated excitation signal of the $i^{th}$ frame according to the pitch period, the gain, and the algebraic codebook that are of the $i^{th}$ frame and that are obtained by the decoding module 16 by means of decoding.

The judging module 17 is configured to, when an $(i-1)^{th}$ frame or an $(i-2)^{th}$ frame is a lost frame, determine, according to at least one of inter-frame relationships or intra-frame relationships between the $i^{th}$ frame and the first N frames of the $i^{th}$ frame, whether to correct at least one of the spectrum frequency parameter, the excitation signal, or the status-updated excitation signal of the $i^{th}$ frame. The inter-frame relationship includes at least one of correlation $i^{th}$ between the $i^{th}$ frame and the first N frames of the $i^{th}$ frame or energy stability between the $i^{th}$ frame and the first N frames of the $i^{th}$ frame. The intra-frame relationship includes at least one of inter-subframe correlation between the $i^{th}$ frame and the first N frames of the $i^{th}$ frame or inter-subframe energy stability between the $i^{th}$ frame and the first N frames of the $i^{th}$ frame.

The correction module 18 is configured to, when the judging module 17 determines to correct the at least one of the spectrum frequency parameter, the excitation signal, or the status-updated excitation signal of the $i^{th}$ frame, correct the at least one of the spectrum frequency parameter, the excitation signal, or the status-updated excitation signal of the $i^{th}$ frame according to the at least one of the inter-frame relationships or the intra-frame relationships between the $i^{th}$ frame and the first N frames of the $i^{th}$ frame.

The signal synthesis module 15 is further configured to synthesize the signal of the $i^{th}$ frame according to a result of the correction performed by the correction module on the at least one of the spectrum frequency parameter, the excitation signal, or the status-updated excitation signal of the $i^{th}$ frame; or when the judging module 17 determines not to correct the spectrum frequency parameter, the excitation signal, or the status-updated excitation signal of the $i^{th}$ frame, synthesize the signal of the $i^{th}$ frame according to the spectrum frequency parameter, the excitation signal, and the status-updated excitation signal of the $i^{th}$ frame.

(1) Correction of the Spectrum Frequency Parameter of the $i^{th}$ Frame

Optionally, the judging module 17 is configured to determine, according to correlation of the $i^{th}$ frame, whether to correct the spectrum frequency parameter of the $i^{th}$ frame. When the judging module 17 determines to correct the spectrum frequency parameter of the $i^{th}$ frame, the correction module 18 is configured to correct the spectrum frequency parameter of the $i^{th}$ frame according to the spectrum frequency parameter of the $i^{th}$ frame and a spectrum frequency parameter of the $(i-1)^{th}$ frame, or correct the spectrum frequency parameter of the $i^{th}$ frame according to the spectrum frequency parameter of the $i^{th}$ frame and a preset spectrum frequency parameter of the $i^{th}$ frame.

The correlation of the $i^{th}$ frame includes a value relationship between a sixth threshold and one of two spectrum frequency parameters corresponding to an index of a minimum value of a difference between adjacent spectrum frequency parameters of the $i^{th}$ frame, a value relationship between a seventh threshold and the minimum value of the difference between the adjacent spectrum frequency parameters of the $i^{th}$ frame, and a value relationship between an eighth threshold and the index of the minimum value of the difference between the adjacent spectrum frequency parameters of the $i^{th}$ frame.

The judging module 17 is configured to determine the difference between the adjacent spectrum frequency parameters of the $i^{th}$ frame, where each difference is corresponding to one index, and the spectrum frequency parameter includes an ISF or a LSF; determine whether the difference between the adjacent spectrum frequency parameters of the $i^{th}$ frame meets at least one of a fourth condition or a fifth condition, where the fourth condition includes one of the two spectrum frequency parameters corresponding to the index of the minimum value of the difference between the adjacent spectrum frequency parameters of the $i^{th}$ frame is less than the sixth threshold, and the fifth condition includes an index value of the minimum value of the difference between the adjacent spectrum frequency parameters of the $i^{th}$ frame is less than the eighth threshold, and the minimum difference is less than the seventh threshold; and if the difference between the adjacent spectrum frequency parameters of the $i^{th}$ frame meets the at least one of the fourth condition or the fifth condition, determine to correct the spectrum frequency parameter of the $i^{th}$ frame, or if the difference between the adjacent spectrum frequency parameters of the $i^{th}$ frame does not meet the fourth condition or the fifth condition, determine not to correct the spectrum frequency parameter of the $i^{th}$ frame.

The correction module 18 is configured to determine a corrected spectrum frequency parameter of the $i^{th}$ frame according to a weighting operation performed on the spectrum frequency parameter of the $(i-1)^{th}$ frame and the spectrum frequency parameter of the $i^{th}$ frame; or determine a corrected spectrum frequency parameter of the $i^{th}$ frame according to a weighting operation performed on the spectrum frequency parameter of the $i^{th}$ frame and the preset spectrum frequency parameter of the $i^{th}$ frame.

Optionally, the judging module 17 is configured to determine, according to correlation between the $i^{th}$ frame and the $(i-1)^{th}$ frame, whether to correct the spectrum frequency parameter of the $i^{th}$ frame. When the judging module 17 determines to correct the spectrum frequency parameter of the $i^{th}$ frame, the correction module 18 is configured to correct the spectrum frequency parameter of the $i^{th}$ frame according to the spectrum frequency parameter of the $i^{th}$ frame and a spectrum frequency parameter of the $(i-1)^{th}$ frame, or correct the spectrum frequency parameter of the $i^{th}$ frame according to the spectrum frequency parameter of the $i^{th}$ frame and a preset spectrum frequency parameter of the $i^{th}$ frame. The correlation between the $i^{th}$ frame and the $(i-1)^{th}$ frame includes a value relationship between a ninth threshold and a sum of differences between spectrum frequency parameters corresponding to some or all same indexes of the $(i-1)^{th}$ frame and the $i^{th}$ frame.

The judging module 17 is configured to determine a difference between adjacent spectrum frequency parameters of the $i^{th}$ frame, where each difference is corresponding to one index, and the spectrum frequency parameter includes an ISF or a LSF; determine whether the spectrum frequency parameter of the $i^{th}$ frame and the spectrum frequency parameter of the $(i-1)^{th}$ frame meet a sixth condition, where the sixth condition includes the sum of the differences between the spectrum frequency parameters corresponding to some or all same indexes of the $(i-1)^{th}$ frame and the $i^{th}$ frame is greater than the ninth threshold; and if the spectrum frequency parameter of the $i^{th}$ frame and the spectrum frequency parameter of the $(i-1)^{th}$ frame meet the sixth condition, determine to correct the spectrum frequency parameter of the $i^{th}$ frame, or if the spectrum frequency parameter of the $i^{th}$ frame and the spectrum frequency parameter of the $(i-1)^{th}$ frame do not meet the sixth condition, determine not to correct the spectrum frequency parameter of the $i^{th}$ frame.

The correction module 18 is configured to determine a corrected spectrum frequency parameter of the $i^{th}$ frame according to a weighting operation performed on the spectrum frequency parameter of the $(i-1)^{th}$ frame and the spectrum frequency parameter of the $i^{th}$ frame; or determine a corrected spectrum frequency parameter of the $i^{th}$ frame according to a weighting operation performed on the spectrum frequency parameter of the $i^{th}$ frame and the preset spectrum frequency parameter of the $i^{th}$ frame.

(2) Correction of the Excitation Signal of the $i^{th}$ Frame

Optionally, the judging module 17 is configured to determine, according to correlation between the $i^{th}$ frame and the $(i-1)^{th}$ frame and energy stability between the $i^{th}$ frame and the $(i-1)^{th}$ frame, whether to correct the excitation signal of the $i^{th}$ frame. When the judging module 17 determines to correct the excitation signal of the $i^{th}$ frame, the correction module 18 is configured to correct the excitation signal of the $i^{th}$ frame according to the energy stability between the $i^{th}$ frame and the $(i-1)^{th}$ frame.

The judging module 17 is configured to determine a pre-synthesized signal of the $i^{th}$ frame according to the excitation signal of the $i^{th}$ frame and the spectrum frequency parameter of the $i^{th}$ frame; determine whether an absolute value of a difference between energy of the pre-synthesized signal of the $i^{th}$ frame and energy of a synthesized signal of the $(i-1)^{th}$ frame is greater than a tenth threshold; and if the absolute value of the difference between the energy of the pre-synthesized signal of the $i^{th}$ frame and the energy of the synthesized signal of the $(i-1)^{th}$ frame is greater than the tenth threshold, determine to correct the excitation signal of the $i^{th}$ frame, or if the absolute value of the difference between the energy of the pre-synthesized signal of the $i^{th}$ frame and the energy of the synthesized signal of the $(i-1)^{th}$ frame is less than or equal to the tenth threshold, determine not to correct the excitation signal of the $i^{th}$ frame; or determine whether a ratio of energy of the pre-synthesized signal of the $i^{th}$ frame to energy of a synthesized signal of the $(i-1)^{th}$ frame is greater than an eleventh threshold, where the eleventh threshold is greater than 1; and if the ratio of the energy of the pre-synthesized signal of the $i^{th}$ frame to the energy of the synthesized signal of the $(i-1)^{th}$ frame is greater than the eleventh threshold, determine to correct the excitation signal of the $i^{th}$ frame, or if the ratio of the energy of the pre-synthesized signal of the $i^{th}$ frame to the energy of the synthesized signal of the $(i-1)^{th}$ frame is less than or equal to the eleventh threshold, determine not to correct the excitation signal of the $i^{th}$ frame; or determine whether a ratio of energy of a pre-synthesized signal of the $(i-1)^{th}$ frame to energy of a synthesized signal of the $i^{th}$ frame is less than a twelfth threshold, where the twelfth threshold is less than 1; and if the ratio of the energy of the pre-synthesized signal of the $(i-1)^{th}$ frame to the energy of the synthesized signal of the $i^{th}$ frame is less than the twelfth threshold, determine to correct the excitation signal of the $i^{th}$ frame, or if the ratio of the energy of the pre-synthesized signal of the $(i-1)^{th}$ frame to the energy of the synthesized signal of the $i^{th}$ frame is greater than or equal to the twelfth threshold, determine not to correct the excitation signal of the $i^{th}$ frame.

The correction module 18 is configured to determine a second correction factor according to the energy stability between the $i^{th}$ frame and the $(i-1)^{th}$ frame, where the second correction factor is less than 1; and multiply the excitation signal of the $i^{th}$ frame by the second correction factor to obtain a corrected excitation signal of the $i^{th}$ frame. The second correction factor may be a ratio of energy of the $(i-1)^{th}$ frame to energy of the $i^{th}$ frame, or the second correction factor is a ratio of energy of a same quantity of subframes of the $(i-1)^{th}$ frame and the $i^{th}$ frame.

Optionally, the judging module 17 is configured to determine, according to correlation of a signal of the $(i-1)^{th}$ frame, whether to correct the excitation signal of the $i^{th}$ frame. When the judging module 17 determines to correct the excitation signal of the $i^{th}$ frame, the correction module 18 is configured to correct the excitation signal of the $i^{th}$ frame according to energy stability between the $i^{th}$ frame and the $(i-1)^{th}$ frame. The correlation of the signal of the $(i-1)^{th}$ frame includes a value relationship between a thirteenth threshold and a correlation value of the signal of the $(i-1)^{th}$ frame, and a value relationship between a fourteenth threshold and a deviation of a pitch period of the signal of the $(i-1)^{th}$ frame.

The judging module 17 is configured to determine whether the signal of the $(i-1)^{th}$ frame meets a seventh condition, where the seventh condition is the $(i-1)^{th}$ frame is a lost frame, the correlation value of the signal of the $(i-1)^{th}$ frame is greater than the thirteenth threshold, and the deviation of the pitch period of the signal of the $(i-1)^{th}$ frame is less than the fourteenth threshold; and if the signal of the $(i-1)^{th}$ frame meets the seventh condition, determine to correct the excitation signal of the $i^{th}$ frame, or if the signal of the $(i-1)^{th}$ frame does not meet the seventh condition, determine not to correct the excitation signal of the $i^{th}$ frame.

The correction module 18 is configured to determine a third correction factor according to the energy stability between the $i^{th}$ frame and the $(i-1)^{th}$ frame, where the third correction factor is less than 1; and multiply the excitation signal of the $i^{th}$ frame by the third correction factor to obtain a corrected excitation signal of the $i^{th}$ frame.

Optionally, the judging module 17 is configured to determine, according to correlation between the signal of the $i^{th}$ frame and a signal of the $(i-1)^{th}$ frame, whether to correct the excitation signal of the $i^{th}$ frame. When the judging module 17 determines to correct the excitation signal of the $i^{th}$ frame, the correction module 18 is configured to correct the excitation signal of the $i^{th}$ frame according to energy stability between the $i^{th}$ frame and the $(i-1)^{th}$ frame. The correlation between the signal of the $i^{th}$ frame and the signal of the $(i-1)^{th}$ frame includes a value relationship between a thirteenth threshold and a correlation value of the signal of the $(i-1)^{th}$ frame, and a value relationship between a fourteenth threshold and a deviation of a pitch period of the signal of the $i^{th}$ frame.

The judging module 17 is configured to determine whether the signal of the $(i-1)^{th}$ frame and the signal of the $i^{th}$ frame meet an eighth condition, where the eighth condition includes the $(i-1)^{th}$ frame is a lost frame, the correlation value of the signal of the $(i-1)^{th}$ frame is greater than the preset thirteenth threshold, and the deviation of the pitch period of the signal of the $i^{th}$ frame is less than the preset fourteenth threshold; and if the signal of the $(i-1)^{th}$ frame and the signal of the $i^{th}$ frame meet the eighth condition, determine to correct the excitation signal of the $i^{th}$ frame, or if the signal of the $(i-1)^{th}$ frame and the signal of the $i^{th}$ frame do not meet the eighth condition, determine not to correct the excitation signal of the $i^{th}$ frame.

The correction module 18 is configured to determine a third correction factor according to the energy stability between the $i^{th}$ frame and the $(i-1)^{th}$ frame, where the third correction factor is less than 1; and multiply the excitation signal of the $i^{th}$ frame by the third correction factor to obtain a corrected excitation signal of the $i^{th}$ frame.

Optionally, the judging module 17 is configured to determine, according to correlation between a signal of the $(i-1)^{th}$ frame and a signal of the $(i-2)^{th}$ frame, whether to correct the excitation signal of the $i^{th}$ frame. When the judging module 17 determines to correct the excitation signal of the $i^{th}$ frame, the correction module 18 is configured to correct the excitation signal of the $i^{th}$ frame according to energy stability between the $i^{th}$ frame and the $(i-1)^{th}$ frame. The correlation between the signal of the $(i-1)^{th}$ frame and the signal of the $(i-2)^{th}$ frame includes a value relationship between a thirteenth threshold and a correlation value of the signal of the $(i-2)^{th}$ frame, and whether an excitation signal of the $(i-1)^{th}$ frame is corrected.

The judging module 17 is configured to determine whether the signal of the $(i-2)^{th}$ frame and the signal of the $(i-1)^{th}$ frame meet a ninth condition, where the ninth condition includes the $(i-2)^{th}$ frame is a lost frame, the correlation value of the signal of the $(i-2)^{th}$ frame is greater than the thirteenth threshold, and the excitation signal of the $(i-1)^{th}$ frame is corrected; and if the signal of the $(i-2)^{th}$ frame and the signal of the $(i-1)^{th}$ frame meet the ninth condition, determine to correct the excitation signal of the $i^{th}$ frame, or if the signal of the $(i-2)^{th}$ frame and the signal of the $(i-1)^{th}$ frame do not meet the ninth condition, determine not to correct the excitation signal of the $i^{th}$ frame.

The correction module 18 is configured to determine a fourth correction factor according to the energy stability between the $i^{th}$ frame and the $(i-1)^{th}$ frame, where the fourth correction factor is less than 1; and multiply the excitation signal of the $i^{th}$ frame by the fourth correction factor to obtain a corrected excitation signal of the $i^{th}$ frame.

Optionally, the judging module 17 is configured to determine, according to correlation between a signal of the $(i-1)^{th}$ frame and a signal of the $(i-2)^{th}$ frame, whether to correct the excitation signal of the $i^{th}$ frame. When the judging module 17 determines to correct the excitation signal of the $i^{th}$ frame, the correction module 18 is configured to correct the excitation signal of the $i^{th}$ frame according to energy stability between the $i^{th}$ frame and the $(i-1)^{th}$ frame. The correlation between the signal of the $(i-1)^{th}$ frame and the signal of the $(i-2)^{th}$ frame includes a value relationship between a thirteenth threshold and a correlation value of the signal of the $(i-2)^{th}$ frame, and a value relationship between a fifteenth threshold and an algebraic codebook contribution of an excitation signal of the $(i-1)^{th}$ frame.

The judging module 17 is configured to determine whether the signal of the $(i-2)^{th}$ frame and the signal of the $(i-1)^{th}$ frame meet a tenth condition, where the tenth condition includes the $(i-2)^{th}$ frame is a lost frame, the correlation value of the signal of the $(i-2)^{th}$ frame is greater than the thirteenth threshold, and the algebraic codebook contribution of the excitation signal of the $(i-1)^{th}$ frame is less than the fifteenth threshold; and if the signal of the $(i-2)^{th}$ frame and the signal of the $(i-1)^{th}$ frame meet the tenth condition, determine to correct the excitation signal of the $i^{th}$ frame, or if the signal of the $(i-2)^{th}$ frame and the signal of the $(i-1)^{th}$ frame do not meet the tenth condition, determine not to correct the excitation signal of the $i^{th}$ frame.

The correction module 18 is configured to determine a fourth correction factor according to the energy stability between the $i^{th}$ frame and the $(i-1)^{th}$ frame, where the fourth correction factor is less than 1; and multiply the excitation signal of the $i^{th}$ frame by the fourth correction factor to obtain a corrected excitation signal of the $i^{th}$ frame.

(3) Correction of the Status-Updated Excitation Signal of the $i^{th}$ Frame

The judging module 17 is configured to determine, according to correlation between a signal of the $(i-1)^{th}$ frame and the signal of the $i^{th}$ frame, whether to correct the status-updated excitation signal of the $i^{th}$ frame. When the judging module 17 determines to correct the status-updated excitation signal of the $i^{th}$ frame, the correction module 18 is configured to correct the status-updated excitation signal of the $i^{th}$ frame according to energy stability between the $i^{th}$ frame and the $(i-1)^{th}$ frame. The correlation between the signal of the $(i-1)^{th}$ frame and the signal of the $i^{th}$ frame includes correlation between the $(i-1)^{th}$ frame and the $i^{th}$ frame, and whether an excitation signal of the $(i-1)^{th}$ frame is corrected.

The judging module 17 is configured to determine whether the signal of the $i^{th}$ frame and the signal of the $(i-1)^{th}$ frame meet an eleventh condition, where the eleventh condition includes the $i^{th}$ frame or the $(i-1)^{th}$ frame is a highly-correlated frame, and the excitation signal of the $(i-1)^{th}$ frame is corrected; and if the signal of the $i^{th}$ frame and the signal of the $(i-1)^{th}$ frame meet the eleventh condition, determine to correct the status-updated excitation signal of the $i^{th}$ frame, or if the signal of the $i^{th}$ frame and the signal of the $(i-1)^{th}$ frame do not meet the eleventh condition, determine not to correct the status-updated excitation signal of the $i^{th}$ frame.

The correction module 18 is configured to determine a fifth correction factor according to the energy stability between the $i^{th}$ frame and the $(i-1)^{th}$ frame, where the fifth correction factor is less than 1; and multiply the status-updated excitation signal of the $i^{th}$ frame by the fifth correction factor to obtain a corrected status-updated excitation signal of the $i^{th}$ frame.

For specific implementation manners of function modules of the frame loss compensation processing apparatuses provided in Embodiment 7 and Embodiment 8, refer to related descriptions of the methods shown in Embodiment 1 to Embodiment 6. Details are not repeatedly described herein.

Figure 11:
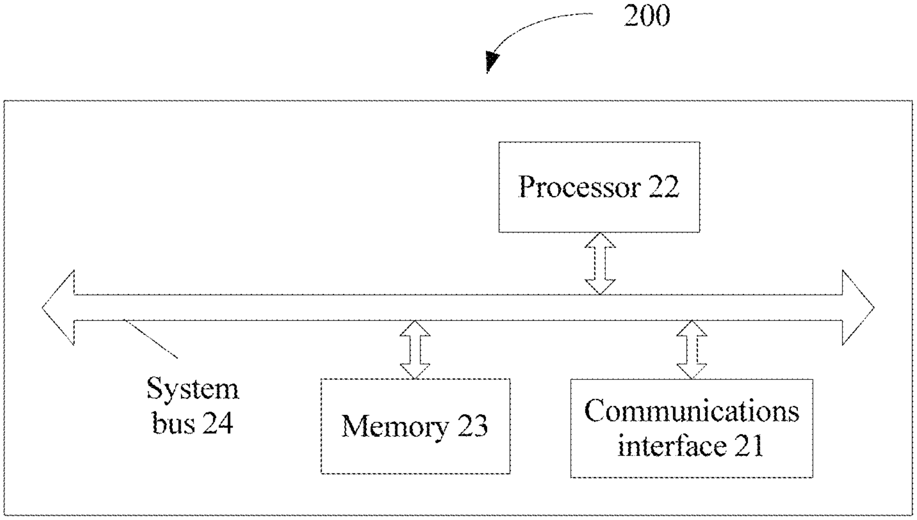
FIG. 11 is a schematic diagram of a physical structure of a frame loss compensation processing apparatus according to Embodiment 9 of the present disclosure.

FIG. 11 is a schematic diagram of a physical structure of a frame loss compensation processing apparatus according to Embodiment 9 of the present disclosure. As shown in FIG. 11, a frame loss compensation processing apparatus 200 includes a communications interface 21, a processor 22, a memory 23, and a bus 24. The communications interface 21, the processor 22, and the memory 23 are interconnected using the bus 24. The bus 24 may be a peripheral component interconnect (PCI) bus, an extended industry standard architecture (EISA) bus, or the like. The bus may include an address bus, a data bus, a control bus, and the like. For ease of representation, the bus 24 is represented using only one thick line in FIG. 11. However, it does not indicate that there is only one bus or only one type of bus. The communications interface 21 is configured to implement communication between a database access apparatus and another device (such as a client, a read/write database, or a read-only database). The memory 23 may include a random access memory (RAM), and may further include a non-volatile memory, such as at least one magnetic disk memory.

The memory 22 executes program code stored in the memory 23, to implement the methods in Embodiment 1 to Embodiment 6.

The foregoing processor 22 may be a general processor, including a central processing unit (CPU), a network processor (NP), and the like; or may be a digital signal processor (DSP), an application-specific integrated circuit (ASIC), a field programmable gate array (FPGA), or another programmable logical device, a discrete gate or a transistor logical device, or a discrete hardware component.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

The invention claimed is:

1. A frame loss compensation processing method, comprising:

determining, by a decoder, using a lost-frame flag bit of a bitstream corresponding to an audio signal, whether an $i^{th}$ frame of the audio signal is a lost frame;

estimating, by the decoder, a parameter of the $i^{th}$ frame according to at least one of an inter-frame relationship between first N frames of the $i^{th}$ frame or an intra-frame relationship between first N frames of the $i^{th}$ frame when the $i^{th}$ frame is a lost frame, wherein the inter-frame relationship between the first N frames comprises at least one of correlation between the first N frames or energy stability between the first N frames, wherein the intra-frame relationship between the first N frames comprises at least one of inter-subframe correlation between the first N frames or inter-subframe energy stability between the first N frames, wherein the parameter of the $i^{th}$ frame comprises a spectrum frequency parameter, a pitch period, and a gain, and wherein N is an integer greater than or equal to 1, wherein the spectrum frequency parameter of the $i^{th}$ frame is obtained by means of estimation according to the inter-frame relationship between the first N frames of the $i^{th}$ frame, and wherein the spectrum frequency parameter of the $i^{th}$ frame is obtained by:

determining, by the decoder, a weight of a spectrum frequency parameter of an $(i-1)^{th}$ frame and a weight of a preset spectrum frequency parameter of the $i^{th}$ frame according to the correlation between the first N frames of the $i^{th}$ frame; and performing, by the decoder, a weighting operation on the spectrum frequency parameter of the $(i-1)^{th}$ frame and the preset spectrum frequency parameter of the $i^{th}$ frame according to the weight of the spectrum frequency parameter of the $(i-1)^{th}$ frame and the weight of the preset spectrum frequency parameter of the $i^{th}$ frame, to obtain the spectrum frequency parameter of the $i^{th}$ frame;

obtaining, by the decoder, an algebraic codebook of the $i^{th}$ frame;

generating, by the decoder, an excitation signal of the $i^{th}$ frame according to the pitch period and the gain of the $i^{th}$ frame and obtained by means of estimation and the obtained algebraic codebook of the $i^{th}$ frame; and synthesizing, by the decoder, a signal of the $i^{th}$ frame according to the spectrum frequency parameter of the $i^{th}$ frame and obtained by means of estimation and the generated excitation signal of the $i^{th}$ frame.

2. The method according to claim 1, wherein when the $i^{th}$ frame is a normal frame, the method further comprises:

obtaining the parameter of the $i^{th}$ frame by means of decoding according to a received bitstream, wherein the parameter of the $i^{th}$ frame comprises the spectrum frequency parameter, the pitch period, the gain, and the algebraic codebook;

generating the excitation signal of the $i^{th}$ frame and a status-updated excitation signal of the $i^{th}$ frame according to the pitch period, the gain, and the algebraic codebook of the $i^{th}$ frame and obtained by means of decoding;

determining, according to at least one of inter-frame relationships or intra-frame relationships between the $i^{th}$ frame and the first N frames of the $i^{th}$ frame when an $(i-1)^{th}$ frame or an $(i-2)^{th}$ frame is a lost frame, whether to correct at least one of the spectrum frequency parameter, the excitation signal, or the status-updated excitation signal of the $i^{th}$ frame, wherein the inter-frame relationship comprises at least one of correlation between the $i^{th}$ frame and the first N frames of the $i^{th}$ frame or energy stability between the $i^{th}$ frame and the first N frames of the $i^{th}$ frame, and wherein the intra-frame relationship comprises at least one of inter-subframe correlation between the $i^{th}$ frame and the first N frames of the $i^{th}$ frame or inter-subframe energy stability between the $i^{th}$ frame and the first N frames of the $i^{th}$ frame;

correcting, when it is determined to correct the at least one of the spectrum frequency parameter, the excitation signal, or the status-updated excitation signal of the $i^{th}$ frame, the at least one of the spectrum frequency parameter, the excitation signal, or the status-updated excitation signal of the $i^{th}$ frame according to the at least one of the inter-frame relationships or the intra-frame relationships between the $i^{th}$ frame and the first N frames of the $i^{th}$ frame;

synthesizing the signal of the $i^{th}$ frame according to a correction result of the at least one of the spectrum frequency parameter, the excitation signal, or the status-updated excitation signal of the $i^{th}$ frame; and synthesizing, when it is determined not to correct the spectrum frequency parameter, the excitation signal, or the status-updated excitation signal of the $i^{th}$ frame, the signal of the $i^{th}$ frame according to the spectrum frequency parameter, the excitation signal, and the status-updated excitation signal of the $i^{th}$ frame.

3. The method according to claim 1, wherein the correlation comprises a value relationship between a second threshold and a spectrum tilt parameter of a signal of the $(i-1)^{th}$ frame, a value relationship between a first threshold and a normalized autocorrelation value of the signal of the $(i-1)^{th}$ frame, and a value relationship between a third threshold and a deviation of a pitch period of the signal of the $(i-1)^{th}$ frame, and wherein determining the weight of the spectrum frequency parameter of the $(i-1)^{th}$ frame and the weight of the preset spectrum frequency parameter of the $i^{th}$ frame according to the correlation between the first N frames of the $i^{th}$ frame comprises:

determining, when the signal of the $(i-1)^{th}$ frame meets at least one of a first condition, a second condition, and a third condition, that the weight of the spectrum frequency parameter of the $(i-1)^{th}$ frame is a first weight, and the weight of the preset spectrum frequency parameter of the $i^{th}$ frame is a second weight, wherein the first weight is greater than the second weight, wherein the first condition is whether the normalized autocorrelation value of the signal of the $(i-1)^{th}$ frame is greater than the first threshold, wherein the second condition is whether the spectrum tilt parameter of the signal of the $(i-1)^{th}$ frame is greater than the second threshold, and wherein the third condition is whether the deviation of the pitch period of the signal of the $(i-1)^{th}$ frame is less than the third threshold; and determining, when the signal of the $(i-1)^{th}$ frame does not meet a first condition, a second condition, or a third condition, that the weight of the spectrum frequency parameter of the $(i-1)^{th}$ frame is a second weight, and the weight of the preset spectrum frequency parameter of the $i^{th}$ frame is a first weight, wherein the first weight is greater than the second weight.

4. The method according to claim 1, wherein the pitch period of the $i^{th}$ frame is obtained by means of estimation according to the correlation between the first N frames of the $i^{th}$ frame and the inter-subframe correlation between the first N frames of the $i^{th}$ frame, wherein the correlation comprises a value relationship between a fifth threshold and a normalized autocorrelation value of a signal of an $(i-2)^{th}$ frame, a value relationship between a fourth threshold and a deviation of a pitch period of the signal of the $(i-2)^{th}$ frame, and a value relationship between the fourth threshold and a deviation of a pitch period of a signal of an $(i-1)^{th}$ frame, wherein the pitch period of the $i^{th}$ frame is obtained by:

determining, when the deviation of the pitch period of the signal of the $(i-1)^{th}$ frame is less than the fourth threshold, a pitch period deviation value of the signal of the $(i-1)^{th}$ frame according to the pitch period of the signal of the $(i-1)^{th}$ frame; and determining a pitch period of the signal of the $i^{th}$ frame according to the pitch period deviation value of the signal of the $(i-1)^{th}$ frame and the pitch period of the signal of the $(i-1)^{th}$ frame, wherein the pitch period of the signal of the $i^{th}$ frame comprises a pitch period of each subframe of the $i^{th}$ frame, and wherein the pitch period deviation value of the signal of the $(i-1)^{th}$ frame is an average value of differences between pitch periods of all adjacent subframes of the $(i-1)^{th}$ frame; or determining, when the deviation of the pitch period of the signal of the $(i-1)^{th}$ frame is greater than or equal to the fourth threshold, the normalized autocorrelation value of the signal of the $(i-2)^{th}$ frame is greater than the fifth threshold, and the deviation of the pitch period of the signal of the $(i-2)^{th}$ frame is less than the fourth threshold, a pitch period deviation value of the signal of the $(i-2)^{th}$ frame and the signal of the $(i-1)^{th}$ frame according to the pitch period of the signal of the $(i-2)^{th}$ frame and the pitch period of the signal of the $(i-1)^{th}$ frame; and determining a pitch period of the signal of the $i^{th}$ frame according to the pitch period of the signal of the $(i-1)^{th}$ frame and the pitch period deviation value of the signal of the $(i-2)^{th}$ frame and the signal of the $(i-1)^{th}$ frame, wherein the pitch period deviation value pv of the signal of the $(i-1)^{th}$ frame is determined according to the following formula:

$pv=(p^{(-1)}(3)-p^{(-1)}(2))+(p^{(-1)}(2)-p^{(-1)}(1))+(p^{(-1)}(1)-p^{(-1)}(0))/3$, wherein $p^{(-1)}(j)$ is a pitch period of a $j^{th}$ subframe of the $(i-1)^{th}$ frame, and wherein j=0, 1, 2, 3; and wherein the pitch period of the signal of the $i^{th}$ frame is determined according to the following formula:

$p_{cur}(j)=p^{(-1)}(3)+(j+1)*pv$, j=0, 1, 2, 3, wherein $p^{(-1)}(3)$ is a pitch period of a third subframe of the $(i-1)^{th}$ frame, wherein pv is the pitch period deviation value of the signal of the $(i-1)^{th}$ frame, and wherein $p_{cur}(j)$ is a pitch period of a $j^{th}$ subframe of the $i^{th}$ frame; or wherein the pitch period deviation value pv of the signal of the $(i-2)^{th}$ frame and the signal of the $(i-1)^{th}$ frame is determined according to the following formula:

$pv=(p^{(-2)}(3)-p^{(-2)}(2))+(p^{(-1)}(0)-p^{(-2)}(3))+(p^{(-1)}(1)-p^{(-1)}(0))/3$, wherein $p^{(-2)}(m)$ is a pitch period of an $m^{th}$ subframe of the $(i-2)^{th}$ frame, wherein $p^{(-1)}(n)$ is a pitch period of an $n^{th}$ subframe of the $(i-1)^{th}$ frame, wherein m=2, 3, and n=0, 1, wherein the pitch period of the signal of the $i^{th}$ frame is determined according to the following formula:

$p_{cur}(x)=p^{(-1)}(3)+(x+1)*pv$, x=0, 1, 2, 3, wherein $p^{(-1)}(3)$ is a pitch period of a third subframe of the $(i-1)^{th}$ frame, wherein pv is the pitch period deviation value of the signal of the $(i-2)^{th}$ frame and the signal of the $(i-1)^{th}$ frame, and wherein $p_{cur}(x)$ is a pitch period of an $x^{th}$ subframe of the $i^{th}$ frame.

5. The method according to claim 1, wherein the gain of the $i^{th}$ frame comprises an adaptive codebook gain and an algebraic codebook gain, wherein the gain of the $i^{th}$ frame is obtained by means of estimation according to the correlation between the first N frames of the $i^{th}$ frame and the energy stability between the first N frames of the $i^{th}$ frame, wherein the gain of the $i^{th}$ frame is obtained by:

determining the adaptive codebook gain of the $i^{th}$ frame according to an adaptive codebook gain of an $(i-1)^{th}$ frame or a preset fixed value, correlation of the $(i-1)^{th}$ frame, and a sequence number of the $i^{th}$ frame in multiple consecutive lost frames;

determining a weight of an algebraic codebook gain of the $(i-1)^{th}$ frame and a weight of a gain of a voice activity detection (VAD) frame according to energy stability of the $(i-1)^{th}$ frame;

determining a first correction factor according to an encoding and decoding rate;

correcting the algebraic codebook gain of the $(i-1)^{th}$ frame using the first correction factor; and performing a weighting operation on the algebraic codebook gain of the $(i-1)^{th}$ frame and the gain of the VAD frame according to the weight of the algebraic codebook gain of the $(i-1)^{th}$ frame and the weight of the gain of the VAD frame in order to obtain the algebraic codebook gain of the $i^{th}$ frame, wherein more stable energy of the $(i-1)^{th}$ frame indicates a larger weight of the algebraic codebook gain of the $(i-1)^{th}$ frame, and wherein the weight of the gain of the VAD frame correspondingly increases as a quantity of consecutive lost frames increases.

6. The method according to claim 1, wherein obtaining the algebraic codebook of the $i^{th}$ frame comprises:

obtaining the algebraic codebook of the $i^{th}$ frame by means of estimation according to random noise; or determining the algebraic codebook of the $i^{th}$ frame according to algebraic codebooks of the first N frames of the $i^{th}$ frame.

7. The method according to claim 1, wherein the gain of the $i^{th}$ frame comprises an adaptive codebook gain and an algebraic codebook gain, wherein before generating the excitation signal of the $i^{th}$ frame according to the pitch period and the gain that are of the $i^{th}$ frame and that are obtained by means of estimation and the obtained algebraic codebook of the $i^{th}$ frame, the method further comprises:

determining a weight of an algebraic codebook contribution of the $i^{th}$ frame, wherein the algebraic codebook contribution of the $i^{th}$ frame is determined according to any one of a deviation of a pitch period of an $(i-1)^{th}$ frame, correlation of a signal of the $(i-1)^{th}$ frame, a spectrum tilt rate value of the $(i-1)^{th}$ frame, or a zero-crossing rate of an $(i-1)^{th}$ frame, wherein the algebraic codebook contribution of the $i^{th}$ frame is determined by performing a weighting operation on any combination of a deviation of a pitch period of the $(i-1)^{th}$ frame, correlation of a signal of the $(i-1)^{th}$ frame, a spectrum tilt rate value of the $(i-1)^{th}$ frame, or a zero-crossing rate of the $(i-1)^{th}$ frame; and performing an interpolation operation on a status-updated excitation signal of the $(i-1)^{th}$ frame to determine an adaptive codebook of the $i^{th}$ frame, wherein generating the excitation signal of the $i^{th}$ frame according to the pitch period and the gain of the $i^{th}$ frame and obtained by means of estimation and the obtained algebraic codebook of the $i^{th}$ frame comprises:

determining the algebraic codebook contribution of the $i^{th}$ frame according to a product obtained by multiplying the algebraic codebook of the $i^{th}$ frame by the algebraic codebook gain of the $i^{th}$ frame;

determining an adaptive codebook contribution of the $i^{th}$ frame according to a product obtained by multiplying the adaptive codebook of the $i^{th}$ frame by the adaptive codebook gain of the $i^{th}$ frame; and performing a weighting operation on the algebraic codebook contribution of the $i^{th}$ frame and the adaptive codebook contribution of the $i^{th}$ frame according to the weight of the algebraic codebook contribution of the $i^{th}$ frame and a weight of the adaptive codebook contribution of the $i^{th}$ frame in order to determine the excitation signal of the $i^{th}$ frame, wherein a weight of the adaptive codebook is 1.

8. A frame loss compensation processing apparatus, comprising:

a non-transitory memory for storing computer-executable instructions; and a processor operatively coupled to the non-transitory memory and configured to:

determine, using a lost-frame flag bit of a bitstream corresponding to an audio signal, whether an $i^{th}$ frame of the audio signal is a lost frame;

estimate a parameter of the $i^{th}$ frame according to at least one of an inter-frame relationship between first N frames of the $i^{th}$ frame or an intra-frame relationship between first N frames of the $i^{th}$ frame when the $i^{th}$ frame is a lost frame, wherein the inter-frame relationship between the first N frames comprises at least one of correlation between the first N frames or energy stability between the first N frames, wherein the intra-frame relationship between the first N frames comprises at least one of inter-subframe correlation between the first N frames or inter-subframe energy stability between the first N frames, wherein the parameter of the $i^{th}$ frame comprises a spectrum frequency parameter, a pitch period, and a gain, and wherein N is an integer greater than or equal to 1, wherein the spectrum frequency parameter of the $i^{th}$ frame is obtained by means of estimation according to the inter-frame relationship between the first N frames of the $i^{th}$ frame, and wherein the spectrum frequency parameter of the $i^{th}$ frame is obtained by:

determining a weight of a spectrum frequency parameter of an $(i-1)^{th}$ frame and a weight of a preset spectrum frequency parameter of the $i^{th}$ frame according to the correlation between the first N frames of the $i^{th}$ frame; and performing a weighting operation on the spectrum frequency parameter of the $(i-1)^{th}$ frame and the preset spectrum frequency parameter of the $i^{th}$ frame according to the weight of the spectrum frequency parameter of the $(i-1)^{th}$ frame and the weight of the preset spectrum frequency parameter of the $i^{th}$ frame, to obtain the spectrum frequency parameter of the $i^{th}$ frame;

obtain an algebraic codebook of the $i^{th}$ frame;

generate an excitation signal of the $i^{th}$ frame according to an estimated pitch period of the $i^{th}$ frame, an estimated gain of the $i^{th}$ frame and the obtained algebraic codebook of the $i^{th}$ frame; and synthesize a signal of the $i^{th}$ frame according to an estimated spectrum frequency parameter of the $i^{th}$ frame and the generated excitation signal of the $i^{th}$ frame.

9. The apparatus according to claim 8, wherein when the $i^{th}$ frame is a normal frame, the processor is further configured to:

obtain the parameter of the $i^{th}$ frame by means of decoding according to a received bitstream, wherein the parameter of the $i^{th}$ frame comprises the spectrum frequency parameter, the pitch period, the gain, and the algebraic codebook;

generate the excitation signal of the $i^{th}$ frame and a status-updated excitation signal of the $i^{th}$ frame according to the pitch period, the gain, and the algebraic codebook of the $i^{th}$ frame and obtained by means of decoding;

determine, according to at least one of inter-frame relationships or intra-frame relationships between the $i^{th}$ frame and the first N frames of the $i^{th}$ frame, whether to correct at least one of the spectrum frequency parameter, the excitation signal, or the status-updated excitation signal of the $i^{th}$ frame when an $(i-1)^{th}$ frame or an $(i-2)^{th}$ frame is a lost frame, wherein the inter-frame relationship comprises at least one of correlation between the $i^{th}$ frame and the first N frames of the $i^{th}$ frame or energy stability between the $i^{th}$ frame and the first N frames of the $i^{th}$ frame, and wherein the intra-frame relationship comprises at least one of inter-subframe correlation between the $i^{th}$ frame and the first N frames of the $i^{th}$ frame or inter-subframe energy stability between the $i^{th}$ frame and the first N frames of the $i^{th}$ frame;

correct, when determining to correct the at least one of the spectrum frequency parameter, the excitation signal, or the status-updated excitation signal of the $i^{th}$ frame, the at least one of the spectrum frequency parameter, the excitation signal, or the status-updated excitation signal of the $i^{th}$ frame according to the at least one of the inter-frame relationships or the intra-frame relationships between the $i^{th}$ frame and the first N frames of the $i^{th}$ frame;

synthesize the signal of the $i^{th}$ frame according to a corrected result of at least one of the spectrum frequency parameter, the excitation signal, or the status-updated excitation signal of the $i^{th}$ frame; and synthesize, when determining not to correct the spectrum frequency parameter, the excitation signal, or the status-updated excitation signal of the $i^{th}$ frame, the signal of the $i^{th}$ frame according to the spectrum frequency parameter, the excitation signal, and the status-updated excitation signal of the $i^{th}$ frame.

10. The apparatus according to claim 9, wherein the processor is further configured to:

determine, according to correlation between the $i^{th}$ frame and the $(i-1)^{th}$ frame, whether to correct the spectrum frequency parameter of the $i^{th}$ frame;

correct, when determining to correct the spectrum frequency parameter of the $i^{th}$ frame, the spectrum frequency parameter of the $i^{th}$ frame according to the spectrum frequency parameter of the $i^{th}$ frame and a spectrum frequency parameter of the $(i-1)^{th}$ frame, or according to the spectrum frequency parameter of the $i^{th}$ frame and a preset spectrum frequency parameter of the $i^{th}$ frame, wherein the correlation between the $i^{th}$ frame and the $(i-1)^{th}$ frame comprises a value relationship between a ninth threshold and a sum of differences between spectrum frequency parameters corresponding to some or all same indexes of the $(i-1)^{th}$ frame and the $i^{th}$ frame;

determine a difference between adjacent spectrum frequency parameters of the $i^{th}$ frame, wherein each difference is corresponding to one index, and wherein the spectrum frequency parameter comprises an immittance spectral frequency (ISF) or a line spectral frequency (LSF);

determine whether the spectrum frequency parameter of the $i^{th}$ frame and the spectrum frequency parameter of the $(i-1)^{th}$ frame meet a sixth condition, wherein the sixth condition comprises the sum of the differences between the spectrum frequency parameters corresponding to some or all same indexes of the $(i-1)^{th}$ frame and the $i^{th}$ frame is greater than the ninth threshold;

determine, when the spectrum frequency parameter of the $i^{th}$ frame and the spectrum frequency parameter of the $(i-1)^{th}$ frame meet the sixth condition, to correct the spectrum frequency parameter of the $i^{th}$ frame;

determine, when the spectrum frequency parameter of the $i^{th}$ frame and the spectrum frequency parameter of the $(i-1)^{th}$ frame do not meet the sixth condition, not to correct the spectrum frequency parameter of the $i^{th}$ frame; and determine a corrected spectrum frequency parameter of the $i^{th}$ frame according to a weighting operation performed on either:

the spectrum frequency parameter of the $(i-1)^{th}$ frame and the spectrum frequency parameter of the $i^{th}$ frame; or the spectrum frequency parameter of the $i^{th}$ frame and the preset spectrum frequency parameter of the $i^{th}$ frame.

11. The apparatus according to claim 9, wherein the processor is further configured to:

determine, according to correlation between the $i^{th}$ frame and the $(i-1)^{th}$ frame and energy stability between the $i^{th}$ frame and the $(i-1)^{th}$ frame, whether to correct the excitation signal of the $i^{th}$ frame;

correct, when determining to correct the excitation signal of the $i^{th}$ frame, the excitation signal of the $i^{th}$ frame according to the energy stability between the $i^{th}$ frame and the $(i-1)^{th}$ frame;

determine a pre-synthesized signal of the $i^{th}$ frame according to the excitation signal of the $i^{th}$ frame and the spectrum frequency parameter of the $i^{th}$ frame;

determine whether an absolute value of a difference between energy of the pre-synthesized signal of the $i^{th}$ frame and energy of a synthesized signal of the $(i-1)^{th}$ frame is greater than a tenth threshold;

determine, when the absolute value of the difference between the energy of the pre-synthesized signal of the $i^{th}$ frame and the energy of the synthesized signal of the $(i-1)^{th}$ frame is greater than the tenth threshold, to correct the excitation signal of the $i^{th}$ frame;

determine, when the absolute value of the difference between the energy of the pre-synthesized signal of the $i^{th}$ frame and the energy of the synthesized signal of the $(i-1)^{th}$ frame is less than or equal to the tenth threshold, not to correct the excitation signal of the $i^{th}$ frame;

determine a second correction factor according to the energy stability between the $i^{th}$ frame and the $(i-1)^{th}$ frame, wherein the second correction factor is less than 1; and multiply the excitation signal of the $i^{th}$ frame by the second correction factor to obtain a corrected excitation signal of the $i^{th}$ frame.

12. The apparatus according to claim 11, wherein the processor is further configured to:

determine that a ratio of energy of the $(i-1)^{th}$ frame to energy of the $i^{th}$ frame is the second correction factor; or determine that a ratio of energy of a same quantity of subframes of the $(i-1)^{th}$ frame and the $i^{th}$ frame is the second correction factor.

13. The apparatus according to claim 9, wherein the processor is further configured to:

determine, according to correlation between the $i^{th}$ frame and the $(i-1)^{th}$ frame and energy stability between the $i^{th}$ frame and the $(i-1)^{th}$ frame, whether to correct the excitation signal of the $i^{th}$ frame;

correct, when determining to correct the excitation signal of the $i^{th}$ frame, the excitation signal of the $i^{th}$ frame according to the energy stability between the $i^{th}$ frame and the $(i-1)^{th}$ frame;

determine a pre-synthesized signal of the $i^{th}$ frame according to the excitation signal of the $i^{th}$ frame and the spectrum frequency parameter of the $i^{th}$ frame;

determine whether a ratio of energy of the pre-synthesized signal of the $i^{th}$ frame to energy of a synthesized signal of the $(i-1)^{th}$ frame is greater than an eleventh threshold, wherein the eleventh threshold is greater than 1; and determine, when the ratio of the energy of the pre-synthesized signal of the $i^{th}$ frame to the energy of the synthesized signal of the $(i-1)^{th}$ frame is greater than the eleventh threshold, to correct the excitation signal of the $i^{th}$ frame;

determine, when the ratio of the energy of the pre-synthesized signal of the $i^{th}$ frame to the energy of the synthesized signal of the $(i-1)^{th}$ frame is less than or equal to the eleventh threshold, not to correct the excitation signal of the $i^{th}$ frame;

determine a second correction factor according to the energy stability between the $i^{th}$ frame and the $(i-1)^{th}$ frame, wherein the second correction factor is less than 1; and multiply the excitation signal of the $i^{th}$ frame by the second correction factor to obtain a corrected excitation signal of the $i^{th}$ frame.

14. The apparatus according to claim 9, wherein the processor is further configured to:

determine, according to correlation between the $i^{th}$ frame and the $(i-1)^{th}$ frame and energy stability between the $i^{th}$ frame and the $(i-1)^{th}$ frame, whether to correct the excitation signal of the $i^{th}$ frame;

correct, when determining to correct the excitation signal of the $i^{th}$ frame, the excitation signal of the $i^{th}$ frame according to the energy stability between the $i^{th}$ frame and the $(i-1)^{th}$ frame;

determine a pre-synthesized signal of the $i^{th}$ frame according to the excitation signal of the $i^{th}$ frame and the spectrum frequency parameter of the $i^{th}$ frame;

determine whether a ratio of energy of a pre-synthesized signal of the $(i-1)^{th}$ frame to energy of a synthesized signal of the $i^{th}$ frame is less than a twelfth threshold, wherein the twelfth threshold is less than 1;

determine, when the ratio of the energy of the pre-synthesized signal of the $(i-1)^{th}$ frame to the energy of the synthesized signal of the $i^{th}$ frame is less than the twelfth threshold, to correct the excitation signal of the $i^{th}$ frame;

determine, when the ratio of the energy of the pre-synthesized signal of the $(i-1)^{th}$ frame to the energy of the synthesized signal of the $i^{th}$ frame is greater than or equal to the twelfth threshold, not to correct the excitation signal of the $i^{th}$ frame;

determine a second correction factor according to the energy stability between the $i^{th}$ frame and the $(i-1)^{th}$ frame, wherein the second correction factor is less than 1; and multiply the excitation signal of the $i^{th}$ frame by the second correction factor to obtain a corrected excitation signal of the $i^{th}$ frame.

15. The apparatus according to claim 9, wherein the processor is further configured to:

determine, according to correlation of a signal of the $(i-1)^{th}$ frame, whether to correct the excitation signal of the $i^{th}$ frame;

correct, when determining to correct the excitation signal of the $i^{th}$ frame, the excitation signal of the $i^{th}$ frame according to energy stability between the $i^{th}$ frame and the $(i-1)^{th}$ frame, wherein the correlation of the signal of the $(i-1)^{th}$ frame comprises a value relationship between a thirteenth threshold and a correlation value of the signal of the $(i-1)^{th}$ frame, and a value relationship between a fourteenth threshold and a deviation of a pitch period of the signal of the $(i-1)^{th}$ frame;

determine whether the signal of the $(i-1)^{th}$ frame meets a seventh condition, wherein the seventh condition whether the $(i-1)^{th}$ frame is a lost frame, the correlation value of the signal of the $(i-1)^{th}$ frame is greater than the thirteenth threshold, and the deviation of the pitch period of the signal of the $(i-1)^{th}$ frame is less than the fourteenth threshold;

determine, when the signal of the $(i-1)^{th}$ frame meets the seventh condition, to correct the excitation signal of the $i^{th}$ frame;

determine, when the signal of the $(i-1)^{th}$ frame does not meet the seventh condition, not to correct the excitation signal of the $i^{th}$ frame;

determine a third correction factor according to the energy stability between the $i^{th}$ frame and the $(i-1)^{th}$ frame, wherein the third correction factor is less than 1; and multiply the excitation signal of the $i^{th}$ frame by the third correction factor to obtain a corrected excitation signal of the $i^{th}$ frame.

16. The apparatus according to claim 9, wherein the processor is further configured to:

determine, according to correlation between the signal of the $i^{th}$ frame and a signal of the $(i-1)^{th}$ frame, whether to correct the excitation signal of the $i^{th}$ frame;

correct, when determining to correct the excitation signal of the $i^{th}$ frame, the excitation signal of the $i^{th}$ frame according to energy stability between the $i^{th}$ frame and the $(i-1)^{th}$ frame, wherein the correlation between the signal of the $i^{th}$ frame and the signal of the $(i-1)^{th}$ frame comprises a value relationship between a thirteenth threshold and a correlation value of the signal of the $(i-1)^{th}$ frame, and a value relationship between a fourteenth threshold and a deviation of a pitch period of the signal of the $i^{th}$ frame;

determine whether the signal of the $(i-1)^{th}$ frame and the signal of the $i^{th}$ frame meet an eighth condition, wherein the eighth condition comprises whether the $(i-1)^{th}$ frame is a lost frame, the correlation value of the signal of the $(i-1)^{th}$ frame is greater than the thirteenth threshold, and the deviation of the pitch period of the signal of the $i^{th}$ frame is less than the fourteenth threshold;

determine, when the signal of the $(i-1)^{th}$ frame and the signal of the $i^{th}$ frame meet the eighth condition, to correct the excitation signal of the $i^{th}$ frame;

determine, when the signal of the $(i-1)^{th}$ frame and the signal of the $i^{th}$ frame do not meet the eighth condition, not to correct the excitation signal of the $i^{th}$ frame;

determine a third correction factor according to the energy stability between the $i^{th}$ frame and the $(i-1)^{th}$ frame, wherein the third correction factor is less than 1; and multiply the excitation signal of the $i^{th}$ frame by the third correction factor to obtain a corrected excitation signal of the $i^{th}$ frame.

17. The apparatus according to claim 9, wherein the processor is further configured to:

determine, according to correlation between a signal of the $(i-1)^{th}$ frame and a signal of the $(i-2)^{th}$ frame, whether to correct the excitation signal of the $i^{th}$ frame;

correct, when determining to correct the excitation signal of the $i^{th}$ frame, the excitation signal of the $i^{th}$ frame according to energy stability between the $i^{th}$ frame and the $(i-1)^{th}$ frame, wherein the correlation between the signal of the $(i-1)^{th}$ frame and the signal of the $(i-2)^{th}$ frame comprises: a value relationship between a thirteenth threshold and a correlation value of the signal of the $(i-2)^{th}$ frame, and whether an excitation signal of the $(i-1)^{th}$ frame is corrected;

determine whether the signal of the $(i-2)^{th}$ frame and the signal of the $(i-1)^{th}$ frame meet a ninth condition, wherein the ninth condition comprises whether the $(i-2)^{th}$ frame is a lost frame, the correlation value of the signal of the $(i-2)^{th}$ frame is greater than the thirteenth threshold, and the excitation signal of the $(i-1)^{th}$ frame is corrected;

determine, when the signal of the $(i-2)^{th}$ frame and the signal of the $(i-1)^{th}$ frame meet the ninth condition, to correct the excitation signal of the $i^{th}$ frame;

determine, when the signal of the $(i-2)^{th}$ frame and the signal of the $(i-1)^{th}$ frame do not meet the ninth condition, not to correct the excitation signal of the $i^{th}$ frame;

determine a fourth correction factor according to the energy stability between the $i^{th}$ frame and the $(i-1)^{th}$ frame, wherein the fourth correction factor is less than 1; and multiply the excitation signal of the $i^{th}$ frame by the fourth correction factor to obtain a corrected excitation signal of the $i^{th}$ frame.

18. The apparatus according to claim 9, wherein the processor is further configured to:

determine, according to correlation between a signal of the $(i-1)^{th}$ frame and a signal of the $(i-2)^{th}$ frame, whether to correct the excitation signal of the $i^{th}$ frame;

correct, when determining to correct the excitation signal of the $i^{th}$ frame, the excitation signal of the $i^{th}$ frame according to energy stability between the $i^{th}$ frame and the $(i-1)^{th}$ frame, wherein the correlation between the signal of the $(i-1)^{th}$ frame and the signal of the $(i-2)^{th}$ frame comprises a value relationship between a thirteenth threshold and a correlation value of the signal of the $(i-2)^{th}$ frame, and a value relationship between a fifteenth threshold and an algebraic codebook contribution of an excitation signal of the $(i-1)^{th}$ frame;

determine whether the signal of the $(i-2)^{th}$ frame and the signal of the $(i-1)^{th}$ frame meet a tenth condition, wherein the tenth condition comprises whether the $(i-2)^{th}$ frame is a lost frame, the correlation value of the signal of the $(i-2)^{th}$ frame is greater than the thirteenth threshold, and the algebraic codebook contribution of the excitation signal of the $(i-1)^{th}$ frame is less than the fifteenth threshold;

determine, when the signal of the $(i-2)^{th}$ frame and the signal of the $(i-1)^{th}$ frame meet the tenth condition, to correct the excitation signal of the $i^{th}$ frame;

determine, when the signal of the $(i-2)^{th}$ frame and the signal of the $(i-1)^{th}$ frame do not meet the tenth condition, not to correct the excitation signal of the $i^{th}$ frame;

determine a fourth correction factor according to the energy stability between the $i^{th}$ frame and the $(i-1)^{th}$ frame, wherein the fourth correction factor is less than 1; and multiply the excitation signal of the $i^{th}$ frame by the fourth correction factor to obtain a corrected excitation signal of the $i^{th}$ frame.

19. The apparatus according to claim 9, wherein the processor is further configured to:

determine, according to correlation between a signal of the $(i-1)^{th}$ frame and the signal of the $i^{th}$ frame, whether to correct the status-updated excitation signal of the $i^{th}$ frame;

correct, when determining to correct the status-updated excitation signal of the $i^{th}$ frame, the status-updated excitation signal of the $i^{th}$ frame according to energy stability between the $i^{th}$ frame and the $(i-1)^{th}$ frame, wherein the correlation between the signal of the $(i-1)^{th}$ frame and the signal of the $i^{th}$ frame comprises: correlation between the $(i-1)^{th}$ frame and the $i^{th}$ frame, and whether an excitation signal of the $(i-1)^{th}$ frame is corrected;

determine whether the signal of the $i^{th}$ frame and the signal of the $(i-1)^{th}$ frame meet an eleventh condition, wherein the eleventh condition comprises whether the $i^{th}$ frame or the $(i-1)^{th}$ frame is a highly-correlated frame, and the excitation signal of the $(i-1)^{th}$ frame is corrected;

determine, when the signal of the $i^{th}$ frame and the signal of the $(i-1)^{th}$ frame meet the eleventh condition, to correct the status-updated excitation signal of the $i^{th}$ frame;

determine, when the signal of the $i^{th}$ frame and the signal of the $(i-1)^{th}$ frame do not meet the eleventh condition, not to correct the status-updated excitation signal of the $i^{th}$ frame;

determine a fifth correction factor according to the energy stability between the $i^{th}$ frame and the $(i-1)^{th}$ frame, wherein the fifth correction factor is less than 1; and multiply the status-updated excitation signal of the $i^{th}$ frame by the fifth correction factor to obtain a corrected status-updated excitation signal of the $i^{th}$ frame.

20. The apparatus according to claim 8, wherein the correlation comprises a value relationship between a second threshold and a spectrum tilt parameter of a signal of the $(i-1)^{th}$ frame, a value relationship between a first threshold and a normalized autocorrelation value of the signal of the $(i-1)^{th}$ frame, and a value relationship between a third threshold and a deviation of a pitch period of the signal of the $(i-1)^{th}$ frame, and wherein the processor is further configured to obtain the spectrum frequency parameter of the $i^{th}$ frame by:

determining, when the signal of the $(i-1)^{th}$ frame meets at least one of a first condition, a second condition, and a third condition, that the weight of the spectrum frequency parameter of the $(i-1)^{th}$ frame is a first weight, and the weight of the preset spectrum frequency parameter of the $i^{th}$ frame is a second weight, wherein the first weight is greater than the second weight, wherein the first condition is whether the normalized autocorrelation value of the signal of the $(i-1)^{th}$ frame is greater than the first threshold, wherein the second condition is whether the spectrum tilt parameter of the signal of the $(i-1)^{th}$ frame is greater than the second threshold, and wherein the third condition is whether the deviation of the pitch period of the signal of the $(i-1)^{th}$ frame is less than the third threshold; and determining, when the signal of the $(i-1)^{th}$ frame does not meet a first condition, a second condition, or a third condition, that the weight of the spectrum frequency parameter of the $(i-1)^{th}$ frame is a second weight, and the weight of the preset spectrum frequency parameter of the $i^{th}$ frame is a first weight, wherein the first weight is greater than the second weight.

21. The apparatus according to claim 8, wherein the pitch period of the $i^{th}$ frame is obtained by means of estimation according to the correlation between the first N frames of the $i^{th}$ frame and the inter-subframe correlation between the first N frames of the $i^{th}$ frame, wherein the correlation comprises a value relationship between a fifth threshold and a normalized autocorrelation value of a signal of an $(i-2)^{th}$ frame, a value relationship between a fourth threshold and a deviation of a pitch period of the signal of the $(i-2)^{th}$ frame, and a value relationship between the fourth threshold and a deviation of a pitch period of a signal of an $(i-1)^{th}$ frame, wherein the processor is further configured to obtain the pitch period of the $i^{th}$ frame by:

determining, when the deviation of the pitch period of the signal of the $(i-1)^{th}$ frame is less than the fourth threshold, a pitch period deviation value of the signal of the $(i-1)^{th}$ frame according to the pitch period of the signal of the $(i-1)^{th}$ frame;

determining a pitch period of the signal of the $i^{th}$ frame according to the pitch period deviation value of the signal of the $(i-1)^{th}$ frame and the pitch period of the signal of the $(i-1)^{th}$ frame, wherein the pitch period of the signal of the $i^{th}$ frame comprises a pitch period of each subframe of the $i^{th}$ frame, and wherein the pitch period deviation value of the signal of the $(i-1)^{th}$ frame is an average value of differences between pitch periods of all adjacent subframes of the $(i-1)^{th}$ frame;

determining, when the deviation of the pitch period of the signal of the $(i-1)^{th}$ frame is greater than or equal to the fourth threshold, the normalized autocorrelation value of the signal of the $(i-2)^{th}$ frame is greater than the fifth threshold, and the deviation of the pitch period of the signal of the $(i-2)^{th}$ frame is less than the fourth threshold, a pitch period deviation value of the signal of the $(i-2)^{th}$ frame and the signal of the $(i-1)^{th}$ frame according to the pitch period of the signal of the $(i-2)^{th}$ frame and the pitch period of the signal of the $(i-1)^{th}$ frame; and determining a pitch period of the signal of the $i^{th}$ frame according to the pitch period of the signal of the $(i-1)^{th}$ frame and the pitch period deviation value of the signal of the $(i-2)^{t}$ frame and the signal of the $(i-1)^{th}$ frame, wherein the processor is configured to:

determine the pitch period deviation value pv of the signal of the $(i-1)^{th}$ frame according to the following formula:

$pv=(p^{(-1)}(3)-p^{(-1)}(2))+(p^{(-1)}(2)-p^{(-1)}(1))+(p^{(-1)}(1)-p^{(-1)}(0))/3$, wherein $p^{(-1)}(j)$ is a pitch period of a $j^{th}$ subframe of the $(i-1)^{th}$ frame, and wherein j=0, 1, 2, 3; and determine the pitch period of the signal of the $i^{th}$ frame according to the following formula:

$p_{cur}(j)=p^{(-1)}(3)+(j+1)*pv$, j=0, 1, 2, 3, wherein $p^{(-1)}(3)$ is a pitch period of a third subframe of the $(i-1)^{th}$ frame, wherein pv is the pitch period deviation value of the signal of the $(i-1)^{th}$ frame, and wherein $p_{cur}(j)$ is a pitch period of a $j^{th}$ subframe of the $i^{th}$ frame;

determine the pitch period deviation value pv of the signal of the $(i-2)^{th}$ frame and the signal of the $(i-1)^{th}$ frame according to the following formula:

$pv=(p^{(-2)}(3)-p^{(-2)}(2))+(p^{(-1)}(0)-p^{(-2)}(3))+(p^{(-1)}(1)-p^{(-1)}(0))/3$, wherein $p^{(-2)}(m)$ is a pitch period of an $m^{th}$ subframe of the $(i-2)^{th}$ frame, wherein $p^{(-1)}(n)$ is a pitch period of an $n^{th}$ subframe of the $(i-1)^{th}$ frame, wherein m=2, 3, and wherein n=0, 1; and determine the pitch period of the signal of the $i^{th}$ frame according to the following formula:

$p_{cur}(x)=p^{(-1)}(3)+(x+1)*pv$, x=0, 1, 2, 3, wherein $p^{(-1)}(3)$ is a pitch period of a third subframe of the $(i-1)^{th}$ frame, wherein pv is the pitch period deviation value of the signal of the $(i-2)^{th}$ frame and the signal of the $(i-1)^{th}$ frame, and wherein $p_{cur}(x)$ is a pitch period of an $x^{th}$ subframe of the $i^{th}$ frame.

22. The apparatus according to claim 8, wherein the gain of the $i^{th}$ frame comprises an adaptive codebook gain and an algebraic codebook gain, wherein the gain of the $i^{th}$ frame is obtained by means of estimation according to the correlation between the first N frames of the $i^{th}$ frame and the energy stability between the first N frames of the $i^{th}$ frame, and wherein the processor is configured to estimate the adaptive codebook gain and the algebraic codebook gain of the $i^{th}$ frame by:

determining the adaptive codebook gain of the $i^{th}$ frame according to an adaptive codebook gain of an $(i-1)^{th}$ frame or a preset fixed value, correlation of the $(i-1)^{th}$ frame, and a sequence number of the $i^{th}$ frame in multiple consecutive lost frames;

determining a weight of an algebraic codebook gain of the $(i-1)^{th}$ frame and a weight of a gain of a voice activity detection (VAD) frame according to energy stability of the $(i-1)^{th}$ frame;

determining a first correction factor according to an encoding and decoding rate;

correcting the algebraic codebook gain of the $(i-1)^{th}$ frame using the first correction factor; and performing a weighting operation on the algebraic codebook gain of the $(i-1)^{th}$ frame and the gain of the VAD frame according to the weight of the algebraic codebook gain of the $(i-1)^{th}$ frame and the weight of the gain of the VAD frame in order to obtain the algebraic codebook gain of the $i^{th}$ frame, wherein more stable energy of the $(i-1)^{th}$ frame indicates a larger weight of the algebraic codebook gain of the $(i-1)^{th}$ frame, and wherein the weight of the gain of the VAD frame correspondingly increases as a quantity of consecutive lost frames increases.

23. The apparatus according to claim 8, wherein the processor is configured to obtain the algebraic codebook of the $i^{th}$ frame by:

obtaining the algebraic codebook of the $i^{th}$ frame by means of estimation according to random noise; or determining the algebraic codebook of the $i^{th}$ frame according to algebraic codebooks of the first N frames of the $i^{th}$ frame.

24. The apparatus according to claim 8, wherein the gain of the $i^{th}$ frame comprises an adaptive codebook gain and an algebraic codebook gain, wherein the processor is configured to determine the excitation signal of the $i^{th}$ frame by:

determining a weight of an algebraic codebook contribution of the $i^{th}$ frame, wherein the algebraic codebook contribution of the $i^{th}$ frame is determined according to any one of a deviation of a pitch period of an $(i-1)^{th}$ frame, correlation of a signal of the $(i-1)^{th}$ frame, a spectrum tilt rate value of the $(i-1)^{th}$ frame, or a zero-crossing rate of an $(i-1)^{th}$ frame, wherein the algebraic codebook contribution of the $i^{th}$ frame is determined by performing a weighting operation on any combination of a deviation of a pitch period of the $(i-1)^{th}$ frame, correlation of a signal of the $(i-1)^{th}$ frame, a spectrum tilt rate value of the $(i-1)^{th}$ frame, or a zero-crossing rate of the $(i-1)^{th}$ frame;

performing an interpolation operation on a status-updated excitation signal of the $(i-1)^{th}$ frame to determine an adaptive codebook of the $i^{th}$ frame;

determining the algebraic codebook contribution of the $i^{th}$ frame according to a product obtained by multiplying the algebraic codebook of the $i^{th}$ frame by the algebraic codebook gain of the $i^{th}$ frame;

determining an adaptive codebook contribution of the $i^{th}$ frame according to a product obtained by multiplying the adaptive codebook of the $i^{th}$ frame by the adaptive codebook gain of the $i^{th}$ frame; and performing a weighting operation on the algebraic codebook contribution of the $i^{th}$ frame and the adaptive codebook contribution of the $i^{th}$ frame according to the weight of the algebraic codebook contribution of the $i^{th}$ frame and a weight of the adaptive codebook contribution of the $i^{th}$ frame in order to determine the excitation signal of the $i^{th}$ frame, wherein a weight of the adaptive codebook is 1.

25. The apparatus according to claim 9, wherein the processor is further configured to:

determine, according to correlation of the $i^{th}$ frame, whether to correct the spectrum frequency parameter of the $i^{th}$ frame;

correct, when determining to correct the spectrum frequency parameter of the $i^{th}$ frame, the spectrum frequency parameter of the $i^{th}$ frame according to the spectrum frequency parameter of the $i^{th}$ frame and a spectrum frequency parameter of the $(i-1)^{th}$ frame, or correct the spectrum frequency parameter of the $i^{th}$ frame according to the spectrum frequency parameter of the $i^{th}$ frame and a preset spectrum frequency parameter of the $i^{th}$ frame, wherein the correlation of the $i^{th}$ frame comprises a value relationship between a sixth threshold and one of two spectrum frequency parameters corresponding to an index of a minimum value of a difference between adjacent spectrum frequency parameters of the $i^{th}$ frame, a value relationship between a seventh threshold and the minimum value of the difference between the adjacent spectrum frequency parameters of the $i^{th}$ frame, and a value relationship between an eighth threshold and the index of the minimum value of the difference between the adjacent spectrum frequency parameters of the $i^{th}$ frame;

determine the difference between the adjacent spectrum frequency parameters of the $i^{th}$ frame, wherein each difference is corresponding to one index, and the spectrum frequency parameter comprises an immittance spectral frequency (ISF) or a line spectral frequency (LSF);

determine whether the difference between the adjacent spectrum frequency parameters of the $i^{th}$ frame meets at least one of a fourth condition or a fifth condition, wherein the fourth condition comprises one of the two spectrum frequency parameters corresponding to the index of the minimum value of the difference between the adjacent spectrum frequency parameters of the $i^{th}$ frame is less than the sixth threshold, and wherein the fifth condition comprises an index value of the minimum value of the difference between the adjacent spectrum frequency parameters of the $i^{th}$ frame is less than the eighth threshold, and the minimum difference is less than the seventh threshold;

determine, when the difference between the adjacent spectrum frequency parameters of the $i^{th}$ frame meets the at least one of the fourth condition or the fifth condition, to correct the spectrum frequency parameter of the $i^{th}$ frame;

determine, when the difference between the adjacent spectrum frequency parameters of the $i^{th}$ frame does not meet the fourth condition or the fifth condition, not to correct the spectrum frequency parameter of the $i^{th}$ frame; and determine a corrected spectrum frequency parameter of the $i^{th}$ frame according to a weighting operation performed on either:

the spectrum frequency parameter of the $(i-1)^{th}$ frame and the spectrum frequency parameter of the $i^{th}$ frame; or the spectrum frequency parameter of the $i^{th}$ frame and the preset spectrum frequency parameter of the $i^{th}$ frame.

* * * * *